US012688607B2

(12) United States Patent
    Revaud et al.

(10) Patent No.:      US 12,688,607 B2
(45) Date of Patent:          Jul. 21, 2026

---

(54) SYSTEM AND METHOD FOR MODEL-FREE, ONE-SHOT OBJECT POSE ESTIMATION VIA COORDINATE REGRESSION

(71) Applicants: Naver Corporation, Seongnam-si (KR); Naver Labs Corporation, Seongnam-si (KR)

(72) Inventors: Jérome Revaud, Meylan (FR); Romain Brégier, Meylan (FR); Yohann Cabon, Meylan (FR); Philippe Weinzaepfel, Meylan (FR); JongMin Lee, Meylan (FR)

(73) Assignee: Naver Corporation (KR)

( * ) Notice: Subject to any disclaimer, the term of this patent is extended or adjusted under 35 U.S.C. 154(b) by 238 days.

(21) Appl. No.: 18/645,542

(22) Filed: Apr. 25, 2024

(65) Prior Publication Data

US 2024/0404104 A1      Dec. 5, 2024

Related U.S. Application Data

(60) Provisional application No. 63/542,114, filed on Oct. 3, 2023.

(30) Foreign Application Priority Data

Jun. 1, 2023     (EP) ..................................... 23305867

(51) Int. Cl.
    *G06T 7/73*          (2017.01)
    *G06T 7/50*          (2017.01)
    (Continued)

(52) U.S. Cl.
    CPC .................. *G06T 7/74* (2017.01); *G06T 7/50* (2017.01); *G06V 10/774* (2022.01);
    (Continued)

(58) Field of Classification Search
    CPC ... G06T 7/74; G06T 7/50; G06T 2207/20081; G06T 2207/20084; G06T 2207/30244;
    (Continued)

(56) References Cited

U.S. PATENT DOCUMENTS 12,154,301 B2 * 11/2024 Portman .............. G06N 3/0895
    2023/0196955 A1 *  6/2023 Jang ....................... G09G 3/006
                                                            345/204
                       (Continued)

OTHER PUBLICATIONS

L. Yang, Z. Bai, C. Tang, H. Li, Y. Furukawa and P. Tan, "SANet: Scene Agnostic Network for Camera Localization," 2019 IEEE/CVF International Conference on Computer Vision (ICCV), Seoul, Korea (South), 2019, pp. 42-51, doi: 10.1109/ICCV.2019.00013. (Year: 2019).*

(Continued)

*Primary Examiner* — Wesley J Tucker
(74) *Attorney, Agent, or Firm* — Michael J. Nickerson

(57)          ABSTRACT

A computer implemented method and system using an object-agnostic model for predicting a pose of an object in an image receives a query image having a target object therein; receives a set of reference images of the target object from different viewpoints; encodes, using a vision transformer, the received query image and the received set of reference images to generate a set of token features for the received query image and a set of token features for the received set of reference images; extracts, using a transformer decoder, information from the set of token features for the encoded reference images with respect to a set of token features for the received query image; processes, using a prediction head, the combined set of token features to generate a 2D-3D mapping and a confidence map of the query image; and processes the 2D-3D mapping and confidence map to determine the pose of the target object in the query image.

12 Claims, 18 Drawing Sheets

(51) Int. Cl.
| | |
|---|---|
| *G06V 10/774* | (2022.01) |
| *G06V 10/80* | (2022.01) |
| *G06V 10/82* | (2022.01) |
| *G06V 20/70* | (2022.01) |

(52) U.S. Cl.
CPC ............ *G06V 10/806* (2022.01); *G06V 10/82* (2022.01); *G06V 20/70* (2022.01); *G06T 2207/20081* (2013.01); *G06T 2207/20084* (2013.01); *G06T 2207/30244* (2013.01)

(58) Field of Classification Search
CPC .... G06V 10/774; G06V 10/806; G06V 10/82; G06V 20/70; G06V 10/766; G06V 10/778; G06N 3/045
See application file for complete search history.

(56) References Cited

U.S. PATENT DOCUMENTS

| | | | | |
|---|---|---|---|---|
| 2024/0096072 A1* | 3/2024 | He | | G06V 10/26 |
| 2025/0112088 A1* | 4/2025 | Lee | | H10W 20/075 |
| 2025/0307552 A1* | 10/2025 | Ebrahimi | | G06F 40/284 |
| 2025/0342604 A1* | 11/2025 | Chen | | G06T 7/50 |
| 2025/0378591 A1* | 12/2025 | Yu | | G06T 11/00 |

OTHER PUBLICATIONS

Arnold, Eduardo, Jamie Wynn, Sara Vicente, Guillermo Garcia-Hernando, Áron Monszpart, Victor Prisacariu, Daniyar Turmukhambetov, and Eric Brachmann. 'Map-Free Visual Relocalization: Metric Pose Relative to a Single Image'. In Computer Vision—ECCV 2022, edited by Shai Avidan, Gabriel Brostow, Moustapha Cissé, Giovanni Maria Farinella, and Tal Hassner, 13661:690-708. Lecture Notes in Computer Science. Cham: Springer Nature Switzerland, 2022. https://doi.org/10.1007/978-3-031-19769-7_40.

Bachmann, Roman, David Mizrahi, Andrei Atanov, and Amir Zamir. 'MultiMAE: Multi-Modal Multi-Task Masked Autoencoders'. In Computer Vision—ECCV 2022, edited by Shai Avidan, Gabriel Brostow, Moustapha Cissé, Giovanni Maria Farinella, and Tal Hassner, 13697:348-67. Lecture Notes in Computer Science. Cham: Springer Nature Switzerland, 2022. https://doi.org/10.1007/978-3-031-19836-6_20.

Balntas, Vassileios, Shuda Li, and Victor Prisacariu. 'RelocNet: Continuous Metric Learning Relocalisation Using Neural Nets'. In Computer Vision—ECCV 2018, edited by Vittorio Ferrari, Martial Hebert, Cristian Sminchisescu, and Yair Weiss, 11218:782-99. Lecture Notes in Computer Science. Cham: Springer International Publishing, 2018. https://doi.org/10.1007/978-3-030-01264-9_46.

Baruch, Gilad, Zhuoyuan Chen, Afshin Dehghan, Tal Dimry, Yuri Feigin, Peter Fu, Thomas Gebauer, et al. ARKitScenes: A Diverse Real-World Dataset for 3D Indoor Scene Understanding Using Mobile RGB-D Data.

Belghit, Hayet, Abdelkader Bellarbi, Nadia Zenati, and Samir Otmane. 'Vision-Based Pose Estimation for Augmented Reality□: A Comparison Study', 35th Conference on Neural Information Processing Systems (NeurIPS 2021).

Blanton, Hunter, Connor Greenwell, Scott Workman, and Nathan Jacobs. 'Extending Absolute Pose Regression to Multiple Scenes'. In 2020 IEEE/CVF Conference on Computer Vision and Pattern Recognition Workshops (CVPRW), 170-78. Seattle, WA, USA: IEEE, 2020. https://doi.org/10.1109/CVPRW50498.2020.00027.

Blender Online Community. Blender—a 3D modelling and rendering package. Blender Foundation, 2018. https://www.blender.org/download/.

Brachmann, Eric, Alexander Krull, Frank Michel, Stefan Gumhold, Jamie Shotton, and Carsten Rother. 'Learning 6D Object Pose Estimation Using 3D Object Coordinates'. In Computer Vision—ECCV 2014, edited by David Fleet, Tomas Pajdla, Bernt Schiele, and Tinne Tuytelaars, 8690:536-51. Lecture Notes in Computer Science. Cham: Springer International Publishing, 2014. https://doi.org/10.1007/978-3-319-10605-2_35.

Brachmann, Eric, Alexander Krull, Sebastian Nowozin, Jamie Shotton, Frank Michel, Stefan Gumhold, and Carsten Rother. 'DSAC—Differentiable RANSAC for Camera Localization'. In 2017 IEEE Conference on Computer Vision and Pattern Recognition (CVPR), 2492-2500. Honolulu, HI: IEEE, 2017. https://doi.org/10.1109/CVPR.2017.267.

Brachmann, Eric, Frank Michel, Alexander Krull, Michael Ying Yang, Stefan Gumhold, and Carsten Rother. 'Uncertainty-Driven 6D Pose Estimation of Objects and Scenes from a Single RGB Image'. In 2016 IEEE Conference on Computer Vision and Pattern Recognition (CVPR), 3364-72. Las Vegas, NV, USA: IEEE, 2016. https://doi.org/10.1109/CVPR.2016.366.

Brachmann, Eric, and Carsten Rother. 'Expert Sample Consensus Applied to Camera Re-Localization'. arXiv, Aug. 7, 2019. http://arxiv.org/abs/1908.02484.

Brachmann, Eric et al. 'Learning Less Is More—6D Camera Localization via 3D Surface Regression'. In 2018 IEEE/CVF Conference on Computer Vision and Pattern Recognition, 4654-62. Salt Lake City, UT: IEEE, 2018. https://doi.org/10.1109/CVPR.2018.00489.

Brachmann, Eric et al. 'Visual Camera Re-Localization from RGB and RGB-D Images Using DSAC'. arXiv, Oct. 9, 2020. http://arxiv.org/abs/2002.12324.

Brahmbhatt, Samarth, Jinwei Gu, Kihwan Kim, James Hays, and Jan Kautz. 'Geometry-Aware Learning of Maps for Camera Localization'. In 2018 IEEE/CVF Conference on Computer Vision and Pattern Recognition, 2616-25. Salt Lake City, UT, USA: IEEE, 2018. https://doi.org/10.1109/CVPR.2018.00277.

Brégier, Romain. 'Deep Regression on Manifolds: A 3D Rotation Case Study'. arXiv, Oct. 12, 2021. https://doi.org/10.48550/arXiv.2103.16317.

Cai, Dingding, Janne Heikkilä, and Esa Rahtu. 'OVE6D: Object Viewpoint Encoding for Depth-Based 6D Object Pose Estimation'. arXiv, Apr. 7, 2022. https://doi.org/10.48550/arXiv.2203.01072.

Camposeco, Federico, Andrea Cohen, Marc Pollefeys, and Torsten Sattler. 'Hybrid Scene Compression for Visual Localization'. In 2019 IEEE/CVF Conference on Computer Vision and Pattern Recognition (CVPR), 7645-54. Long Beach, CA, USA: IEEE, 2019. https://doi.org/10.1109/CVPR.2019.00784.

Cao, Song, and Noah Snavely. 'Minimal Scene Descriptions from Structure from Motion Models'. In 2014 IEEE Conference on Computer Vision and Pattern Recognition, 461-68. Columbus, OH, USA: IEEE, 2014. https://doi.org/10.1109/CVPR.2014.66.

Chen, Dengsheng, Jun Li, Zheng Wang, and Kai Xu. 'Learning Canonical Shape Space for Category-Level 6D Object Pose and Size Estimation'. arXiv, Nov. 21, 2021. https://doi.org/10.48550/arXiv.2001.09322.

Chen, Hansheng, Pichao Wang, Fan Wang, Wei Tian, Lu Xiong, and Hao Li. 'EPro-PnP: Generalized End-to-End Probabilistic Perspective-n-Points for Monocular Object Pose Estimation'. arXiv, Aug. 11, 2022. https://doi.org/10.48550/arXiv.2203.13254.

Chen, Kai, and Qi Dou. 'SGPA: Structure-Guided Prior Adaptation for Category-Level 6D Object Pose Estimation'. In 2021 IEEE/CVF International Conference on Computer Vision (ICCV), 2753-62. Montreal, QC, Canada: IEEE, 2021. https://doi.org/10.1109/ICCV48922.2021.00277.

Chen, Wei, Xi Jia, Hyung Jin Chang, Jinming Duan, Linlin Shen, and Ales Leonardis. 'FS-Net: Fast Shape-Based Network for Category-Level 6D Object Pose Estimation with Decoupled Rotation Mechanism'. arXiv, Jun. 6, 2021. https://doi.org/10.48550/arXiv.2103.07054.

Chen, Xu, Zijian Dong, Jie Song, Andreas Geiger, and Otmar Hilliges. 'Category Level Object Pose Estimation via Neural Analysis-by-Synthesis'. arXiv, Aug. 18, 2020. https://doi.org/10.48550/arXiv.2008.08145.

Cheng, Wentao, Weisi Lin, Kan Chen, and Xinfeng Zhang. 'Cascaded Parallel Filtering for Memory-Efficient Image-Based Localization'. In 2019 IEEE/CVF International Conference on Computer Vision (ICCV), 1032-41. Seoul, Korea (South): IEEE, 2019. https://doi.org/10.1109/ICCV.2019.00112.

(56)　　　　　References Cited

OTHER PUBLICATIONS

Cheng, Wentao, Weisi Lin, Xinfeng Zhang, Michael Goesele, and Ming-Ting Sun. 'A Data-Driven Point Cloud Simplification Framework for City-Scale Image-Based Localization'. IEEE Transactions on Image Processing 26, No. 1 (Jan. 2017): 262-75. https://doi.org/10.1109/TIP.2016.2623488.

Cheng, Xinjing, Peng Wang, Chenye Guan, and Ruigang Yang. 'CSPN++: Learning Context and Resource Aware Convolutional Spatial Propagation Networks for Depth Completion'. Proceedings of the AAAI Conference on Artificial Intelligence 34, No. 07 (Apr. 3, 2020): 10615-22. https://doi.org/10.1609/aaai.v34i07.6635.

Cipolla, Roberto, Yarin Gal, and Alex Kendall. 'Multi-Task Learning Using Uncertainty to Weigh Losses for Scene Geometry and Semantics'. In 2018 IEEE/CVF Conference on Computer Vision and Pattern Recognition, 7482-91. Salt Lake City, UT, USA: IEEE, 2018. https://doi.org/10.1109/CVPR.2018.00781.

Collins, Jasmine, Shubham Goel, Kenan Deng, Achleshwar Luthra, Leon Xu, Erhan Gundogdu, Xi Zhang, et al. 'ABO: Dataset and Benchmarks for Real-World 3D Object Understanding'. In 2022 IEEE/CVF Conference on Computer Vision and Pattern Recognition (CVPR), 21094-104. New Orleans, LA, USA: IEEE, 2022. https://doi.org/10.1109/CVPR52688.2022.02045.

Dai, Angela, Angel X. Chang, Manolis Savva, Maciej Halber, Thomas Funkhouser, and Matthias Niessner. 'ScanNet: Richly-Annotated 3D Reconstructions of Indoor Scenes'. In 2017 IEEE Conference on Computer Vision and Pattern Recognition (CVPR), 2432-43. Honolulu, HI: IEEE, 2017. https://doi.org/10.1109/CVPR.2017.261.

Deng, Xinke, Yu Xiang, Arsalan Mousavian, Clemens Eppner, Timothy Bretl, and Dieter Fox. 'Self-Supervised 6D Object Pose Estimation for Robot Manipulation'. arXiv, Mar. 7, 2020. https://doi.org/10.48550/arXiv.1909.10159.

DeTone, Daniel, Tomasz Malisiewicz, and Andrew Rabinovich. 'SuperPoint: Self-Supervised Interest Point Detection and Description'. In 2018 IEEE/CVF Conference on Computer Vision and Pattern Recognition Workshops (CVPRW), 337-33712. Salt Lake City, UT, USA: IEEE, 2018. https://doi.org/10.1109/CVPRW.2018.00060.

Ding, Mingyu, Zhe Wang, Jiankai Sun, Jianping Shi, and Ping Luo. 'CamNet: Coarse-to-Fine Retrieval for Camera Re-Localization'. In 2019 IEEE/CVF International Conference on Computer Vision (ICCV), 2871-80. Seoul, Korea (South): IEEE, 2019. https://doi.org/10.1109/ICCV.2019.00296.

Do, Thanh-Toan. 'Real-Time Monocular Object Instance 6D Pose Estimation', 29th British Machine Vision Conference, BMVC 2018. British Machine Vision Association and Society for Pattern Recognition. British MachineVision Conference 2018, BMVC 2018 ; Conference date:Sep. 3, 2018 Through Sep. 6, 2018. http://bmvc2018.org/contents/papers/0694.pdf.

Dong, Siyan, Shuzhe Wang, Yixin Zhuang, Juho Kannala, Marc Pollefeys, and Baoquan Chen. 'Visual Localization via Few-Shot Scene Region Classification'. arXiv, Aug. 14, 2022. http://arxiv.org/abs/2208.06933.

Dosovitskiy, Alexey, Lucas Beyer, Alexander Kolesnikov, Dirk Weissenborn, Xiaohua Zhai, Thomas Unterthiner, Mostafa Dehghani, et al. 'An Image is Worth 16×16 Words: Transformers for Image Recognition at Scale', 2021. https://openreview.net/pdf?id=YicbFdNTTy.

Dusmanu, Mihai, Ignacio Rocco, Tomas Pajdla, Marc Pollefeys, Josef Sivic, Akihiko Torii, and Torsten Sattler. 'D2-Net: A Trainable CNN for Joint Detection and Description of Local Features'. arXiv, May 9, 2019. http://arxiv.org/abs/1905.03561.

Marcin Dymczyk, Simon Lynen, Michael Bosse, and Roland Siegwart. Keep it brief: Scalable creation of compressed localization maps. In IROS, 2015.

Eldar, Yuval, Michael Lindenbaum, and Moshe Porat. 'The Farthest Point Strategy for Progressive Image Sampling'. IEEE Transactions on Image Processing 6, No. 9 (1997).

Fischler, Martin A, and Robert C Bolles. 'Random Sample Consensus' 24, No. 6 (1981). Communications of the ACM, 1981 https://dl.acm.org/doi/pdf/10.1145/358669.358692.

Gou, Minghao, Haolin Pan, Hao-Shu Fang, Ziyuan Liu, Cewu Lu, and Ping Tan. 'Unseen Object 6D Pose Estimation: A Benchmark and Baselines'. arXiv, Jun. 23, 2022. https://doi.org/10.48550/arXiv.2206.11808.

Robert M. Gray and David L. Neuhoff. Quantization. IEEE Trans. Inf. Theory, 1998.

Guzman-Rivera, Abner, Pushmeet Kohli, Ben Glocker, Jamie Shotton, Toby Sharp, Andrew Fitzgibbon, and Shahram Izadi. 'Multi-Output Learning for Camera Relocalization'. In 2014 IEEE Conference on Computer Vision and Pattern Recognition, 1114-21. Columbus, OH, USA: IEEE, 2014. https://doi.org/10.1109/CVPR.2014.146.

He, Kaiming, Xinlei Chen, Saining Xie, Yanghao Li, Piotr Dollár, and Ross Girshick. 'Masked Autoencoders Are Scalable Vision Learners'. arXiv, Dec. 19, 2021. https://doi.org/10.48550/arXiv.2111.06377.

He, Xingyi, Jiaming Sun, Yuang Wang, Di Huang, Hujun Bao, and Xiaowei Zhou. 'OnePose++: Keypoint-Free One-Shot Object Pose Estimation without CAD Models'. arXiv, Jan. 18, 2023. https://doi.org/10.48550/arXiv.2301.07673.

He, Yisheng, Yao Wang, Haoqiang Fan, Jian Sun, and Qifeng Chen. 'FS6D: Few-Shot 6D Pose Estimation of Novel Objects'. In 2022 IEEE/CVF Conference on Computer Vision and Pattern Recognition (CVPR), 6804-14. New Orleans, LA, USA: IEEE, 2022. https://doi.org/10.1109/CVPR52688.2022.00669.

Heinly, Jared, Johannes L. Schonberger, Enrique Dunn, and Jan-Michael Frahm. 'Reconstructing the World in Six Days'. In 2015 IEEE Conference on Computer Vision and Pattern Recognition (CVPR), 3287-95. Boston, MA, USA: IEEE, 2015. https://doi.org/10.1109/CVPR.2015.7298949.

Henriques, João F, Pedro Martins, Rui F Caseiro, and Jorge Batista. 'Fast Training of Pose Detectors in the Fourier Domain'. Advances in Neural Information Processing Systems, vol. 27.https://openaccess.thecvf.com/content_cvpr_2015/papers/Heinly_Reconstructing_the_World_2015_CVPR_paper.pdf.

Hietanen, Antti, Jyrki Latokartano, Alessandro Foi, Roel Pieters, Ville Kyrki, Minna Lanz, and Joni-Kristian Kämäräinen. 'Benchmarking Pose Estimation for Robot Manipulation'. Robotics and Autonomous Systems 143 (Sep. 2021): 103810. https://doi.org/10.1016/j.robot.2021.103810.

Hietanen, Antti et al. 'Object Pose Estimation in Robotics Revisited'. arXiv, May 21, 2020. https://doi.org/10.48550/arXiv.1906.02783.

Hinterstoisser, S., C. Cagniart, S. Ilic, P. Sturm, N. Navab, P. Fua, and V. Lepetit. 'Gradient Response Maps for Real-Time Detection of Textureless Objects'. IEEE Transactions on Pattern Analysis and Machine Intelligence 34, No. 5 (May 2012): 876-88. https://doi.org/10.1109/TPAMI.2011.206.

Zhang, Zichao, Torsten Sattler, and Davide Scaramuzza. 'Reference Pose Generation for Long-Term Visual Localization via Learned Features and View Synthesis'. International Journal of Computer Vision 129, No. 4 (Apr. 2021): 821-44. https://doi.org/10.1007/s11263-020-01399-8.

Zhou, Lei, Zixin Luo, Tianwei Shen, Jiahui Zhang, Mingmin Zhen, Yao Yao, Tian Fang, and Long Quan. 'KFNet: Learning Temporal Camera Relocalization Using Kalman Filtering'. In 2020 IEEE/CVF Conference on Computer Vision and Pattern Recognition (CVPR), 4918-27. Seattle, WA, USA: IEEE, 2020. https://doi.org/10.1109/CVPR42600.2020.00497.

Zhou, Qunjie, Torsten Sattler, Marc Pollefeys, and Laura Leal-Taixe. 'To Learn or Not to Learn: Visual Localization from Essential Matrices'. arXiv, Mar. 9, 2020. https://doi.org/10.48550/arXiv.1908.01293.

Ultralytics/yolov5: v3.1—Bug Fixes and Performance Improvements https://zenodo.org/records/4154370.

Revaud, Jerome, Philippe Weinzaepfel, César De Souza, Noe Pion, Gabriela Csurka, Yohann Cabon, and Martin Humenberger. 'R2D2: Repeatable and Reliable Detector and Descriptor'. ArXiv:1906.06195 [Cs], Jun. 17, 2019. http://arxiv.org/abs/1906.06195.

(56)        References Cited

OTHER PUBLICATIONS

Rios-Cabrera, Reyes, and Tinne Tuytelaars. 'Discriminatively Trained Templates for 3D Object Detection: A Real Time Scalable Approach'. In 2013 IEEE International Conference on Computer Vision, 2048-55. Sydney, Australia: IEEE, 2013. https://doi.org/10.1109/ICCV. 2013.256.

Rublee, Ethan, Vincent Rabaud, Kurt Konolige, and Gary Bradski. 'ORB: An Efficient Alternative to SIFT or SURF'. In 2011 International Conference on Computer Vision, 2564-71. Barcelona, Spain: IEEE, 2011. https://doi.org/10.1109/ICCV.2011.6126544.

Sarlin, Paul-Edouard, Cesar Cadena, Roland Siegwart, and Marcin Dymczyk. 'From Coarse to Fine: Robust Hierarchical Localization at Large Scale'. In 2019 IEEE/CVF Conference on Computer Vision and Pattern Recognition (CVPR), 12708-17. Long Beach, CA, USA: IEEE, 2019. https://doi.org/10.1109/CVPR.2019.01300.

Sarlin, Paul-Edouard, Daniel DeTone, Tomasz Malisiewicz, and Andrew Rabinovich. 'SuperGlue: Learning Feature Matching with Graph Neural Networks'. arXiv, Mar. 28, 2020. https://doi.org/10. 48550/arXiv.1911.11763.

Sattler, Torsten, Michal Havlena, Filip Radenovic, Konrad Schindler, and Marc Pollefeys. 'Hyperpoints and Fine Vocabularies for Large-Scale Location Recognition'. In 2015 IEEE International Conference on Computer Vision (ICCV), 2102-10. Santiago, Chile: IEEE, 2015. https://doi.org/10.1109/ICCV.2015.243.

Sattler, Torsten, Bastian Leibe, and Leif Kobbelt. 'Efficient & Effective Prioritized Matching for Large-Scale Image-Based Localization'. IEEE Transactions on Pattern Analysis and Machine Intelligence 39, No. 9 (Sep. 1, 2017): 1744-56. https://doi.org/10.1109/ TPAMI.2016.2611662.

Sattler, Torsten, Will Maddern, Carl Toft, Akihiko Torii, Lars Hammarstrand, Erik Stenborg, Daniel Safari, et al. 'Benchmarking 6DOF Outdoor Visual Localization in Changing Conditions'. In 2018 IEEE/CVF Conference on Computer Vision and Pattern Recognition, 8601-10. Salt Lake City, UT, USA: IEEE, 2018. https://doi.org/10.1109/CVPR.2018.00897.

Savva, Manolis, Abhishek Kadian, Oleksandr Maksymets, Yili Zhao, Erik Wijmans, Bhavana Jain, Julian Straub, et al. 'Habitat: A Platform for Embodied AI Research'. In 2019 IEEE/CVF International Conference on Computer Vision (ICCV), 9338-46. Seoul, Korea (South): IEEE, 2019. https://doi.org/10.1109/ICCV.2019. 00943.

Schonberger, Johannes L., and Jan-Michael Frahm. 'Structure-from-Motion Revisited'. In 2016 IEEE Conference on Computer Vision and Pattern Recognition (CVPR), 4104-13. Las Vegas, NV, USA: IEEE, 2016. https://doi.org/10.1109/CVPR.2016.445.

Shi, Wenzhe, Jose Caballero, Ferenc Huszár, Johannes Totz, Andrew P. Aitken, Rob Bishop, Daniel Rueckert, and Zehan Wang. 'Real-Time Single Image and Video Super-Resolution Using an Efficient Sub-Pixel Convolutional Neural Network'. arXiv, Sep. 23, 2016. https://doi.org/10.48550/arXiv.1609.05158.

Shotton, Jamie, Ben Glocker, Christopher Zach, Shahram Izadi, Antonio Criminisi, and Andrew Fitzgibbon. 'Scene Coordinate Regression Forests for Camera Relocalization in RGB-D Images'. In 2013 IEEE Conference on Computer Vision and Pattern Recognition, 2930-37. Portland, OR, USA: IEEE, 2013. https://doi.org/ 10.1109/CVPR.2013.377.

Shugurov, Ivan, Fu Li, Benjamin Busam, and Slobodan Ilic. 'OSOP: A Multi-Stage One Shot Object Pose Estimation Framework'. arXiv, Mar. 30, 2022. https://doi.org/10.48550/arXiv.2203.15533.

Snavely, Noah, Steven M. Seitz, and Richard Szeliski. 'Modeling the World from Internet Photo Collections'. International Journal of Computer Vision 80, No. 2 (Nov. 2008): 189-210. https://doi.org/ 10.1007/s11263-007-0107-3.

Song, Jiaru. 'Sliding Window Filter Based Unknown Object Pose Estimation'. In 2017 IEEE International Conference on Image Processing (ICIP), 2642-46. Beijing: IEEE, 2017. https://doi.org/ 10.1109/ICIP.2017.8296761.

Straub, Julian, Thomas Whelan, Lingni Ma, Yufan Chen, Erik Wijmans, Simon Green, Jakob J. Engel, et al. 'The Replica Dataset: A Digital Replica of Indoor Spaces'. arXiv, Jun. 13, 2019. http:// arxiv.org/abs/1906.05797.

Su, Jianlin, Yu Lu, Shengfeng Pan, Ahmed Murtadha, Bo Wen, and Yunfeng Liu. 'RoFormer: Enhanced Transformer with Rotary Position Embedding'. arXiv, Nov. 8, 2023. http://arxiv.org/abs/2104. 09864.

Sun, Jiaming, Zehong Shen, Yuang Wang, Hujun Bao, and Xiaowei Zhou. 'LoFTR: Detector-Free Local Feature Matching with Transformers'. arXiv, Apr. 1, 2021. https://doi.org/10.48550/arXiv.2104. 00680.

Sun, Jiaming, Zihao Wang, Siyu Zhang, Xingyi He, Hongcheng Zhao, Guofeng Zhang, and Xiaowei Zhou. 'OnePose: One-Shot Object Pose Estimation without CAD Models', https://arxiv.org/ pdf/2205.12257.

Szot, Andrew, Alex Clegg, Eric Undersander, Erik Wijmans, Yili Zhao, John Turner, Noah Maestre, et al. 'Habitat 2.0: Training Home Assistants to Rearrange Their Habitat', In NeurIPS, 2021 . https://proceedings.neurips.cc/paper_files/paper/2021/file/ 021bbc7ee20b71134d53e20206bd6feb-Paper.pdf.

Tang, Shitao, Chengzhou Tang, Rui Huang, Siyu Zhu, and Ping Tan. 'Learning Camera Localization via Dense Scene Matching'. In 2021 IEEE/CVF Conference on Computer Vision and Pattern Recognition (CVPR), 1831-41. Nashville, TN, USA: IEEE, 2021. https://doi.org/10.1109/CVPR46437.2021.00187.

Tang et al. 'NeuMap: Neural Coordinate Mapping by Auto-Transdecoder for Camera Localization'. In 2023 IEEE/CVF Conference on Computer Vision and Pattern Recognition (CVPR), 929-39. Vancouver, BC, Canada: IEEE, 2023. https://doi.org/10. 1109/CVPR52729.2023.00096.

Tejani, Alykhan, Danhang Tang, Rigas Kouskouridas, and Tae-Kyun Kim. 'Latent-Class Hough Forests for 3D Object Detection and Pose Estimation', Computer Vision—ECCV 2014, 462-477. Cham: Springer International Publishing https://projet.liris.cnrs.fr/ imagine/pub/proceedings/ECCV-2014/papers/8694/86940462.pdf.

Terzakis, George, and Manolis Lourakis. 'A Consistently Fast and Globally Optimal Solution to the Perspective-n-Point Problem'. In Computer Vision—ECCV 2020, edited by Andrea Vedaldi, Horst Bischof, Thomas Brox, and Jan-Michael Frahm, 12346:478-94. Lecture Notes in Computer Science. Cham: Springer International Publishing, 2020. https://doi.org/10.1007/978-3-030-58452-8_28.

Tian, Meng, Marcelo H. Ang Jr, and Gim Hee Lee. 'Shape Prior Deformation for Categorical 6D Object Pose and Size Estimation'. arXiv, Jul. 16, 2020. https://doi.org/10.48550/arXiv.2007.08454.

Tian, Yurun, Xin Yu, Bin Fan, Fuchao Wu, Huub Heijnen, and Vassileios Balntas. 'SOSNet: Second Order Similarity Regularization for Local Descriptor Learning'. In 2019 IEEE/CVF Conference on Computer Vision and Pattern Recognition (CVPR), 11008-17. Long Beach, CA, USA: IEEE, 2019. https://doi.org/10.1109/CVPR. 2019.01127.

Tolias, Giorgos, Tomas Jenicek, and Ondřej Chum. 'Learning and Aggregating Deep Local Descriptors for Instance-Level Recognition'. In Computer Vision—ECCV 2020, edited by Andrea Vedaldi, Horst Bischof, Thomas Brox, and Jan-Michael Frahm, 12346:460-77. Lecture Notes in Computer Science. Cham: Springer International Publishing, 2020. https://doi.org/10.1007/978-3-030-58452-8_27.

Tyszkiewicz, Michał J, Pascal Fua, and Eduard Trulls. DISK: Learning Local Features with Policy Gradient https://proceedings. neurips.cc/paper_files/paper/2020/file/ a42a596fc71e17828440030074d15e74-Paper.pdf.

Valentin, Julien, Matthias Niebner, Jamie Shotton, Andrew Fitzgibbon, Shahram Izadi, and Philip Torr. 'Exploiting Uncertainty in Regression Forests for Accurate Camera Relocalization'. In 2015 IEEE Conference on Computer Vision and Pattern Recognition (CVPR), 4400-4408. Boston, MA, USA: IEEE, 2015. https://doi. org/10.1109/CVPR.2015.7299069.

Vaswani, Ashish, Noam Shazeer, Niki Parmar, Jakob Uszkoreit, Llion Jones, Aidan N Gomez, Łukasz Kaiser, and Illia Polosukhin. 'Attention Is All You Need'. In Advances in Neural Information Processing Systems 30, edited by I. Guyon, U. V. Luxburg, S. Bengio, H. Wallach, R. Fergus, S. Vishwanathan, and R. Garnett,

(56) References Cited

OTHER PUBLICATIONS 5998-6008. Curran Associates, Inc., 2017. http://papers.nips.cc/paper/7181-attention-is-all-you-need.pdf.

Walch, F., C. Hazirbas, L. Leal-Taixe, T. Sattler, S. Hilsenbeck, and D. Cremers. 'Image-Based Localization Using LSTMs for Structured Feature Correlation'. In 2017 IEEE International Conference on Computer Vision (ICCV), 627-37. Venice: IEEE, 2017. https://doi.org/10.1109/ICCV.2017.75.

Wang, Angtian, Shenxiao Mei, Alan Yuille, and Adam Kortylewski. 'Neural View Synthesis and Matching for Semi-Supervised Few-Shot Learning of 3D Pose'. arXiv, Oct. 27, 2021. https://doi.org/10.48550/arXiv.2110.14213.

Wang, Bing, Changhao Chen, Chris Xiaoxuan Lu, Peijun Zhao, Niki Trigoni, and Andrew Markham. 'AtLoc: Attention Guided Camera Localization'. Proceedings of the AAAI Conference on Artificial Intelligence 34, No. 06 (Apr. 3, 2020): 10393-401. https://doi.org/10.1609/aaai.v34i06.6608.

Wang, Gu, Fabian Manhardt, Federico Tombari, and Xiangyang Ji. 'GDR-Net: Geometry-Guided Direct Regression Network for Monocular 6D Object Pose Estimation'. arXiv, Mar. 9, 2021. https://doi.org/10.48550/arXiv.2102.12145.

Wang, He, Srinath Sridhar, Jingwei Huang, Julien Valentin, Shuran Song, and Leonidas J. Guibas. 'Normalized Object Coordinate Space for Category-Level 6D Object Pose and Size Estimation'. arXiv, Jun. 23, 2019. https://doi.org/10.48550/arXiv.1901.02970.

Wang, Jiaze, Kai Chen, and Qi Dou. 'Category-Level 6D Object Pose Estimation via Cascaded Relation and Recurrent Reconstruction Networks'. arXiv, Aug. 19, 2021. https://doi.org/10.48550/arXiv.2108.08755.

Wang, Qianqian, Xiaowei Zhou, Bharath Hariharan, and Noah Snavely. 'Learning Feature Descriptors Using Camera Pose Supervision'. In Computer Vision—ECCV 2020, edited by Andrea Vedaldi, Horst Bischof, Thomas Brox, and Jan-Michael Frahm, 12346:757-74. Lecture Notes in Computer Science. Cham: Springer International Publishing, 2020. https://doi.org/10.1007/978-3-030-58452-8_44.

Weinzaepfel, Philippe, Vincent Leroy, Thomas Lucas, Romain Brégier, Yohann Cabon, Vaibhav Arora, Leonid Antsfeld, Boris Chidlovskii, Gabriela Csurka, and Jérôme Revaud. 'CroCo: Self-Supervised Pre-Training for 3D Vision Tasks by Cross-View Completion', Neurips 2022 https://proceedings.neurips.cc/paper_files/paper/2022/file/16e71d1a24b98a02c17b1be1f634f979-Paper-Conference.pdf.

Weinzaepfel, Philippe, Thomas Lucas, Diane Larlus, and Yannis Kalantidis. 'Learning Super-Features for Image Retrieval', ICLR 2022. https://openreview.net/pdf?id=wogsFPHwftY.

Weinzaepfel, Philippe, Thomas Lucas, Vincent Leroy, Yohann Cabon, Vaibhav Arora, Romain Brégier, Gabriela Csurka, Leonid Antsfeld, Boris Chidlovskii, and Jerome Revaud. 'CroCo v2: Improved Cross-View Completion Pre-Training for Stereo Matching and Optical Flow'. arXiv, Aug. 18, 2023. http://arxiv.org/abs/2211.10408.

Weinzaepfel, Philippe et al. 'CroCo v2: Improved Cross-View Completion Pre-Training for Stereo Matching and Optical Flow'. In 2023 IEEE/CVF International Conference on Computer Vision (ICCV), 17923-34. Paris, France: IEEE, 2023. https://doi.org/10.1109/ICCV51070.2023.01647.

Wen, Bowen, and Kostas Bekris. 'BundleTrack: 6D Pose Tracking for Novel Objects without Instance or Category-Level 3D Models'. arXiv, Aug. 1, 2021. https://doi.org/10.48550/arXiv.2108.00516.

Wu, Xin, Hao Zhao, Shunkai Li, Yingdian Cao, and Hongbin Zha. 'SC-WLS: Towards Interpretable Feed-Forward Camera Re-Localization'. In Computer Vision—ECCV 2022, edited by Shai Avidan, Gabriel Brostow, Moustapha Cissé, Giovanni Maria Farinella, and Tal Hassner, 13661:585-601. Lecture Notes in Computer Science. Cham: Springer Nature Switzerland, 2022. https://doi.org/10.1007/978-3-031-19769-7_34.

Xiang, Yu, Tanner Schmidt, Venkatraman Narayanan, and Dieter Fox. 'PoseCNN: A Convolutional Neural Network for 6D Object Pose Estimation in Cluttered Scenes'. arXiv, May 26, 2018. https://doi.org/10.48550/arXiv.1711.00199.

Xie, Tao, Kun Dai, Ke Wang, Ruifeng Li, and Lijun Zhao. 'DeepMatcher: A Deep Transformer-Based Network for Robust and Accurate Local Feature Matching'. arXiv, Jan. 8, 2023. https://doi.org/10.48550/arXiv.2301.02993.

Yang, Luwei, Ziqian Bai, Chengzhou Tang, Honghua Li, Yasutaka Furukawa, and Ping Tan. 'SANet: Scene Agnostic Network for Camera Localization'. In 2019 IEEE/CVF International Conference on Computer Vision (ICCV), 42-51. Seoul, Korea (South): IEEE, 2019. https://doi.org/10.1109/ICCV.2019.00013.

Yang, Luwei, Rakesh Shrestha, Wenbo Li, Shuaicheng Liu, Guofeng Zhang, Zhaopeng Cui, and Ping Tan. 'SceneSqueezer: Learning to Compress Scene for Camera Relocalization'. In 2022 IEEE/CVF Conference on Computer Vision and Pattern Recognition (CVPR), 8249-58. New Orleans, LA, USA: IEEE, 2022. https://doi.org/10.1109/CVPR52688.2022.00808.

Yen-Chen, Lin, Pete Florence, Jonathan T. Barron, Alberto Rodriguez, Phillip Isola, and Tsung-Yi Lin. 'iNeRF: Inverting Neural Radiance Fields for Pose Estimation'. arXiv, Aug. 10, 2021. https://doi.org/10.48550/arXiv.2012.05877.

Yi, Kwang Moo, Eduard Trulls, Vincent Lepetit, and Pascal Fua. 'LIFT: Learned Invariant Feature Transform'. arXiv, Jul. 29, 2016. https://doi.org/10.48550/arXiv.1603.09114.

Zakharov, Sergey, Ivan Shugurov, and Slobodan Ilic. 'DPOD: 6D Pose Object Detector and Refiner'. In 2019 IEEE/CVF International Conference on Computer Vision (ICCV), 1941-50. Seoul, Korea (South): IEEE, 2019. https://doi.org/10.1109/ICCV.2019.00203.

Hinterstoisser, Stefan, Stefan Holzer, Cedric Cagniart, Slobodan Ilic, Kurt Konolige, Nassir Navab, and Vincent Lepetit. 'Multimodal Templates for Real-Time Detection of Texture-Less Objects in Heavily Cluttered Scenes'. In 2011 International Conference on Computer Vision, 858-65. Barcelona, Spain: IEEE, 2011. https://doi.org/10.1109/ICCV.2011.6126326.

Hinterstoisser, Stefan, Vincent Lepetit, Slobodan Ilic, Stefan Holzer, Gary Bradski, Kurt Konolige, and Nassir Navab. 'Model Based Training, Detection and Pose Estimation of Texture-Less 3D Objects in Heavily Cluttered Scenes'. In Computer Vision—ACCV 2012, edited by Kyoung Mu Lee, Yasuyuki Matsushita, James M. Rehg, and Zhanyi Hu, 7724:548-62. Lecture Notes in Computer Science. Berlin, Heidelberg: Springer Berlin Heidelberg, 2013. https://doi.org/10.1007/978-3-642-37331-2_42.

Hodan, Tomas, Daniel Barath, and Jiri Matas. 'EPOS: Estimating 6D Pose of Objects with Symmetries'. arXiv, Apr. 1, 2020. https://doi.org/10.48550/arXiv.2004.00605.

Hodan, Tomas, Frank Michel, Eric Brachmann, Wadim Kehl, Anders Glent Buch, Dirk Kraft, Bertram Drost, et al. 'BOP: Benchmark for 6D Object Pose Estimation'. arXiv, Aug. 24, 2018. https://doi.org/10.48550/arXiv.1808.08319.

Hodan et al. EPOS: Estimating 6D Pose of Objects with Symmetries https://arxiv.org/pdf/2004.00605.

Hu, Mu, Shuling Wang, Bin Li, Shiyu Ning, Li Fan, and Xiaojin Gong. 'PENet: Towards Precise and Efficient Image Guided Depth Completion'. arXiv, Mar. 18, 2021. https://doi.org/10.48550/arXiv.2103.00783.

Huang, Zhaoyang, Han Zhou, Yijin Li, Bangbang Yang, Yan Xu, Xiaowei Zhou, Hujun Bao, Guofeng Zhang, and Hongsheng Li. 'VS-Net: Voting with Segmentation for Visual Localization'. In 2021 IEEE/CVF Conference on Computer Vision and Pattern Recognition (CVPR), 6097-6107. Nashville, TN, USA: IEEE, 2021. https://doi.org/10.1109/CVPR46437.2021.00604.

Humenberger, Martin, Yohann Cabon, Nicolas Guerin, Julien Morat, Vincent Leroy, Jerome Revaud, Philippe Rerole, Noé Pion, Cesar de Souza, and Gabriela Csurka. 'Robust Image Retrieval-Based Visual Localization Using Kapture'. arXiv, Jan. 7, 2022. http://arxiv.org/abs/2007.13867.

Hutchison, David, Takeo Kanade, Josef Kittler, Jon M. Kleinberg, Friedemann Mattern, John C. Mitchell, Moni Naor, et al. 'Location Recognition Using Prioritized Feature Matching'. In Computer Vision—ECCV 2010, edited by Kostas Daniilidis, Petros Maragos, and Nikos Paragios, 6312:791-804. Lecture Notes in Computer Science. Berlin, Heidelberg: Springer Berlin Heidelberg, 2010. https://doi.org/10.1007/978-3-642-15552-9_57.

(56)                    References Cited

OTHER PUBLICATIONS

Iwase, Shun, Xingyu Liu, Rawal Khirodkar, Rio Yokota, and Kris M. Kitani. 'RePOSE: Fast 6D Object Pose Refinement via Deep Texture Rendering'. arXiv, Aug. 19, 2021. https://doi.org/10.48550/arXiv.2104.00633.

Jégou, H, M Douze, and C Schmid. 'Product Quantization for Nearest Neighbor Search'. IEEE Transactions on Pattern Analysis and Machine Intelligence 33, No. 1 (Jan. 2011): 117-28. https://doi.org/10.1109/TPAMI.2010.57.

Kehl, Wadim, Fabian Manhardt, Federico Tombari, Slobodan Ilic, and Nassir Navab. 'SSD-6D: Making RGB-Based 3D Detection and 6D Pose Estimation Great Again'. arXiv, Nov. 27, 2017. https://doi.org/10.48550/arXiv.1711.10006.

Kehl, Wadim, Federico Tombari, Nassir Navab, Slobodan Ilic, and Vincent Lepetit. 'Hashmod: A Hashing Method for Scalable 3D Object Detection'. arXiv, Jul. 20, 2016. https://doi.org/10.48550/arXiv.1607.06062.

Kendall, Alex, and Roberto Cipolla. 'Geometric Loss Functions for Camera Pose Regression with Deep Learning'. In 2017 IEEE Conference on Computer Vision and Pattern Recognition (CVPR), 6555-64. Honolulu, HI: IEEE, 2017. https://doi.org/10.1109/CVPR.2017.694.

Kendall, Alex, Matthew Grimes, and Roberto Cipolla. 'PoseNet: A Convolutional Network for Real-Time 6-DOF Camera Relocalization'. In 2015 IEEE International Conference on Computer Vision (ICCV), 2938-46. Santiago, Chile: IEEE, 2015. https://doi.org/10.1109/ICCV.2015.336.

Lee, JongMin, Yohann Cabon, Romain Brégier, Sungjoo Yoo, and Jerome Revaud. 'MFOS: Model-Free & One-Shot Object Pose Estimation'. arXiv, Oct. 3, 2023. https://doi.org/10.48550/arXiv.2310.01897.

Lee et al. MFOS: Model-Free & One-Shot Object Pose Estimation. Proceedings of the AAAI Conference on Artificial Intelligence 38, No. 4 (Mar. 24, 2024): 2911-19. https://doi.org/10.1609/aaai.v38i4.28072.

Lee, Taeyeop, Byeong-Uk Lee, Myungchul Kim, and In So Kweon. 'Category-Level Metric Scale Object Shape and Pose Estimation'. IEEE Robotics and Automation Letters 6, No. 4 (Oct. 2021): 8575-82. https://doi.org/10.1109/LRA.2021.3110538.

Lepetit, Vincent, Francesc Moreno-Noguer, and Pascal Fua. 'EPnP: An Accurate O(n) Solution to the PnP Problem'. International Journal of Computer Vision 81, No. 2 (Feb. 2009): 155-66. https://doi.org/10.1007/s11263-008-0152-6.

Li, Kunhong, Longguang Wang, Li Liu, Qing Ran, Kai Xu, and Yulan Guo. 'Decoupling Makes Weakly Supervised Local Feature Better'. In 2022 IEEE/CVF Conference on Computer Vision and Pattern Recognition (CVPR), 15817-27. New Orleans, LA, USA: IEEE, 2022. https://doi.org/10.1109/CVPR52688.2022.01538.

Li, Xiaotian, Shuzhe Wang, Yi Zhao, Jakob Verbeek, and Juho Kannala. 'Hierarchical Scene Coordinate Classification and Regression for Visual Localization'. In 2020 IEEE/CVF Conference on Computer Vision and Pattern Recognition (CVPR), 11980-89. Seattle, WA, USA: IEEE, 2020. https://doi.org/10.1109/CVPR42600.2020.01200.

Li, Zhengqi, and Noah Snavely. 'MegaDepth: Learning Single-View Depth Prediction from Internet Photos'. In 2018 IEEE/CVF Conference on Computer Vision and Pattern Recognition, 2041-50. Salt Lake City, UT, USA: IEEE, 2018. https://doi.org/10.1109/CVPR.2018.00218.

Li, Zhigang, and Xiangyang Ji. 'Pose-Guided Auto-Encoder and Feature-Based Refinement for 6-DoF Object Pose Regression'. In 2020 IEEE International Conference on Robotics and Automation (ICRA), 8397-8403. Paris, France: IEEE, 2020. https://doi.org/10.1109/ICRA40945.2020.9196953.

Li, Zhigang, Gu Wang, and Xiangyang Ji. 'CDPN: Coordinates-Based Disentangled Pose Network for Real-Time RGB-Based 6-DoF Object Pose Estimation'. In 2019 IEEE/CVF International Conference on Computer Vision (ICCV), 7677-86. Seoul, Korea (South): IEEE, 2019. https://doi.org/10.1109/ICCV.2019.00777.

Liu, Yuan, Yilin Wen, Sida Peng, Cheng Lin, Xiaoxiao Long, Taku Komura, and Wenping Wang. 'Gen6D: Generalizable Model-Free 6-DoF Object Pose Estimation from RGB Images'. arXiv, Jan. 27, 2023. https://doi.org/10.48550/arXiv.2204.10776.

Liu, Zhuang, Hanzi Mao, Chao-Yuan Wu, Christoph Feichtenhofer, Trevor Darrell, and Saining Xie. 'A ConvNet for the 2020s', CVPR, 2022 https://openaccess.thecvf.com/content/CVPR2022/papers/Liu_A_ConvNet_for_the_2020s_CVPR_2022_paper.pdf.

Loshchilov, Ilya, and Frank Hutter. 'Decoupled Weight Decay Regularization', . ICLR 2019.

Lowe, David G. 'Distinctive Image Features from Scale-Invariant Keypoints'. International Journal of Computer Vision 60, No. 2 (Nov. 2004): 91-110. https://doi.org/10.1023/B:VISI.0000029664.99615.94.

Luo, Zixin, Tianwei Shen, Lei Zhou, Siyu Zhu, Runze Zhang, Yao Yao, Tian Fang, and Long Quan. 'GeoDesc: Learning Local Descriptors by Integrating Geometry Constraints'. In Computer Vision—ECCV 2018, edited by Vittorio Ferrari, Martial Hebert, Cristian Sminchisescu, and Yair Weiss, 11213:170-85. Lecture Notes in Computer Science. Cham: Springer International Publishing, 2018. https://doi.org/10.1007/978-3-030-01240-3_11.

Luo, Zixin, Lei Zhou, Xuyang Bai, Hongkai Chen, Jiahui Zhang, Yao Yao, Shiwei Li, Tian Fang, and Long Quan. 'ASLFeat: Learning Local Features of Accurate Shape and Localization'. In 2020 IEEE/CVF Conference on Computer Vision and Pattern Recognition (CVPR), 6588-97. Seattle, WA, USA: IEEE, 2020. https://doi.org/10.1109/CVPR42600.2020.00662.

Macqueen, J. 'Some Methods for Classification and Analysis of Multivariate Observations'. Multivariate Observations In Proc. of the fifth Berkeley Symposium on Mathematical Statistics and Probability, 1967. Replaced by this version https://digitalassets.lib.berkeley.edu/math/ucb/text/math_s5_v1_article-17.pdf.

Marchand, Eric, Hideaki Uchiyama, and Fabien Spindler. 'Pose Estimation for Augmented Reality: A Hands-On Survey'. IEEE Transactions on Visualization and Computer Graphics 22, No. 12 (Dec. 1, 2016): 2633-51. https://doi.org/10.1109/TVCG.2015.2513408.

Mera-Trujillo, Marcela, Benjamin Smith, and Victor Fragoso. 'Efficient Scene Compression for Visual-Based Localization'. In 2020 International Conference on 3D Vision (3DV), 1-10. Fukuoka, Japan: IEEE, 2020. https://doi.org/10.1109/3DV50981.2020.00111.

Mildenhall, Ben, Pratul P. Srinivasan, Matthew Tancik, Jonathan T. Barron, Ravi Ramamoorthi, and Ren Ng. 'NeRF: Representing Scenes as Neural Radiance Fields for View Synthesis'. arXiv, Aug. 3, 2020. https://doi.org/10.48550/arXiv.2003.08934.

Nazir, Danish, Alain Pagani, Marcus Liwicki, Didier Stricker, and Muhammad Zeshan Afzal. 'SemAttNet: Toward Attention-Based Semantic Aware Guided Depth Completion'. IEEE Access 10 (2022): 120781-91. https://doi.org/10.1109/ACCESS.2022.3214316.

Olson, Edwin. 'AprilTag: A Robust and Flexible Visual Fiducial System'. In 2011 IEEE International Conference on Robotics and Automation, 3400-3407. Shanghai, China: IEEE, 2011. https://doi.org/10.1109/ICRA.2011.5979561.

Ono, Yuki, Eduard Trulls, Pascal Fua, and Kwang Moo Yi. 'LF-Net: Learning Local Features from Images'. In NeurIPS, 2018 https://papers.nips.cc/paper_files/paper/2018/file/f5496252609c43eb8a3d147ab9b9c006-Paper.pdf.

Park, Hyun Soo, Yu Wang, Eriko Nurvitadhi, James C. Hoe, Yaser Sheikh, and Mei Chen. '3D Point Cloud Reduction Using Mixed-Integer Quadratic Programming'. In 2013 IEEE Conference on Computer Vision and Pattern Recognition Workshops, 229-36. OR, USA: IEEE, 2013. https://doi.org/10.1109/CVPRW.2013.41.

Park, Jinsun, Kyungdon Joo, Zhe Hu, Chi-Kuei Liu, and In So Kweon. 'Non-Local Spatial Propagation Network for Depth Completion'. In Computer Vision—ECCV 2020, edited by Andrea Vedaldi, Horst Bischof, Thomas Brox, and Jan-Michael Frahm, 12358:120-36. Lecture Notes in Computer Science. Cham: Springer International Publishing, 2020. https://doi.org/10.1007/978-3-030-58601-0_8.

Park, Keunhong, Arsalan Mousavian, Yu Xiang, and Dieter Fox. 'LatentFusion: End-to-End Differentiable Reconstruction and Ren-

(56) References Cited

OTHER PUBLICATIONS dering for Unseen Object Pose Estimation'. arXiv, Jun. 12, 2020. https://doi.org/10.48550/arXiv.1912.00416.

Park, Kiru, Timothy Patten, and Markus Vincze. 'Pix2Pose: Pixel-Wise Coordinate Regression of Objects for 6D Pose Estimation'. In 2019 IEEE/CVF International Conference on Computer Vision (ICCV), 7667-76. Seoul, Korea (South): IEEE, 2019. https://doi.org/10.1109/ICCV.2019.00776.

Pavllo, Dario, David Joseph Tan, Marie-Julie Rakotosaona, and Federico Tombari. 'Shape, Pose, and Appearance from a Single Image via Bootstrapped Radiance Field Inversion'. arXiv, Mar. 20, 2023. https://doi.org/10.48550/arXiv.2211.11674.

Peng, Sida, Yuan Liu, Qixing Huang, Hujun Bao, and Xiaowei Zhou. 'PVNet: Pixel-Wise Voting Network for 6DoF Pose Estimation'. arXiv, Dec. 31, 2018. https://doi.org/10.48550/arXiv.1812.11788.

Rad, Mahdi, and Vincent Lepetit. 'BB8: A Scalable, Accurate, Robust to Partial Occlusion Method for Predicting the 3D Poses of Challenging Objects without Using Depth'. arXiv, Mar. 26, 2018. https://doi.org/10.48550/arXiv.1703.10896.

Ramakrishnan, Santhosh K, Aaron Gokaslan, Erik Wijmans, Oleksandr Maksymets, Alex Clegg, John Turner, Eric Undersander, et al. 'Habitat-Matterport 3D Dataset (HM3D): 1000 Large-Scale 3D Environments for Embodied AI', In NeurIPS datasets and benchmarks, 2021. https://datasets-benchmarks-proceedings.neurips.cc/paper_files/paper/2021/file/34173cb38f07f89ddbebc2ac9128303f-Paper-round2.pdf.

Ranftl, Rene, Alexey Bochkovskiy, and Vladlen Koltun. 'Vision Transformers for Dense Prediction'. In 2021 IEEE/CVF International Conference on Computer Vision (ICCV), 12159-68. Montreal, QC, Canada: IEEE, 2021. https://doi.org/10.1109/ICCV48922.2021.01196.

Revaud, J., G. Lavoue, and A. Baskurt. 'Improving Zernike Moments Comparison for Optimal Similarity and Rotation Angle Retrieval'. IEEE Transactions on Pattern Analysis and Machine Intelligence 31, No. 4 (Apr. 2009): 627-36. https://doi.org/10.1109/TPAMI.2008.115.

Revaud, Jerome, Jon Almazan, Rafael Rezende, and Cesar De Souza. 'Learning With Average Precision: Training Image Retrieval With a Listwise Loss'. In 2019 IEEE/CVF International Conference on Computer Vision (ICCV), 5106-15. Seoul, Korea (South): IEEE, 2019. https://doi.org/10.1109/ICCV.2019.00521.

Revaud, Jerome, Yohann Cabon, Romain Brégier, JongMin Lee, and Philippe Weinzaepfel. 'SACReg: Scene-Agnostic Coordinate Regression for Visual Localization'. arXiv, Nov. 30, 2023. http://arxiv.org/abs/2307.11702.

Revaud and al. 'SACReg: Scene-Agnostic Coordinate Regression for Visual Localization'. In 2024 IEEE/CVF Conference on Computer Vision and Pattern Recognition Workshops (CVPRW), 688-98. Seattle, WA, USA: IEEE, 2024. https://doi.org/10.1109/CVPRW63382.2024.00073.

* cited by examiner

600

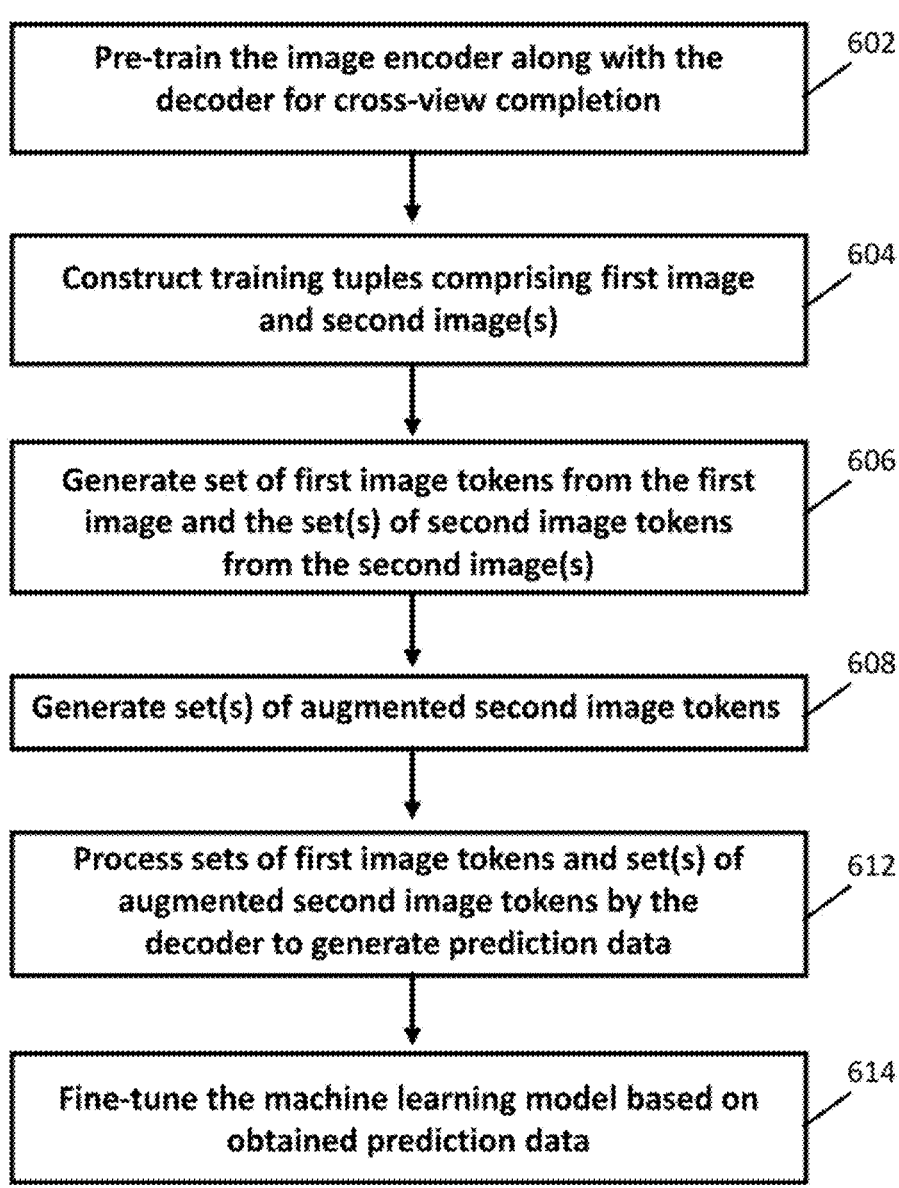

Pre-train the image encoder along with the decoder for cross-view completion — 602

Construct training tuples comprising first image and second image(s) — 604

Generate set of first image tokens from the first image and the set(s) of second image tokens from the second image(s) — 606

Generate set(s) of augmented second image tokens — 608

Process sets of first image tokens and set(s) of augmented second image tokens by the decoder to generate prediction data — 612

Fine-tune the machine learning model based on obtained prediction data — 614

| | LINEMOD | | OnePose | | ABO | |
|---|---|---|---|---|---|---|
| | median nADD(s)↓ | Proj2D↑ | 3cm-3deg ↑ | 5cm-5deg ↑ | 3cm-3deg ↑ | 5cm-5deg ↑ |
| ellipsoid→ellipsoid | 0.3 | 40.9 | 12.1 | 43.6 | 10.2 | 28.2 |
| cuboid→model | 0.24 | 63.1 | 46.8 | 70.9 | 38.7 | 57.1 |
| cuboid→cuboid | 0.27 | 53.4 | 60.6 | 81.9 | 40.3 | 58.4 |

Figure 15

| | LINEMOD | | OnePose | | ABO | |
|---|---|---|---|---|---|---|
| | median nADD(s)↓ | Proj2D↑ | 3cm-3deg | 5cm-5deg | 3cm-3deg | 5cm-5deg |
| BOP | 0.43 | 39.1 | 37.0 | 63.9 | 1.5 | 5.4 |
| BOP + OnePose | 0.29 | 53.4 | 48.3 | 74.8 | 2.7 | 9.1 |
| BOP + OnePose + ABO | 0.28 | 63.9 | 60.6 | 81.9 | 40.3 | 58.4 |

Figure 16

| | LINEMOD | | OnePose | | ABO | |
|---|---|---|---|---|---|---|
| | median nADD(s)↓ | Proj2D↑ | 3cm-3deg | 5cm-5deg | 3cm-3deg | 5cm-5deg |
| 2D | 0.26 | 46.5 | 31.3 | 59.3 | 52.6 | 66.9 |
| 3D | 0.22 | 67.6 | 64.5 | 84.9 | 55.1 | 68.6 |
| 2D + 3D | 0.28 | 63.9 | 60.6 | 81.9 | 40.3 | 58.4 |

Figure 17

| | LINEMOD | | OnePose | | ABO | |
|---|---|---|---|---|---|---|
| | median nADD(s)↓ | Proj2D↑ | 3cm-3deg ↑ | 5cm-5deg ↑ | 3cm-3deg ↑ | 5cm-5deg ↑ |
| Linear | 0.22 | 67.6 | 64.5 | 84.9 | 55.1 | 68.6 |
| DPT | 0.2 | 0.71 | 67.1 | 85.5 | 57.4 | 69.5 |

Figure 18

| | OnePose | | ABO | |
|---|---|---|---|---|
| | 3cm-3deg ↑ | 5cm-5deg ↑ | 3cm-3deg ↑ | 5cm-5deg ↑ |
| $K = 16$ | 67.1 | 85.5 | 57.4 | 69.5 |
| $K = 32$ | 67.9 | 86.1 | 58.4 | 67.9 |
| $K = 48$ | 68.4 | 85.7 | 58.0 | 69.6 |
| $K = 64$ | 67.6 | 86.4 | 53.1 | 66.1 |

Figure 19

| | median pose error $\downarrow$ | 1cm-1deg $\uparrow$ | 3cm-3deg $\uparrow$ | 5cm-5deg $\uparrow$ |
|---|---|---|---|---|
| $K = 16$ | 1.7cm, 1.7° | 16.0 | 55.6 | 67.2 |
| $K = 32$ | 1.6cm, 1.6° | 17.9 | 57.3 | 68.1 |
| $K = 48$ | 1.6cm, 1.6° | 18.3 | 57.6 | 68.4 |
| $K = 64$ | 1.7cm, 1.6° | 16.5 | 56.0 | 67.3 |

Figure 20

| | SfM | OnePose dataset | | | OnePose-LowTexture | | |
|---|---|---|---|---|---|---|---|
| | | 1cm-1deg | 3cm-3deg | 5cm-5deg | 1cm-1deg | 3cm-3deg | 5cm-5deg |
| HLoc *(SPP + SPG)* | yes | 51.1 | 75.9 | 82.0 | 13.8 | 36.1 | 42.2 |
| HLoc *(LoFTR*)* | yes | 39.2 | 72.3 | 80.4 | 13.2 | 41.3 | 52.3 |
| OnePose | yes | 49.7 | 77.5 | 84.1 | 12.4 | 35.7 | 45.4 |
| OnePose++ | yes | 51.1 | 80.8 | 87.7 | 16.8 | 57.7 | 72.1 |
| Ours | no | 14.6 | 68.4 | 85.4 | 7.5 | 41.5 | 59.0 |

Figure 21

| Step | Time |
|---|---|
| Image encoder | 1.8 ms |
| Decoder | 8.0 ms |
| DPT head | 3.9 ms |
| RANSAC-PnP | 2.6 ms |
| Total | 16.3 ms |

Figure 22

SYSTEM AND METHOD FOR MODEL-FREE, ONE-SHOT OBJECT POSE ESTIMATION VIA COORDINATE REGRESSION

PRIORITY INFORMATION

Pursuant to 35 U.S.C. § 119(a), this application claims the benefit of earlier filing date and right of priority to European Patent Application Number EP 23305867.6, filed on Jun. 1, 2023, the contents of which are hereby incorporated by reference in their entirety.

The present application claims priority, under 35 U.S.C. § 119(e), from U.S. Provisional Patent Application, Ser. No. 63/572,114, filed on Oct. 3, 2023. The entire content of U.S. Provisional Patent Application, Ser. No. 63/572,114, filed on Oct. 3, 2023, is hereby incorporated by reference.

BACKGROUND

Human vision is based on two optical sensors, the eyes, and on highly specialized image analysis in vision-related parts of the brain. The image analysis performed by the human brain on the detected images helps humans to recognize objects in images, estimate distances, and estimate object velocities of moving objects. Modern technologies aim at enabling computer-based devices to autonomously perform human activities, such as driving a car, operating machines, catching and throwing objects, or hitting a nail with a hammer. A crucial element for achieving this goal are computer-based devices with computer-vision that can emulate human vision. A useful computer vision system will have to provide a sufficient approximation of the image analysis capabilities of the human brain in order to allow computer-based devices to perform high-level vision-related tasks such as object and edge recognition, monocular or binocular depth estimation, optical flow estimation, or pose estimation.

Methods for estimating the pose from which a query image has been taken by directly applying a deep neural network to the query image have been proposed by Kendall et al. *PoseNet: a Convolutional Network for Real-Time 6-DOF Camera Relocalization*, in ICCV, 2015, Kendall and Cipolla: *Geometric Loss Functions for Camera Pose Regression with Deep Learning*, in CVPR, 2017, and Brahmbhatt et al. *Geometry-Aware Learning of Maps for Camera Localization*, in CVPR, 2018. These methods are designed to memorize specific scenes, which makes them hard to scale and impractical in many scenarios where the test scene is unknown at training time.

Relative pose regression models (e.g. Balntas et al. *RelocNet: Continuous Metric Learning Relocalisation Using Neural Nets.* In ECCV, 2018; Ding et al. CamNet: Coarse-to-Fine Retrieval for Camera Re-Localization, in ICCV, 2019) have in theory the potential to generalize to unseen scenes but they still tend to be less accurate than structure-based methods. Structure-based visual localization frameworks (e.g. Heinly et al. Reconstructing the World in Six Days as Captured by the Yahoo 100 Million Image Dataset, in: CVPR, 2015) use sparse feature matching to estimate the pose of a query image relative to a 3D (three-dimensional) map constructed from database images. These approaches typically rely on a multi-step pipeline consisting of the following steps, given a query image: 1) retrieve a shortlist of images similar to the query from a mapping database, using an image retrieval technique, 2) estimate a sparse correspondences between 2D (two-dimensional) key points of the query image and 2D key points in the mapping images, for which 3D coordinates are known, typically extracted from an SfM reconstruction, and 3) estimate the camera pose from these 2D/3D correspondences by solving a Perspective-n-Point problem, typically employing RANSAC. However, the structure-based methods have to store not only 3D points but also key points descriptors, which makes maintaining the overall localization pipeline very complex.

A particular approach to image-based localization proceeds via coordinate regression. Early approaches such as Shotton et al. *Scene Coordinate Regression Forests for Camera Relocalization in RGB-D Images*, In: CVPR, 2013 employed regression forests for this task. Recent works (e.g. Brachmann et al. *DSAC—Differentiable RANSAC for Camera Localization*, in CVPR, 2017; Brachmann and Rother: *Learning Less is More—6D Camera Localization via 3D Surface Regression*, in CVPR, 2018) apply CNN-based models, but pose significant scalability issues. In these approaches of the prior art, 3D scene coordinates are directly embedded into the parameters of the model, so that the approach is in practice limited to a specific, generally small, scene for which it was trained. Attempts to mitigate this issue, such as training different experts (e.g. Brachmann and Rother: Expert Sample Consensus Applied to Camera Re-Localization, in ICCV, 2019), sharing scene-agnostic knowledge between scenes (e.g. Tang et al. 2022: Neural coordinate mapping by auto-transdecoder for camera localization, arXiv:2211.11177, 2022), or applying dense 3D reconstructions at test time (e.g. Tang et al. 2021, Learning Camera Localization via Dense Scene Matching. In CVPR, 2021), improve some aspects but still require scene-specific fine-tuning.

For the particular case of regression on coordinate annotations, Yang et. al. SANet: Scene Agnostic Network for Camera Localization, in ICCV, 2019 and Tang et al. 2021 cited above, describe scene-agnostic approaches for regressing dense scene coordinates given some reference views for which dense coordinates are already available. These approaches however require a dense multi-view reconstruction of the scene, and are moreover limited to small scenes with unit-normalized world coordinates.

In order to overcome these deficiencies, computer-implemented methods and systems as well as computer readable media for training a machine learning system for regression on pixel-level annotations in images are proposed. The disclosed approach is, in particular, scene agnostic while requiring only sparse annotations.

Advances in coordinate regression allow improving understanding of the 3D geometry of a depicted scene, which is a basis for a range of high-level vision-related tasks, such as depth estimation, optical flow estimation, or pose estimation. Progress in these tasks is of particular interest for self-driving vehicles and autonomous robotic machines. Being able to regress 3D coordinates in metric scale is of utmost interest in embodied AI and robotics, notably for motion planning, navigation, and scene understanding.

This disclosure proposes computer-implemented methods of training a machine learning model for regression on pixel-level annotations in images. The machine learning model comprises an image encoder, a feature mixer, and a decoder. The training method comprises pre-training the image encoder and the decoder for cross-view completion on images, constructing training tuples, each training tuple comprising a first image and one or more second images (i.e., reference images or reference views), wherein the first image is associated with dense pixel-level annotations, and wherein each of the one or more second images is associated with sparse pixel-level annotations. The training further comprises generating, by the image encoder, a set of first image tokens from the first image and generating, by the image encoder, one or more sets of second image tokens from the one or more second images. By the feature mixer, one or more sets of augmented second image tokens are generated by augmenting each set of second image tokens with encodings of the respective sparse pixel-level annotations associated with the respective set of second image tokens, wherein the augmenting includes mixing the respective set of second image tokens and the encodings of the respective sparse pixel-level annotations. The set of first image tokens and the one or more sets of augmented second image tokens are processed by the decoder to generate prediction data of the machine learning model for the first image, wherein the processing comprises receiving a set of augmented second image tokens of the one or more sets of augmented second image tokens, wherein the prediction data comprises predictions for each image pixel of the first image and confidences for the predictions. Finally, the machine learning model is fine-tuned, wherein the fine-tuning comprises adjusting parameters of the image encoder, the feature mixer, and the decoder to minimize a loss function, wherein the loss function is based on the prediction data and the dense pixel-level annotations.

According to embodiments, the feature mixer comprises a first pipeline of image-level decoders for processing the respective second set of tokens, and a second pipeline of point-level decoders for processing the respective encodings, wherein each image-level decoder comprises a first cross-attention layer, wherein each point-level decoder comprises a second cross-attention layer, wherein the mixing the respective set of second image tokens and the respective encodings comprises each first cross-attention layer receiving information from the second pipeline and each second cross-attention block receiving information from the first pipeline. According to further embodiments, the feature mixer further comprises first linear projection modules configured for processing the information from the second pipeline, and second linear projection modules configured for processing the information from the first pipeline, to account for different set sizes of the encodings and the set of second image tokens.

According to other embodiments, the decoder comprises a plurality of cross-attention layers, wherein the number of cross-attention layers matches the number of second images, wherein the processing, by the decoder, the set of first image tokens and the one or more sets of augmented second image tokens comprises processing the set of first image tokens as input of the decoder and providing each set of augmented second image tokens to a respective cross-attention layer of the plurality of cross-attention layers. According to alternative embodiments, the decoder comprises a single cross-attention layer, wherein the processing, by the decoder, the set of first image tokens and the one or more sets of augmented second image tokens comprises providing one set of augmented second image tokens to the single cross-attention layer at a time, wherein for each set of augmented second image tokens, intermediate prediction data are generated and the prediction data of the machine learning model is based on selecting, as the prediction data for an image pixel, an intermediate prediction for the image pixel having a highest confidence value of the confidences.

According to aspects of the disclosure, the sparse pixel-level annotations and the dense pixel-level annotations each comprise annotations of image pixels with 3D coordinates of real-world object features corresponding to the image pixels, wherein the sparse pixel-level annotations are scattered over the respective image when compared with the dense pixel-level annotations, and wherein the prediction data for each image pixel of the first image comprises a 3D coordinate for the image pixel. According to further aspects, the encodings of the pixel-level annotations are generated by a trainable pixel annotation encoder, wherein the pixel annotation encoder is fed with representations of the pixel-level annotations based on an embedding of 3D coordinates in the hypercube $[-1,1]^d$. Advantageously, the embedding is an injective projection and has an inverse, wherein the inverse of the embedding is well-defined over the hypercube $[-1, 1]^d$. In particular embodiments, the embedding is defined by:

$$\varphi(x)) = (\psi(x), \psi(y), \psi(z)) \text{ with}$$
$$\psi(x) = [\cos(f_1 x), \sin(f_1 x), \cos(f_2 x), \sin(f_2 x), \dots],$$
$$\psi(y) = [\cos(f_1 y), \sin(f_1 y), \cos(f_2 y), \sin(f_2 y), \dots],$$
$$\psi(z) = [\cos(f_1 z), \sin(f_1 z), \cos(f_2 z), \sin(f_2 z), \dots],$$
$$\text{wherein } f_i = f_0 \gamma^{i-1}, i \in \left\{1, \dots, \frac{d}{6}\right\}, f_0 > 0, \text{ and } \gamma > 0.$$

According to other aspects of the disclosure, the pixel-level annotation relates to optical flow, relates to information for identifying instances of objects, or relates to information for segmentation of views.

According to additional embodiments, the constructing training tuples comprises selecting the one or more second images from an image database based on selecting easy inliers, hard inliers, and hard outliers, wherein the easy and hard inliers are determined based on a viewpoint angle between camera poses employed to capture the respective images, and the hard outliers are selected as being images most similar to the first image.

According to further embodiments, the pre-training the image encoder along with the decoder for cross-view completion comprises pre-training a pipeline comprising an encoder and a decoder on a pair of pre-training images comprising a first pre-training image and a second pre-training image, wherein the pipeline is trained to reconstruct masked portions of the first pre-training image based on the second pre-training image.

The present disclosure further relates to use of a machine-learning model trained according to embodiments for inferring a camera pose of a camera used for capturing an unannotated query image, and/or generating a 3D-reconstruction of a scene depicted in the unannotated query image, and/or performing 3D completion of a sparsely annotated query image, wherein the sparsely annotated query image is employed as the second image, or performing dense depth prediction for an unannotated query image. The use may specifically comprise the steps of providing an unannotated query image to the image encoder of the trained machine learning model, retrieving neighbor images of the query image from an image database, wherein the retrieving neighbor images is based on feature-based image retrieval, providing the neighbor images to the pipeline of image encoder and feature mixer of the trained machine learning model, and generating prediction data for the query image based on output of the image encoder and on output of the feature mixer.

The present disclosure in addition relates to a computer-implemented method, and system therefor, for: generating, by an image encoder, a set of first image tokens from a first image that is unannotated; generating, by the image encoder, one or more sets of second image tokens from one or more second images; generating, by an object encoder, one or more sets of augmented second image tokens by augmenting each set of second image tokens with encodings of respective pixel-level object annotations associated with the respective set of second image tokens, wherein the respective pixel-level object annotations define a pointmap, where 3D scene points in the pointmap are mapped to 2D pixels in the respective second image; mixing, by a feature mixer, the respective set of second image tokens and the encodings of the respective pixel-level object annotations; processing, by a decoder, the set of first image tokens and the one or more sets of augmented second image tokens to generate prediction data that includes predictions for the image pixels of the first image; processing, by an application module, the predictions for the image pixels of the first image to, one or more of: (i) infer a camera pose of a camera used for capturing the first image; (ii) generate a 3D-reconstruction of a scene depicted in the first image; and (iii) perform dense depth prediction for the first image.

The present disclosure yet further relates to a computer-readable medium comprising instructions that, when executed by a processing unit, cause the processing unit to perform the disclosed methods or uses. The present disclosure also relates to a computing system comprising a processing unit, and a memory unit connected to the processing unit, the memory unit comprising instructions that, when executed by the processing unit, cause the processing unit to perform the disclosed methods or uses.

BRIEF DESCRIPTION OF THE DRAWINGS

The accompanying drawings are incorporated into and form part of the specification for the purpose of explaining the principles of the embodiments. The drawings are not to be construed as limiting the embodiments to only those features illustrated therein. Further features and advantages will become apparent from the following and more particularly from the description of the embodiments.

FIG. 6A is a block diagram of a method for training a machine learning model according to disclosed embodiments;

FIG. 15 illustrates a table showing ablation on 3D proxy shape;

FIG. 16 illustrates a table showing ablation on datasets;

FIG. 17 illustrates a table showing ablation on loss functions;

FIG. 18 illustrates a table showing ablation on a prediction head;

FIG. 19 illustrates a table showing ablation on the number of reference;

FIG. 20 illustrates a table showing results on a full ABO test split for different numbers K of reference images (i.e., reference images or reference views);

FIG. 21 illustrates a table showing comparison with one shot baselines; and

FIG. 22 illustrates a table showing comparison with the state of the art.

In the drawings, some reference numbers are re-used to identify similar and/or identical elements.

DETAILED DESCRIPTION

Described herein are systems, computer-readable media methods for training a machine learning model (also referred to herein as "model" or "machine learning system") for regression on pixel-level annotations in a query image, and inference methods therefor. Specifically, the machine learning model is trained to leverage sparse and/or dense pixel-level annotations in images which are similar to the query image, e.g., which depict the same scene, to infer dense pixel-level annotations for the query image. For explanatory purposes, numerous examples and specific details are set forth in order to provide a thorough understanding of the described embodiments. Embodiments, as defined by the claims may include some or all of the features in these examples alone or in combination with other features, may further include modifications and equivalents of the features and concepts described herein. Illustrative embodiments will be described with reference to the drawings, wherein like elements and structures are indicated by like reference numbers.

Figure 1A:
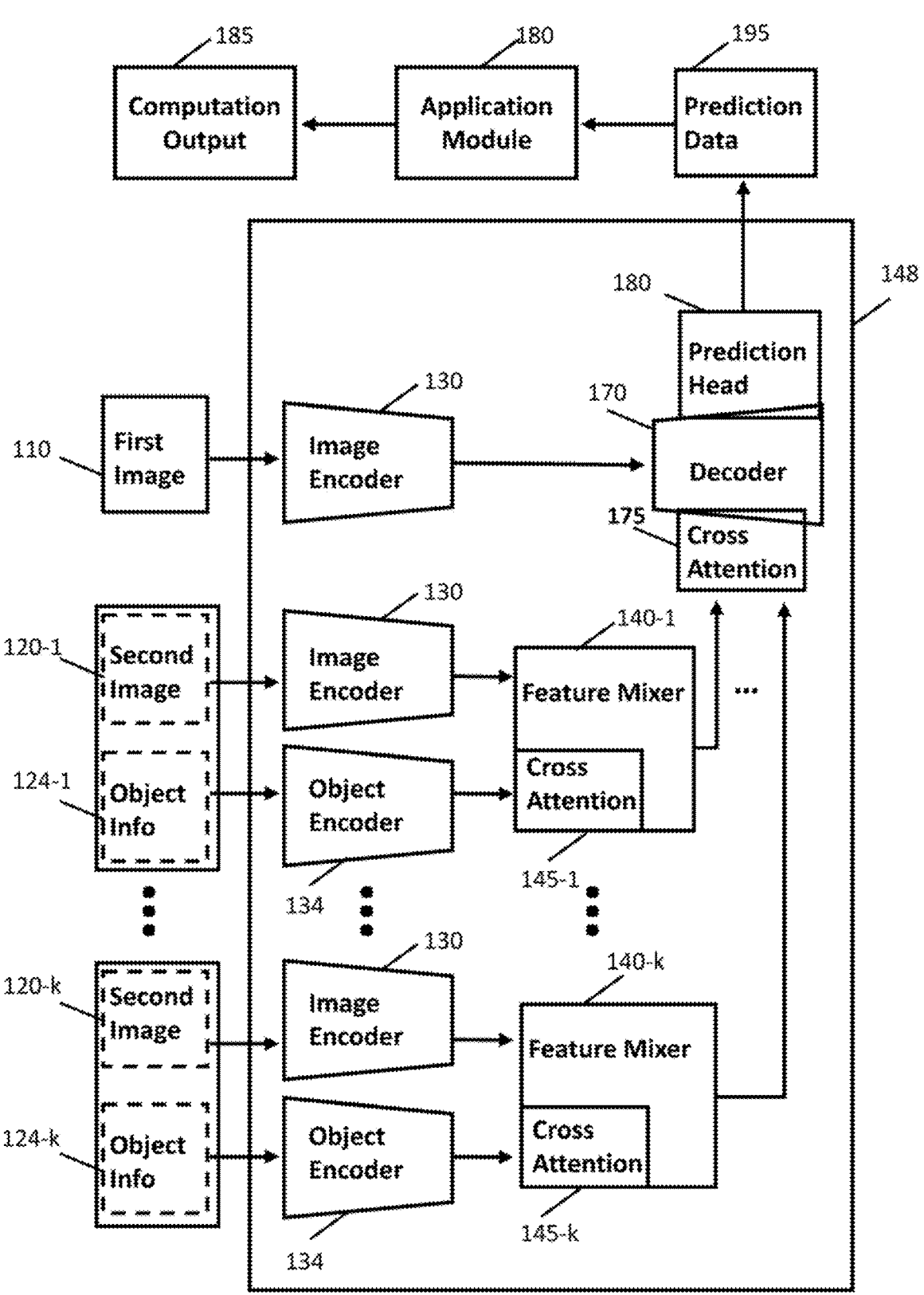
FIG. 1A illustrates components of a machine learning model for regression on pixel-level annotations according to embodiments.

FIG. 1A illustrates components of a machine learning model 148 according to embodiments. The machine learning model is based on an encoder-decoder architecture. Generally, the encoder-decoder architecture is widely used in deep learning architectures. An encoder takes an input sequence and produces a fixed length vector representation that is often referred to as a hidden or latent representation, which is assigned to capture the most important information of the input sequence in a condensed form. The decoder then takes the latent representation and generates an output sequence.

The components of the model 148 for use during inference (to perform the actions 650 set forth in FIG. 6B) include image encoders 130, object encoders 134, feature mixers 140 and decoder 170. The image encoder(s) 130 generate (i) a set of first image tokens from a first image 110 that is unannotated (at 652 in FIG. 6B), and (ii) one or more sets of second image tokens from one or more second images 120 (at 654 in FIG. 6B), where the second images 120 are also referred to herein as reference images or reference views.

Figure 6B:
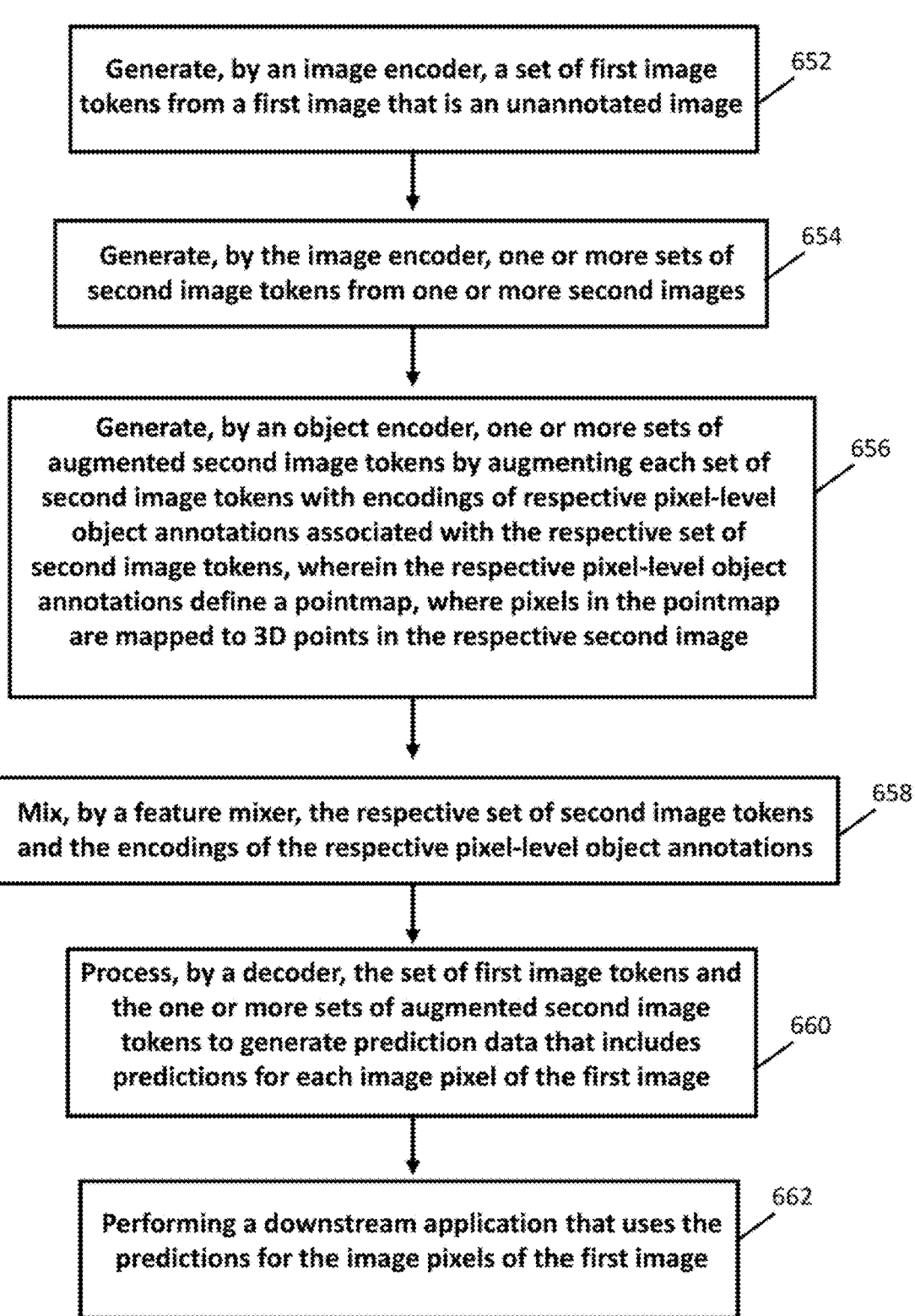
FIG. 6B is a block diagram of a method for using machine learning models according to disclosed embodiments.

The object encoder(s) 134 generate encodings of object information 124 associated with the one or more second images 120, respectively, wherein the respective the object information 124 is pixel-level object annotations that define a pointmap, where 3D scene points in the pointmap are mapped to 2D pixels in a respective second image (at 656 in FIG. 6B). In one embodiment disclosed below, pixels in the pointmap are mapped to 3D points in the second image that are associated with an object in the respective second image. In another embodiment disclosed below, 3D scene points in the pointmap that are associated with a proxy shape are mapped to 2D pixels in the second image, where respective pixel-level object annotations associated with the respective set of second image tokens are renderings of a proxy shape and where the renderings may be sparse or dense renderings of the proxy shape.

With continued reference to FIG. 1A, the feature mixer 140 mixes the respective set of second image tokens produced by image encoders 130 and the encodings of the respective pixel-level object annotations produced by object encoders 134 (at 658 in FIG. 6B) to produce one or more sets of augmented second image tokens. Decoder 170, with cross attention 175 and prediction head 180, processes the set of first image tokens and the one or more sets of augmented second image tokens to generate prediction data 195 that includes predictions for the image pixels of the first image 110 (at 660 in FIG. 6B). An application module 180 processes the predictions for the image pixels of the first image (at 662 in FIG. 6B) to produce computation output 185 that (as disclosed in more detail below): (i) infers a camera pose of a camera used for capturing the first image; (ii) generates a 3D-reconstruction of a scene depicted in the first image; and/or (iii) performs dense depth prediction for the first image.

Figure 1B:
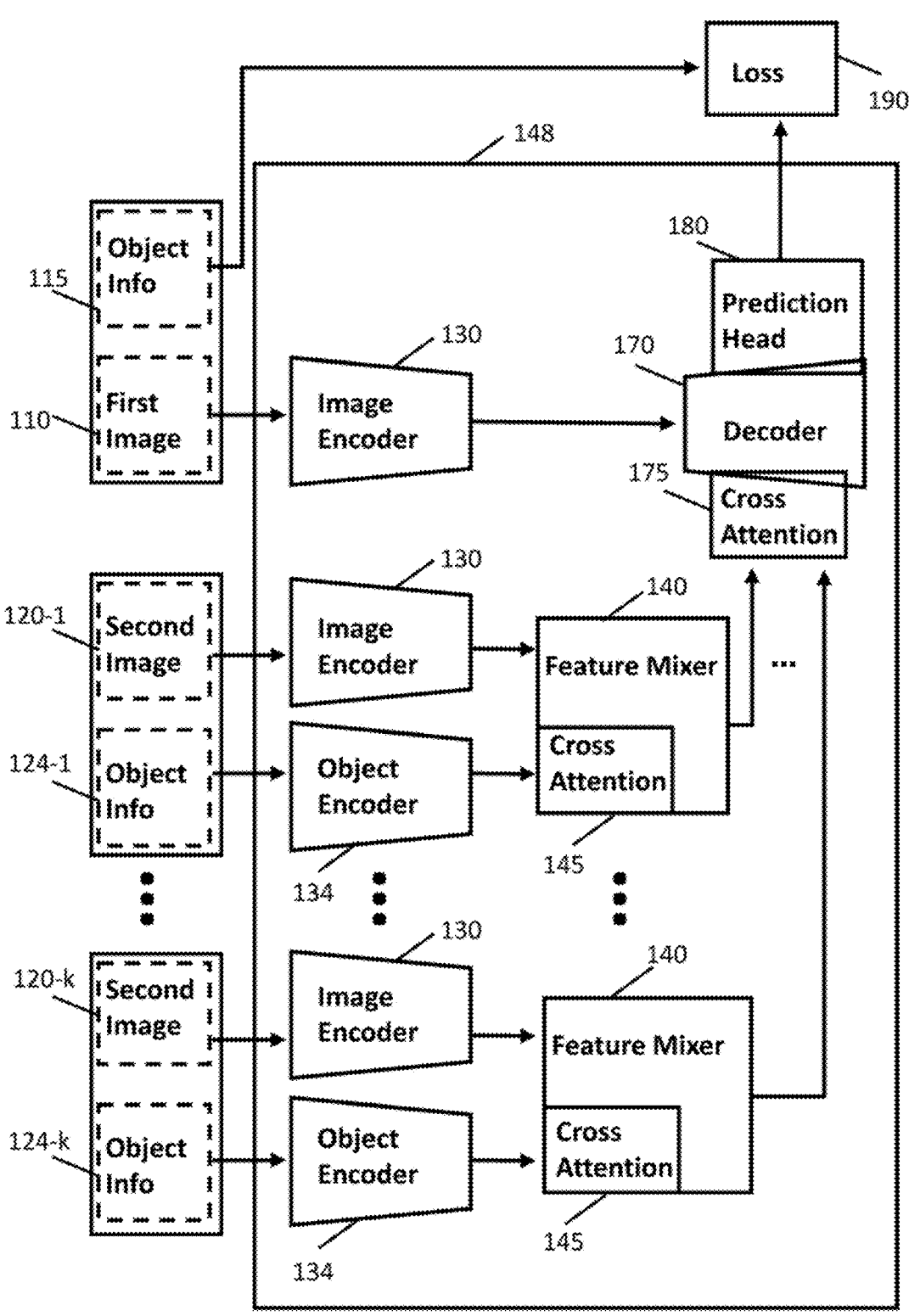
FIG. 1B illustrates components for training the machine learning model in FIG. 1A.

FIG. 1B illustrates components for training the machine learning model 148 in FIG. 1A. During training of the machine-learning model 148, a loss 190 is computed using pixel-level prediction data output by prediction head 180 of decoder 170 and object annotations 115 of the first image 110 in a sufficient quantity for defining a ground truth.

With continued reference to FIG. 1B, the components of the machine learning model 148 are trained in two phases. In a pre-training phase, an encoder and a decoder are trained in an unsupervised manner for cross-view completion, as described in Philippe Weinzaepfel et al. *CroCo: Self-Supervised Pre-training for 3D Vision Tasks by Cross-View Completion*, in: NeurIPS, 2022 (hereinafter Weinzaepfel et al. 2022), which is hereby incorporated by reference in its entirety. The cross-view completion task is an instance of a masked image modeling task, which has proven a potent pre-training paradigm. Cross-view completion pre-training is also explained in Patent Application Nos. EP 22306534.3, U.S. Ser. No. 18/230,414 and U.S. Ser. No. 18/239,739, which are each hereby incorporated by reference in their entirety. Cross-view completion pre-training makes the encoder and the decoder suitable for large-scale image reconstruction in combination. Cross-view completion will be explained in more detail below with reference to FIG. 3.

Figure 1C:
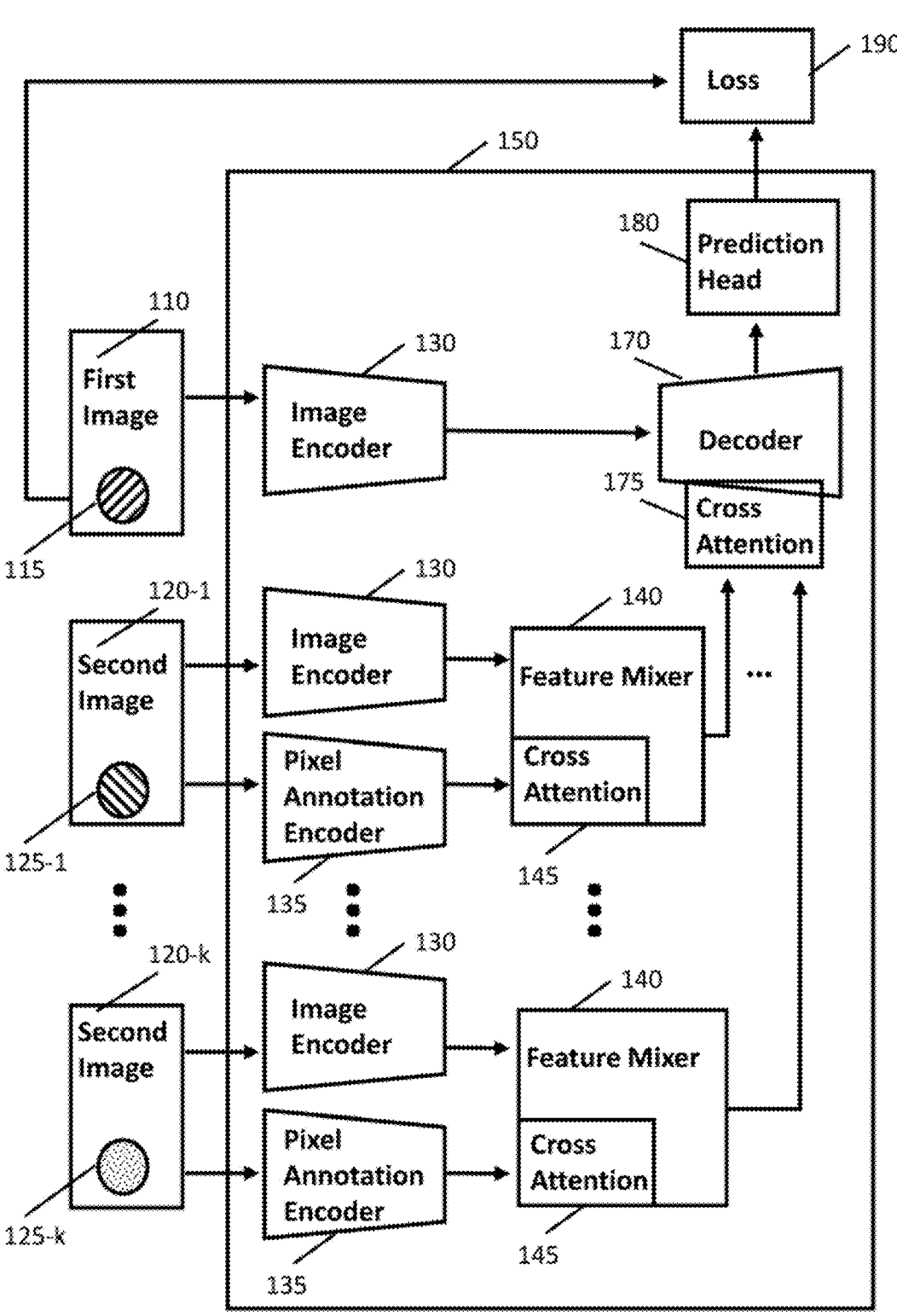
FIG. 1C illustrates components of the machine learning model shown in FIGS. 1A and 11B for regression on pixel-level annotations according to disclosed embodiments.

FIG. 1C illustrates components of the machine learning model 148 shown in FIGS. 1A and 1B for regression on pixel-level annotations 125 according to disclosed embodiments where 3D scene points in a pointmap are mapped to 2D pixels in reference images 120 that are associated with an object in the respective reference images.

FIG. 1C particularly illustrates application of the components under fine-tuning of the machine learning model 150 on regression on pixel-level annotations. As illustrated, the pipeline of the machine learning model 150 starts with image encoder 130. The parameters θ of the image encoder 130 are initialized with parameters of the image encoder learned after completing the cross-view completion pre-training. While plural encoders 130 have been drawn in the Figures, it is to be understood that all encoders 130 drawn in Figures are the same encoder, or are memory copies of the same encoder, and in particular, share parameters θ.

Fine-tuning of the machine learning model 150 relies on first image 110 which has dense pixel-level annotations 115, and second images 120-1, . . . , 120-k, which have sparse pixel-level annotations 125-1, . . . , 125-k. The number k of second images is a predetermined number k≥1. The second images 120-1, . . . , 120-k are also referred to as a shortlist. Dense pixel-level annotations 115 involve annotations of a significant portion the image pixels of the image, while sparse pixel-level annotations 125 involve annotations for a small subset of the image pixels of the image.

Figure 12:
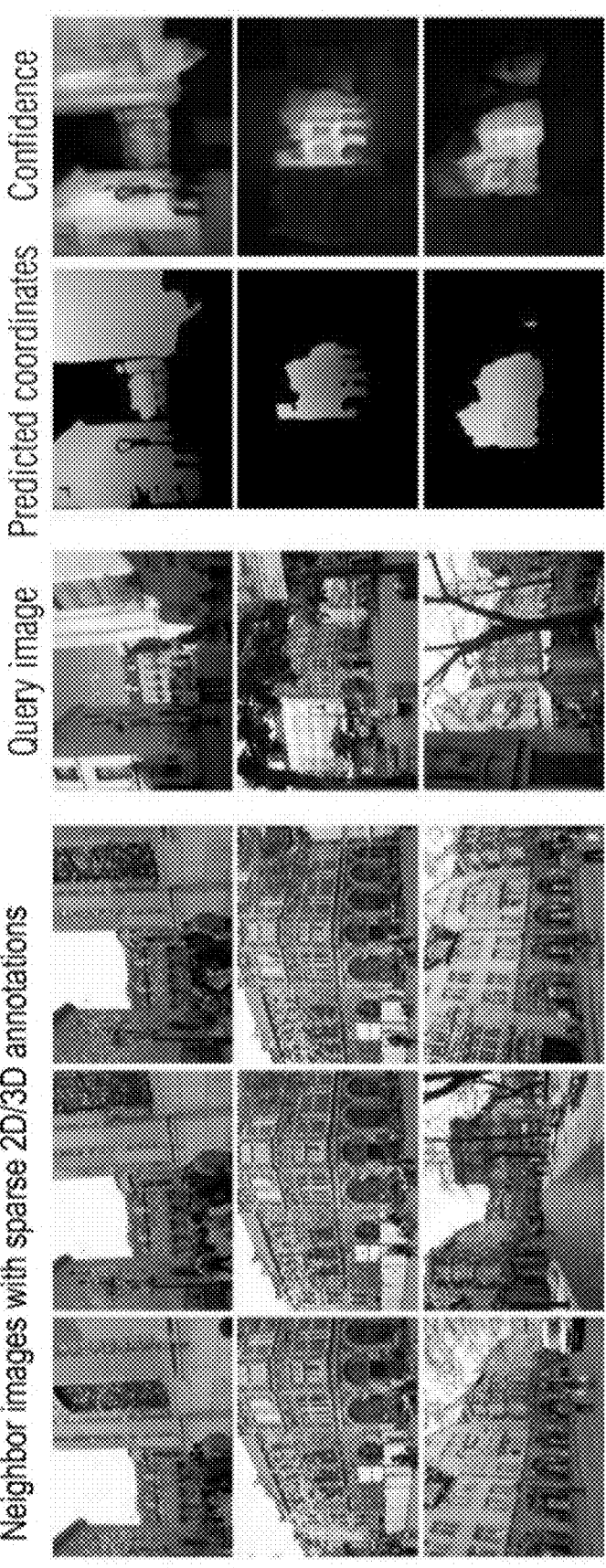
FIG. 12 illustrates neighbor images with pixel-level annotations and query images, along with predicted coordinates and confidences generated, according to an embodiment.

An example of such sparse pixel-level annotations 125 is illustrated by the scattered pixels in the neighbor images in FIG. 12. The significant portion of the image pixels may, for example, include all of the image excluding the sky for which pixel-level annotations usually are not applicable, because the sky does not correspond to an object whose location, motion, or distance could be determined.

The sparse pixel-level annotations 125-1, . . . , 125-k and the dense pixel-level annotations 115 may differ in their data format. The sparse pixel-level annotations 125-1, . . . , 125-k may be provided as a list of tuples (i,j,a) where (i,j) is the 2D pixel position and a is the annotation, such as a 3D point (x,y,z), information regarding optical flow, information for identifying instances of objects, or information for segmentation of views. Dense pixel-level annotations in contrast may be provided as an annotation array of shape H*W*3 by which annotations are provided for all pixels in an image of size H×W, while points with undefined annotations have NaN annotations.

As a result of processing by the image encoder 130, sets of tokens denoted $R_q$ for the first image 110 and $R_i$ for the second images 120, respectively, are obtained:

$$R_q = \varepsilon_\theta(I_q), \; R_i = \varepsilon_\theta(I_i), \; i = 1, \ldots, k, \tag{1}$$

where $I_q$ denotes the pixel content of the first image 110, $I_i$ denotes the pixel content of the second images 120-i, and $\varepsilon_\theta$ is the mathematical function performed by the encoder 130, which depends on the current encoder parameters θ.

In an exemplary implementation, the encoder 130 may be implemented with the Vision Transformer (ViT) architecture (Dosovitskiy et al. *"An Image is Worth 16×16 Words: Transformers for Image Recognition at Scale"*, ICLR, 2021). In more detail, each image $I_q$, $I_i$ is divided into non-overlapping patches, and a linear projection encodes them into patch features. A series of transformer blocks is then applied on these features. Each of these transformer blocks consists of multi-head self-attention and a multilayer perceptron (MLP) layer. In embodiments, a base version of ViT (Vision Transformer) is employed, i.e., processing 16×16 patches with 768-dimensional features, 12 heads and 12 blocks.

Further, instead of a conventional cosine positional embedding which encodes absolute positional information, rotary positional embedding (e.g. Su et al. Enhanced transformer with rotary position embedding. arXiv preprint arXiv:2104.09864, 2021) are employed. This embedding allows to efficiently inject relative positional information of token pairs.

For each image 120-$i$, i=1, . . . , k, sparse pixel-level annotations 125-$i$ are available, which are provided to pixel annotation encoder 135. Again, despite plural pixel annotation encoders 135 being drawn in FIG. 1, it is to be understood that all these correspond to the same pixel annotation encoder 135, or to memory copies of a same pixel annotation encoder 135. The pixel annotation encoder 135 comprises a feedforward neural network such as an MLP (multilayer perceptron) configured to transform the pixel-level annotations to a feature space. In embodiments, the MLP (multilayer perceptron) has 6 layers with 512 hidden dimension.

In some embodiments, the number k of second images is kept fixed during the whole training process. In other embodiments, batches of training data may include first batches in which a first number $k_1$ of second images is employed and second batches in which a second number $k_2$ of second images with $k_2 \neq k_1$ is employed. This approach trains the machine learning system 150 to cope with varying numbers of neighbor images during inference.

In some embodiments, the pixel-level annotations include 2D/3D correspondence. The dense pixel-level annotations may include, for most image pixel of the first image, real-word 3D coordinates corresponding to physical points in the environment that emitted light that hit the respective pixels while the camera was placed in this environment. It is to be understood that the dense pixel-level annotations may include all image pixels which cover ground-based features, such as buildings and landscape features while excluding features in the sky for which 3D coordinates are not applicable. The sparse pixel-level annotations of second image 120-$i$ may correspond to a set of 2D key points $$\{u_j^i\}$$

with their respective absolute 3D coordinates $$\{v_j^i\},$$

where $$u_j^i \in \mathbb{R}^2 \text{ and } v_j^i \in \mathbb{R}^3.$$

An example of such sparse pixel-level 2D/3D annotations 125 is illustrated by the scattered pixels in the neighbor images depicted in FIG. 12.

According to these embodiments, the machine learning model is hence trained for regression on 3D coordinates. Image-based scene coordinate regression (SCR) consists in predicting the coordinates of the 3D point associated to each pixel of a given query image. These embodiments may leverage that there are many image databases with sparse 2D-3D annotations, because methods of the state of the art allow obtaining such sparse pointwise 2D-3D annotation automatically. For example, sparse 2D-3D correspondences are a by-product of the map construction procedure of Structure-from-Motion (SfM) pipelines (e.g., Schönberger and Frahm. *Structure-from-motion Revisited*. In CVPR, 2016). In particular embodiments, sparse 2D-3D annotations are provided as a list of (i,j,x,y,z) tuples where (i,j) is the 2D pixel position for the 3D point (x,y,z), while dense 2D-3D annotations are provided as an annotation array of shape H*W*3, so that 3D coordinates are specified for all pixels in an image of size H×W. The annotation array may include NaN coordinates for pixels without a real-world object such as the sky.

A straightforward approach for the pixel annotation encoder 135 consists in directly employing the 3D coordinate values of the sparse pixel-level annotations 125. However, when the machine learning system 150 is trained for regressing on these simple representations, it is typically unable to regress coordinates outside the range seen during training. The resulting machine learning system 150 would be limited to predicting pixel-level annotations for images similar to the training images.

To remedy this problem, one solution is to pre-normalize the 3D coordinates to a 3D cube of radius 1. After the prediction, this normalization is undone. Further, pixel annotation encoder 135 may be configured to embed the coordinate values v of the sparse pixel-level annotations 125 in a high-dimensional hypercube $[-1,1]^d$ with d>>3 by an embedding $\varphi(v)$. Employing such an embedding yields more noise-resilient machine learning models because redundancy is introduced in the representation. The encoding dimension d is a parameter that controls the level of redundancy. The value of d must be carefully chosen, as too small encodings are not noise-resistant enough, while too large encodings demand too much capacity for the decoder.

The function $\phi$ is designed such that it has several desirable properties. Property (i) $\phi$ is an injective mapping, having an inverse projection $\phi^{-1}$ such that $\phi^{-1}(\phi(v))=v$, and property (ii) the input space, i.e. the domain, of $\phi^{-1}$ is the hypercube $[-1, 1]$. It is to be noted that the inverse mapping $\phi^{-1}$ efficiently solves a least-square problem of the form $\phi^{-1}(y)=\text{argmin}_x\|y-\phi(x)\|^2$. Property (ii) enables applying error-correcting mechanisms in $\phi^{-1}$. Thanks to properties (i) and (ii), the trained machine learning system 150 can handle any coordinate at test time. As a result, the sparse pixel-level annotations correspond to a mapping between 2D image pixels and values in $[-1,1]^d$. These embedded pixel-level annotations are transformed by the feedforward neural network of the pixel annotation encoder 135 to a representation called point tokens $\mathcal{V}_i$.

In specific embodiments, the embedding for obtaining the point tokens $\mathcal{V}_i$ corresponds to a frequency encoding. Such an encoding may be defined as:

$$\phi(x) = (\psi(x),\ \psi(y),\ \psi(z)) \text{ with} \tag{2}$$

$$\psi(x) = [\cos(f_1 x),\ \sin(f_1 x),\ \cos(f_2 x),\ \sin(f_2 x),\ \ldots],$$

-continued
$$\psi(y) = [\cos(f_1 y), \sin(f_1 y), \cos(f_2 y), \sin(f_2 y), \ldots],$$

$$\psi(z) = [\cos(f_1 z), \sin(f_1 z), \cos(f_2 z), \sin(f_2 z), \ldots],$$

wherein $f_i$ are frequencies. The frequencies can be defined in various ways, e.g. linearly, geometrically or with an inverse power as in the original transformer implementation. According to an embodiment, the frequencies are set as $f_i = f_0 \gamma^{i-1}$, $i \in$ $$\left\{1, \ldots, \frac{d}{6}\right\},$$

where $f_0 > 0$, and $\gamma > 0$. In embodiments, $f_0$ and y are set such that the periods of the lowest frequency $f_1$ corresponds to the maximum scale of a query scene (e.g. 500 meters), and the highest frequency $f_{d/6}$ approximately corresponds to the desired spatial resolution (e.g. 0.5 meter). When choosing frequency-based encodings, the normalization step is not always necessary.

Returning now to explaining the pipeline of machine learning system 150, the set of tokens $R_i$ and the point tokens $\mathcal{V}_i$ are provided to a feature mixer 140, which transforms these to augmented second image tokens according to $$R'_i = \mathcal{A}(R_i, \mathcal{V}_i) \tag{3}$$

where $\mathcal{A}$ denotes the function performed by the feature mixer 140. More specifically, the point tokens $\mathcal{V}_i$ are provided to a cross attention layer 145 of the feature mixer 140. The cross attention layer 145 is based on the cross attention architecture in the Transformer, which is an attention mechanism that asymmetrically mixes two different embedding sequences. In embodiments, the feature mixer 140 employs a series of transformer decoder blocks, where each block consists of a multi-head self-attention between the image tokens, a multi-head cross-attention layer to inject information from all point tokens into these image tokens, and a multilayer perceptron.

In embodiments, feature mixer 140 is a 3D feature mixer configured for mixing the point tokens $\mathcal{V}_i$ with information relating to the 3D setting depicted in the corresponding second image. The 3D feature mixer may be used particularly for the embodiments for SCR. An embodiment of the feature mixer 140 will be explained below with reference to FIG. 4.

Further in the pipeline, the decoder 170 is provided with the set of first image tokens $R_q$ and the sets of augmented second image tokens $R'_i$. Like for the image encoder, decoder parameters of the decoder 170 are initialized with decoder parameters $\psi$ learned in cross-view completion pre-training. The decoder 170 is configured to employ a cross-attention mechanism for fusing the set of first image tokens $R_q$ with the sets of augmented second image tokens $R'_i$. In more detail, first image tokens $R_q$ form the input of the decoder, while the sets of augmented second image tokens $R'_i$ are provided to at least one cross-attention layer 175. Cross-attention layer 175 is configured similar to cross-attention layer 145. Embodiments of the decoder 170 will be explained below with reference to FIG. 6A.

Output of the last layer of decoder 170 is processed by the prediction head 180 to produce pixel-level prediction data for each pixel of the first image 110. According to embodiments, token features from the last transformer decoder block are reshaped to a dense feature map before being provided to the prediction head 180. The prediction head 180 can be implemented in different manners, e.g. as a simple linear head or as more advanced linear convolution heads, such as DPT (e.g., Ranftl et a. Vision transformers for dense prediction. In ICCV, 2021). Specifically, the token features from the last layer of decoder 170 may be projected to 1024 dimensions using 1×1 convolution, then a sequence of 6 ResNeXT blocks with a PixelShuffle operation every two blocks is applied to increase the resolution while halving the channel dimension. Hence, for a 224×224 input image, a $14^2 \times 1024$ token map is yielded after the initial projection, which is gradually expanded to $28^2 \times 512$, $56^2 \times 256$ and finally $224^2 \times d$ where d is the output dimension.

According to embodiments applying the disclosure to SCR, the pixel-level prediction data may comprise coordinate representations $w_j$ for each pixel j and associated confidence values $\tau_j$. To transform to 3D coordinates, the coordinate representation according to embedding $\phi$ has to be reversed by calculating $\phi^{-1}(w_j)$.

During training of machine-learning system 150, the pixel-level prediction data are employed, along with the dense pixel-level annotations 115 to calculate the loss 190. The loss 190 denotes the value of a loss function, which is also called cost function. The loss function maps alignment with the training goal onto a real number. The loss 190 is based on comparing the pixel-level prediction data with the dense pixel-level annotations 115. According to embodiments, the loss 190 employs a usual regression loss $$\mathcal{L}_{reg}(x, \hat{y}) = |\phi(x) - \hat{y}| \tag{4}$$

where $\hat{y}$ is the output of the prediction head 180, and x are the ground-truth data from the dense pixel-level annotations 115 of the first image 110. Based on the loss $\mathcal{L}_{reg}$, the loss 190 may be calculated as $$\mathcal{L}(x, \hat{y}, \tau) = \tau L_{reg}(x, \hat{y}) - \log \tau \tag{5}$$

The parameter $\tau$ can be interpreted as the confidence of the prediction, because if $\tau$ is low for a given pixel, the corresponding $\mathcal{L}_{reg}$ loss at this location will be down-weighted. The second term of the loss $\mathcal{L}$ incites the model to avoid being under-confident. In practice, $\mathcal{L}$ is calculated by iterating over all pixels of the first image 110 for which the ground-truth x is defined.

The optimization of the loss function is performed by back propagation of the loss value by applying loss gradients that are obtained from the partial derivatives of the loss function with respect to the learnable parameters of the machine learning model 150. At the next iteration, the first machine learning model 130 is provided with another set of images 110 and 120 to generate another value of the loss 190 according to the updated parameters.

A method of training of the machine-learning model 150 will be explained below with reference to FIG. 6A.

Figure 2:
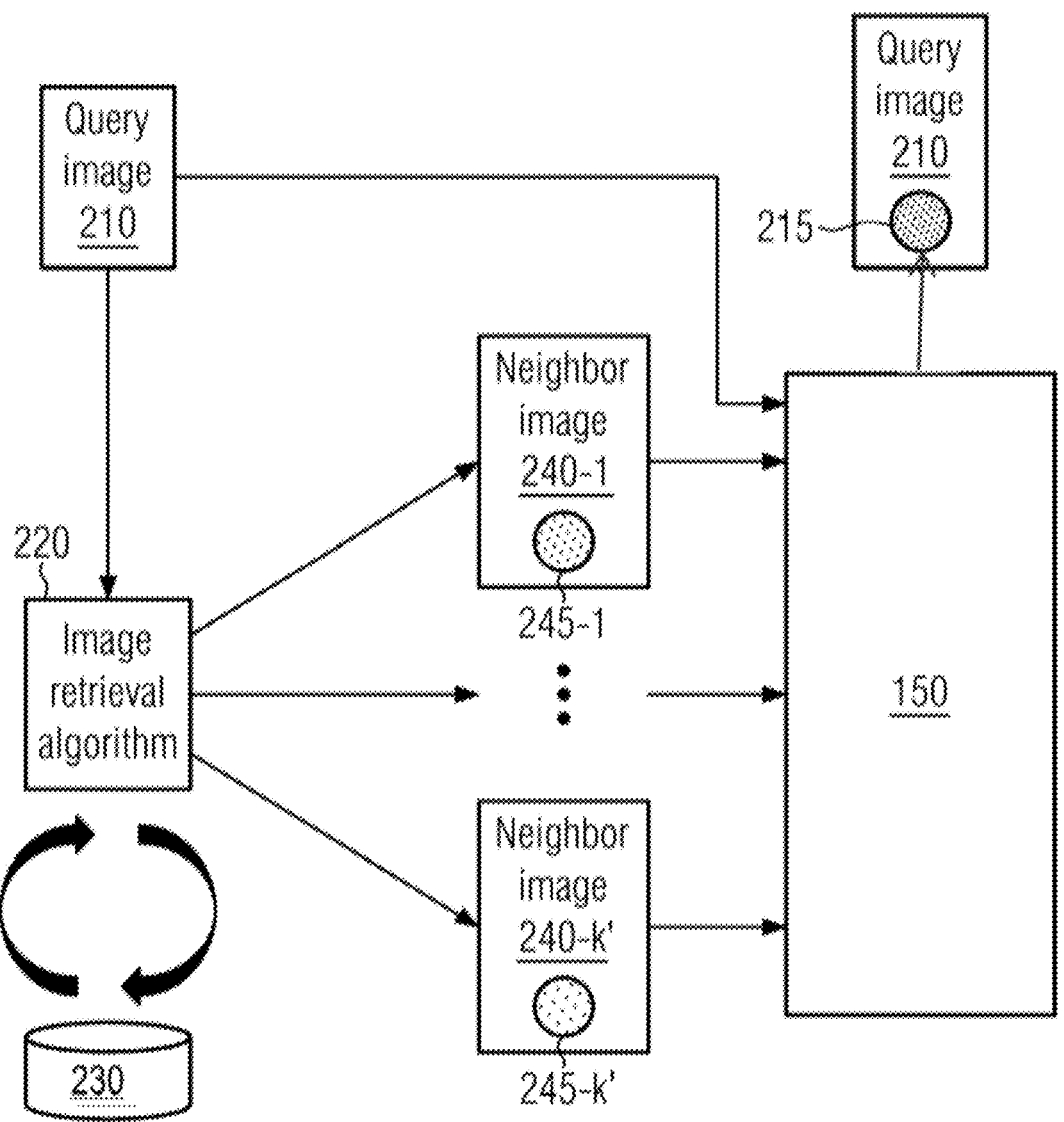
FIG. 2 illustrates application of a trained machine learning model according to an embodiment to a query image for pixel-level prediction for the query image.

FIG. 2 illustrates use of the machine learning system 150 of FIG. 1C at inference time. A query image 210 is provided with the aim of obtaining a dense pixel-level prediction for the query image 210. In a first step, neighbor images 240-1, . . . , 240-k' are retrieved for the query image 210 from a database 230. The neighbor images 240-1, . . . , 240-k' have sparse pixel-level annotations 245-1, . . . , 245-k'. The neighbor images 240-1, . . . , 240-k' may be retrieved using a conventional image retrieval algorithm 220. Such algorithms typically represent each query image $I_q$ as a high-dimensional descriptor $G_{I_q} \in \mathbb{R}^d$, so that the image search for the neighbor images involves finding k nearest neighbors $\{G_{I_i}\}_{i=1, \ldots, k}$, from the database based on the Euclidean distance $\|G_{I_q} - G_{I_i}\|$ in this high-dimensional space.

The number k' of neighbor images may differ from the number of second images k employed during training of the machine learning system 150. According to embodiments, to better cope with the situation that k≠k', varying numbers of second images k may be employed during training, as explained above.

Each of the retrieved neighbor images 245-1, . . . , 245-k', as well as the query image, are provided to the trained machine learning system 150 to be transformed by the encoder 130 to generate respective image tokens, i.e. a set of query image tokens and one or more sets of neighbor image tokens. As explained above with respect to FIG. 1, the sparse pixel-level annotations 245-1, . . . , 245-k' are provided to the feature mixer 140 to generate augmented sets of augmented neighbor image tokens. The sets of augmented neighbor image tokens are provided to the decoder 170 which obtains the query image tokens as input. The prediction head then generates dense pixel-level predictions 215 for the query image 210.

In the embodiments in which the pixel-level annotations are 2D/3D annotations, the prediction hence corresponds to a dense regression of scene coordinates. In these embodiments, the predictions of the machine learning system for the query image 210 may be employed to infer a camera pose of a camera at the time when the camera has captured the query image 210, which corresponds to visual localization of the query image 210. The camera pose involves a camera geolocation and a spatial orientation of the camera. The camera pose can be inferred by employing RANSAC-based off-the-shelf PnP solvers like SQ-PnP (e.g. George Terzakis and Manolis Lourakis. *A consistently fast and globally optimal solution to the perspective-n-point problem.* In ECCV, 2020). Specifically, the PnP (Perspective-n-Point) solver is fed with regressed 3D points $\phi^{-1}(w_j)$ and their corresponding 2D positions in the query image 210. In embodiments, predictions for which the confidence $\tau_j$ is below a certain threshold are ignored. The PnP (Perspective-n-Point) solver then directly outputs the camera pose.

In further embodiments, the predicted 3D coordinates are employed to translate the query into a 3D point cloud to enable 3D reconstruction of the depicted scene. According to further aspects, 3D point clouds corresponding to different query images can be merged into a single large-scale 3D reconstruction. In this manner, a whole quarter of a city can be reconstructed in 3D, merely relying on image data. In further embodiments, the predicted 3D coordinates are applied for human pose estimation, or 6D object pose estimation.

Figure 3:
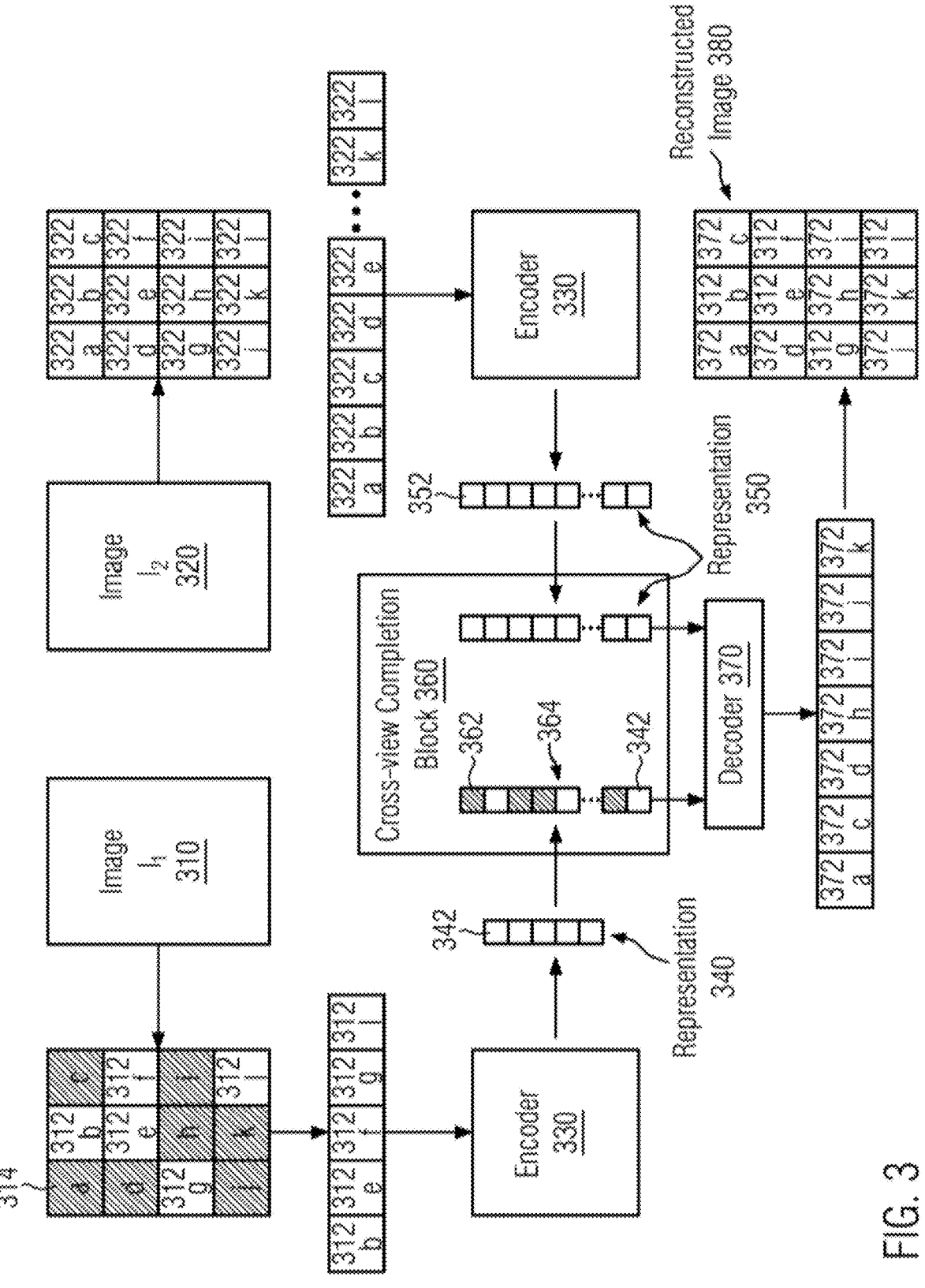
FIG. 3 illustrates cross view completion pre-training of a machine learning model according to disclosed embodiments.

FIG. 3 explains in more detail an embodiment of unsupervised pre-training based on cross-view completion (hereinafter referred to as CroCo). Unsupervised pre-training is similar to the cross-view completion framework described in Weinzaepfel et al. 2022. The CroCo machine learning model is applied to a pair of unannotated images including a first image $I_1$ 310 and a second image $I_2$ 320. The two images depict the same visual content, e.g. a same scene, a same object, a same person, or a same architectural structure, from different viewpoints or under different conditions, e.g. lighting conditions, seasonal conditions, depth of field, focal length, etc. The pixel dimensions of the two images may be equal or may differ from each other.

The first image $I_1$ 310 is split into a set $p_1$ of $N_1$ non-overlapping image patches $$p_1^i \, 312, \, p_1 = \{p_1^1, \ldots, p_1^{N_1}\}.$$

The different patches $$p_1^i \, 312$$

may have a same pixel size, e.g. 16×16, or may differ in pixel size. The patches may not be quadratic, but rectangular. In the same way as the first image $I_1$ 310, the second image $I_2$ 320 is split in a set $p_2$ of $N_2$ non-overlapping patches $$p_2^i \, 322, \, p_2 = \{p_2^1, \ldots, p_2^{N_2}\}.$$

The pixel sizes of patches 312 of the first image $I_1$ 310 and of patches 322 of the second image $I_2$ 320 may be equal or may differ from each other.

A portion of the patches 312 of the set $p_1$ is masked separating the set $p_1$ in a set $$\overline{p}_1 = \{p_1^i | m_i = 1\}$$

of masked patches 314 (i.e. patches a, c, d, h, i, j, and k identified with etching) and a set $$\tilde{p}_1 = \{p_1^i | m_i = 0\}$$

of remaining unmasked patches, where $m_i = 0$ denotes that the patch $$p_1^i$$

is unmasked and $m_i = 1$ denotes that the patch $$p_1^i$$

is masked. In FIG. 3, image $I_1$ 310 is split into 12 patches, which are similarly labeled as patches 322 of image $I_2$ 320. Only the five patches 312 with the labels b, e, f, g and l are unmasked, the remaining seven patches labeled a, c, d, h, i, j and k are masked patches 314.

The encoder 330 is applied to image $I_2$ 320, thereby encoding the set of patches $p_2$ into a representation $\varepsilon_\theta(p_2)$ 350 of the image $I_2$ 320. The same encoder $\varepsilon_B$ 330 is applied to image $I_1$ 310 to independently encode image $I_1$ 310 in a representation 340 of image $I_1$ 310. However, in this case, the encoder 330 is only applied to the set of remaining unmasked patches $\tilde{p}_1$, thereby encoding the set of unmasked patches $\hat{p}_1$ into the representation $\varepsilon_B(\tilde{p}_1)$ 340 of the image $I_2$ 310.

When the encoder 330 is implemented as a ViT (Vision Transformer) encoder, the encoder 330 may consist in a linear projection on the input tokens (the patches 322 of the set $p_2$ or the unmasked patches 312 of the set $\hat{p}_1$) to which sinusoidal positional embeddings (Vaswani et al. "Attention is all you need", In I. Guyon et al., editors, Advances in Neural Information Processing Systems (NeurIPS) 30, pages 5998-6008, Curran Associates, Inc., 2017—hereinafter Vaswani et al. 2017) may be added, followed by a series of transformer blocks, e.g. self-attention followed by an MLP (multilayer perceptron).

Cross-view completion block 360 receives representation $\varepsilon_0(\tilde{p}_1)$ 340 and representation $\varepsilon_\theta(p_2)$ 350. CroCo completion block 360 leaves representation $\varepsilon_B(p_2)$ 350 unaltered and merely forwards it to the decoder 370. Additionally, CroCo block 360 transforms representation $\varepsilon_0(\tilde{p}_1)$ 340 into transformed representation $\varepsilon_0(\tilde{p}_1)'$ 364 by padding representation $\varepsilon_B(\tilde{p}_1)$ 340 with learned patch representations 362 corresponding to the masked patches of image $I_1$ 310 and provides the transformed representation $\varepsilon_0(\tilde{p}_1)'$ 364 to decoder 370.

Decoder 370 decodes transformed representation $\varepsilon_0(\tilde{p}_1)'$ 364 conditioned on $\varepsilon_0(p_2)$ 350 into a reconstruction $\hat{p}_1$ of the set of patches $p_1$, thereby generating a reconstructed image 380 as a patch-wise reconstruction of image $I_1$ 310:

$$\hat{p}_1 = D_\psi(\varepsilon_\theta(\tilde{p}_1)'; \varepsilon_\theta(p_2)) \tag{6}$$

The set of learnable encoder parameters $\theta$, the set of learnable decoder parameters $\psi$, and the parameters of the learned patch representations of transformed representation $\varepsilon_0(\tilde{p}_1)'$ are updated by back-propagation 144 according to a loss 142. In an embodiment, the loss for images $I_1$ and $I_2$ is evaluated as a Mean Square Error loss between the pixels of a reconstructed patch $$\hat{p}_1^i$$

of $\hat{p}_1$ and the corresponding pixels of the corresponding masked patch $$p_1^i$$

of $\bar{p}_1$ averaged over all unmasked patches of $\bar{p}_1$.

After pre-training is completed, parameters $\theta$ of encoder 330 and parameters $\psi$ of decoder 370 are employed to initialize the encoder 130 and decoder 170, respectively.

Figure 4:
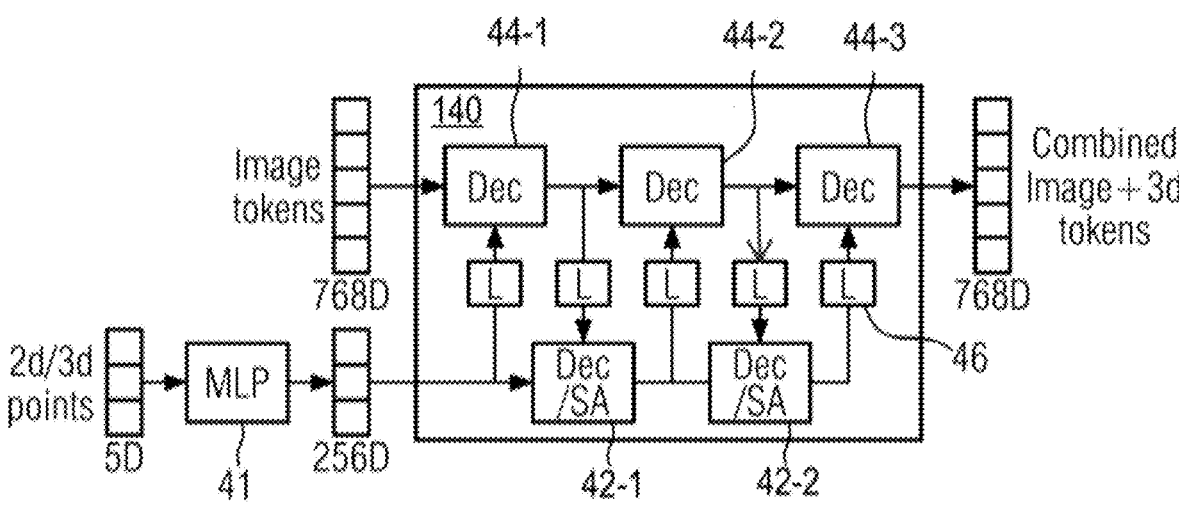
FIG. 4 illustrates a feature mixer employed in disclosed embodiments.

FIG. 4 relates to an embodiment of the feature mixer 140 employed to calculate an augmented representation of the second images as given in Equation (2). In the embodiment of FIG. 4, the image-level decoder blocks 44 are interleaved with novel point-level decoder blocks 42. Each image-level decoder block 44 may be a classical transformer decoder block with self-attention, cross-attention 145, and MLP (multilayer perceptron). The point-level decoder blocks 42 may be classical transformer blocks without self-attention, but still including cross-attention 145. Implementing the point-level decoder blocks 42 without self-attention reduces complexity of the machine learning model 150. To account for the different features sizes between point and image tokens, linear projections 46 are applied, which are shared across the decoder blocks.

In the depicted embodiment of FIG. 4, three image-level decoder blocks 44-1, 44-2, 44-3 are interleaved with two point-level decoder blocks 42-1, 42-2, corresponding to depth three. The image-level decoder blocks 44 being interleaved with the point-level decoder blocks 42 means that output of each point-level decoder blocks 42 is fed, via linear projection 46, to a cross-attention block 145 of an image-level decoder block 44. Correspondingly, output of image-level decoder blocks 44-1 and 44-2 is fed, via linear projection 46, to a cross-attention block 145 of a point-level decoder block 42. In other embodiments, the feature mixer 140 may include four image-level decoder blocks 44 interleaved with three point-level decoder blocks 42, corresponding to depth four. The architecture of the feature mixer 140 is thereby most suitable to address noise such as triangulation noise. Output of the last decoder block, such as decoder block 44-3, indicated as "combined image+3d tokens", corresponds to the augmented second image tokens $R'_i$.

Figure 5:
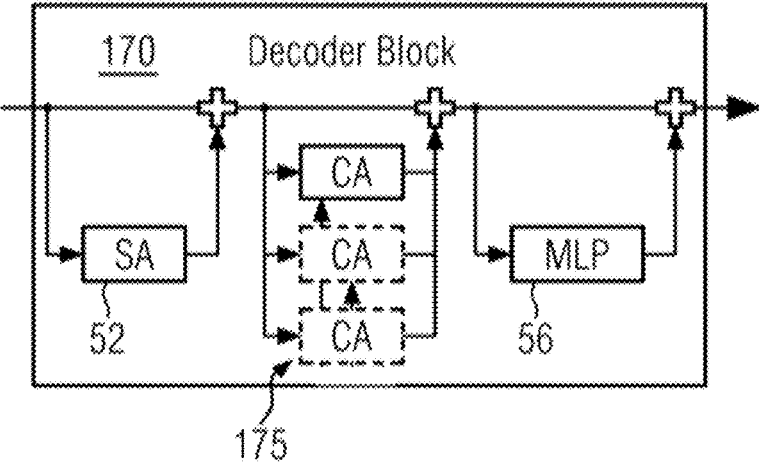
FIG. 5 illustrates a decoder employed in disclosed embodiments.

FIG. 5 illustrates an embodiment of decoder 170. Decoder 170 comprises a pipeline of self-attention 52, at least one cross-attention block 175 for receiving the sets of augmented second image tokens $R'_i$, and an MLP (multilayer perceptron) 56. According to embodiments, decoder 170 is based on a ViT (Vision Transformer) decoder.

According to a first embodiment of the feature mixer 140, the number of parallel cross-attention blocks 175 agrees with the number k of second images, so that each cross-attention block 175 processes a specific $R'_i$. According to this embodiment, the decoder takes care of fusing all K database inputs itself, i.e. directly computes $$\text{Head}(D_\psi(R_q, R'_1, \dots, R'_k)) \tag{7}$$

Here, Head represents the mathematical function of the prediction head 180. This embodiment is denoted as early fusion (EF) in the following. The EF strategy hence applies multi-head cross-attentions for all $R'_i$, i=1, ..., k, in parallel, which may be followed by an averaging operation. This approach generalizes smoothly from the single-image to the multi-image case, According to a second embodiment of the feature mixer 140, the feature mixer 140 comprises a single parallel cross-attention block 175. According to this embodiment, the second images are fed one at a time to the decoder, gathering each time the dense prediction ma s, i.e. computing $$\{\text{Head}(D_\psi(R_q, R'_1)), \dots, \text{Head}(D_\psi(R_q, R'_k))\} \tag{8}$$

This strategy is referred to as late fusion (LF) in the following. Each term $\text{Head}(D_\psi(R_q, R'_i))$ in Equation (8) produces pixel-level prediction data in the form of a dense map of e.g. 3D coordinates along with respective confidences. Then, all resulting dense maps are fused by keeping, for each pixel, the most confident prediction.

On the one hand, applying early fusion is typically more difficult than applying late fusion, because the decoder has to deal with several images at the same time, including potential outliers, with the same network capacity. On the other hand, LF is much more costly computationally, because both decoder and prediction head must be run k times. Therefore, depending on the desired accuracy of the prediction and the computing budget, either EF or LF is advantageous.

FIG. 6A illustrates a method for training a machine learning model for regression on pixel-level information. Step 602 relates to unsupervised pre-training of a first machine learning model, as explained above with reference FIG. 3. It is noted that because images 310 and 320 of FIG. 3 differ in terms of viewpoint and/or lighting conditions, the pre-training forces the encoder-decoder pipeline to implicitly reason about the scene geometry and the relationship between the two views. This primes the encoder 130 and decoder 170 well for pixel-level prediction, wherein the goal is to compare and rearrange 3D information according to the spatial relationship between several different views.

Step 604 relates to constructing training tuples from a database. According to an embodiment, a readily available database is used which leverages SfM to make a dense prediction for as many images as possible available. SfM allows tracking features, such as corner points over multiple images. The feature trajectories over time are then used to reconstruct their 3D positions. However, this approach most often only allows to obtain 2D/3D correspondences for few image features.

Training tuples are generated by employing, as a first image $I_f$ 110, every image in the database, for which a dense depth estimate is available. A shortlist of nearest neighbor images $I_i$ is generated based on image retrieval methods of the prior art, e.g. based on the Euclidean distance $\|G_{I_f} - G_{I_i}\|$ in a high-dimensional image feature space. In embodiments, FIR (e.g. Luo et al. *Aslfeat: Learning local features of accurate shape and localization*. In CVPR, 2020) is employed. To improve the training results, outlier images are included in the shortlist according to embodiments. A predetermined number of easy inliers, hard inliers and hard outliers may be included in the short list to be employed. Easy and hard inliers are determined based on the viewpoint angle between cameras used when capturing the image. Hard outliers are outliers that are most similar to the query image. According to embodiments, the shortlist comprises k=8 images, which were required to include two easy inliers, two hard inliers, and two hard outliers.

In step 606, the parameters of the encoder 130 and the decoder 170 are initialized with the set of encoder and decoder parameters obtained as the result of pre-training 602. It is to be understood that parameters of the cross-attention block 175 are not initialized from the pre-training because pre-training does not involve these blocks.

Steps 608-614 relate to fine-tuning of the machine-learning system, which relies on dense annotations provided with the training data. It is to be understood that steps 608-614 are repeated for each training tuple, or each batch of training tuples. Accordingly, the initialized machine learning model is provided with a training tuple to generate 606, a first set of tokens from the first image of the training tuple. Further, by processing the neighbor images from the shortlist by the second decoder, one or more sets of second image tokens are generated. Each set of second image tokens corresponds to tokens obtained when the encoder processes the respective second image.

In step 608, one or more sets of augmented second image tokens are generated by augmenting each set of second image tokens by the associated sparse 3D coordinate estimates. Step 608 may be implemented by the feature mixer as described above with reference to FIG. 4. In step 612, the first image tokens and the augmented second image tokens are processed by the decoder to generate pixel-level prediction data for the first image of the training tuple. Generating the prediction data may be based on applying a prediction head. Based on comparing the generated pixel-level prediction data with the dense 3D coordinate estimates available for the query image, a value of a loss function may be calculated, e.g. according to Equation (5).

In step 614, the machine learning model is fine-tuned employing a usual back-propagation algorithm for the determined loss. Fine-tuning the machine-learning model 150 comprises adjusting encoder parameters θ, parameters of the pixel annotation encoder 135, parameters of the feature mixer 140, decoder parameters $7p$, and parameters of the prediction head 180.

The disclosed machine learning model 150 was implemented employing ViT (Vision Transformer) encoders and decoders. For fine-tuning, the datasets MegaDepth (Li and Snavely: *MegaDepth: Learning Single-View Depth Prediction from Internet Photos*. In CVPR, 2018), ARKitScenes (Baruch et al. *ARK-itscenes—a diverse real-world dataset for 3d indoor scene understanding using mobile RGB-d data*. In: NeurIPS, 2021), HM3D (Kumar et al. *Habitat-Matterport 3D Dataset (HM3D)*: 1000 *Large-scale 3D Environments for Embodied AI*. In: NeurIPS datasets and benchmarks, 2021), ScanNet (Dai et al. ScanNet: Richly-annotated 3D Reconstructions of Indoor Scenes. In: CVPR, 2017), Replica (Straub et al. The Replica dataset: A digital replica of indoor spaces. arXiv:1906.05797, 2019), and ReplicaCAD (Szot et al. Habitat 2.0: Training Home Assistants to Rearrange their Habitat, In: NeurIPS, 2021) were employed. These datasets comprise dense coordinate estimates as well as camera poses, so that the machine learning model 150 can be trained in a fully supervised manner.

TABLE 1

| step | Res | #img | LR schedule | #epochs | Loss | Frozen |
|---|---|---|---|---|---|---|
| I | 224 | 1 + 1 | fixed lr 1e-4 | 150 | $L_{CroCo}$ | — |
| II | 224 | 1 + 1 | fixed lr 1e-4 | 100 | $L_{SCR}$ | E |
| III | 512 | 1 + 1 | cosine decay | 20 | $L_{SCR}$ | — |
| IV | 512 | 1 + 8 | cosine decay | 20 | $L_{SCR}$ | E, M |

Training the full machine learning model 150 from scratch in would be very slow. Instead, the machine learning model 150 may be trained in steps according to Table 1, gradually increasing the image resolution and the number of retrieved images. In step I, which corresponds to unsupervised pre-training 602, the weights of the encoder and the decoder are trained with cross-view completion pre-training. From step II onward, the machine learning model 150 includes the feature mixer 140 and the prediction head 180. The loss from Equation (5) is used to jointly train the feature mixer 140, the decoder 170 and the prediction head 180 while freezing the parameters of the encoder 130. In the training, the training tuples include a query image and a single database image, each of size 224×224 is employed. During step III, a higher image resolution of 512×384 pixels is employed. During phase III, all components are fine-tuned while still using only one database image. The results indicate that fine-tuning the encoder while still changing the resolution of the input images is important.

During step IV, the decoder 170 and the prediction head 180 are fine-tuned while freezing the encoder 130 and the feature mixer 140, and using images database images for a query image. Further, for robustness against triangulation noise, 5% of the sparse 3D annotations are augmented with simulated depth noise. Also, random geometric 3D transformations are applied to scene coordinates for better train for generalization.

For evaluating the disclosed systems, the dataset from Cambridge-Landmarks (Kendall et al. cited above), 7 Scenes (Shotton et al. cited above), and Aachen Day-Night v1.1 (Sattler et al. *Benchmarking 6dof outdoor visual localization in changing conditions.* In: CVPR, 2018) were employed. For Cambridge and 7-Scenes, the median translation error is reported in Tables 1 to 6. For the Aachen dataset, the percentage of successfully localized images within three thresholds: (0.25 m, 2°), (0.5 m, 5°) and (5 m, 10°) is reported in Tables 1 to 6.

TABLE 2

| Point encoding | Aug | Camb. ↓ | 7 scenes ↓ | Aachen-Night ↑ |
|---|---|---|---|---|
| $(x, y, z) \in \mathbb{R}^3$ | | 1.69 | 0.11 | 0.0/0.0/0.0 |
| $(x, y, z) \in \mathbb{R}^3$ | ✓ | 14.43 | 2.89 | 0.0/2.1/44.5 |
| $[\phi(\cdot) \in [-1, 1]^{24}$ | ✓ | 0.47 | 0.11 | 22.0/46.6/89.5] |
| $[\phi(\cdot) \in [-1, 1]^{36}$ | ✓ | 0.43 | 0.11 | 21.5/47.1/90.6] |
| $[\phi(\cdot) \in [-1, 1]^{48}$ | ✓ | 0.55 | 0.11 | 23.6/40.8/87.4] |

For the ablations, step III of the training according to Table 1 is performed with 224×224 images as well, and step IV is skipped. In Table 2, the impact of different point encoding options is studied. Direct coordinate regression is only successful when the training and the test output distributions are aligned. This is the case for small scenes with zero-centered spaces like 7-scenes, or Cambridge to a lesser extent. For larger scenes like these included in the Aachen dataset, direct regression fails. One way to mitigate this issue would be to augment 3D coordinates at training time, using random translations for instance. Such augmentations improve the performance for Aachen-Night, but at the same time the performance overall strongly degrades for Cambridge and 7-Scenes. In contrast, the cosine-based encoding according to Equation (2) effectively deals with both indoor and outdoor scenes in any coordinate ranges. The results of Table 2 also imply that use of 6 frequencies is optimal.

TABLE 3

| Frozen | Camb. ↓ | 7 scenes ↓ | Aachen-Night ↑ |
|---|---|---|---|
| — | 0.54 | 0.14 | 18.3/37.7/85.3 |
| Encoder | 0.43 | 0.11 | 21.5/47.1/90.6 |

Table 3 shows that freezing the encoder during step II is highly beneficial. An explanation for this is that pre-training essentially learns to compare and match images. The employed training set is larger than the fine-tuning data. Hence, the performance of the encoder is at risk of being degraded by fine-tuning.

TABLE 4

| 3D-mixer | Camb. ↓ | 7 scenes ↓ | Aachen-Night ↑ |
|---|---|---|---|
| Simple, depth = 1 | 0.66 | 0.11 | 16.8/40.8/87.4 |
| Simple, depth = 2 | 0.61 | 0.08 | 20.4/42.4/88.0 |
| Simple, depth = 4 | 0.55 | 0.10 | 22.0/39.3/89.5 |
| Alternating, depth = 1 | 0.56 | 0.11 | 18.8/41.4/88.0 |
| Alternating, depth = 2 | 0.46 | 0.11 | 22.5/46.1/88.5 |
| Alternating, depth = 4 | 0.43 | 0.11 | 21.5/47.1/90.6 |

Table 4 reproduces results for different architectures for the feature mixer 140. The interleaved decoder architecture according to FIG. 4 is compared with a simpler architecture (denoted as "simple") composed of a sequence of image level decoder blocks with varying depth. Table 4 proves that substantial gain is achieved with the interleaved decoder according to FIG. 4.

TABLE 5

| Regression head | Channels | Camb. ↓ | 7 scenes ↓ | Aachen-Night ↑ |
|---|---|---|---|---|
| Linear | x, y, z, τ | 0.94 | 0.12 | 11.0/31.9/84.3 |
| ConvNeXT | x y zτ | 0.64 | 0.11 | 19.9/39.8/88.0 |
| ConvNeXT | x y z, τ | 0.61 | 0.11 | 15.7/41.4/87.4 |
| ConvNeXT | x, y, z, τ | 0.43 | 0.11 | 21.5/47.1/90.6 |

In Table 5, architectures for the prediction head 180 are studied. The prediction head 180 is tasked with predicting three spatial components and a confidence. These four components have no reason to be correlated. Predicting them jointly could be detrimental when the network is inclined to learn imaginary correlations. In Table 5, the first row is a baseline simple linear head, which is the same as four independent linear heads, while rows 2-4 employ a more advanced prediction head architecture. The second row relates to regressing the four components jointly. The third row relates to an implementation regressing the spatial and the confidence components separately, so that a prediction head with shared weight for all spatial components x, y, and z, and a separate prediction head for the confidence is employed. The fourth row relates to an implementation with again four independent heads. Table 5 implies that the option according to the fourth row yields the best performance, while the linear heads according to the first row yields the worst results. This confirms the intuition that enforcing decorrelation between all components is strongly beneficial for the generalization capability of the machine learning model.

TABLE 6

| Train res. | Test res. | Camb. ↓ | 7 scenes ↓ | Aachen-Night ↑ |
|---|---|---|---|---|
| 224 × 224 | 224 × 224 | 0.43 | 0.11 | 21.5/47.1/90.6 |
| 512 × 384 | 512 × 384 | 0.21 | 0.10 | 39.3/63.4/94.8 |
| 512 × 384 | 640 × 480 | 0.20 | 0.07 | 45.5/68.6/94.8 |
| 512 × 384 | 768 × 512 | 0.24 | 0.07 | 45.5/70.2/93.7 |

Table 6 reports the impact of training and test image resolutions on the performance of the disclosed machine learning systems. Surprisingly, the best results are achieved when using during testing a higher image resolution than during training.

Figure 7:
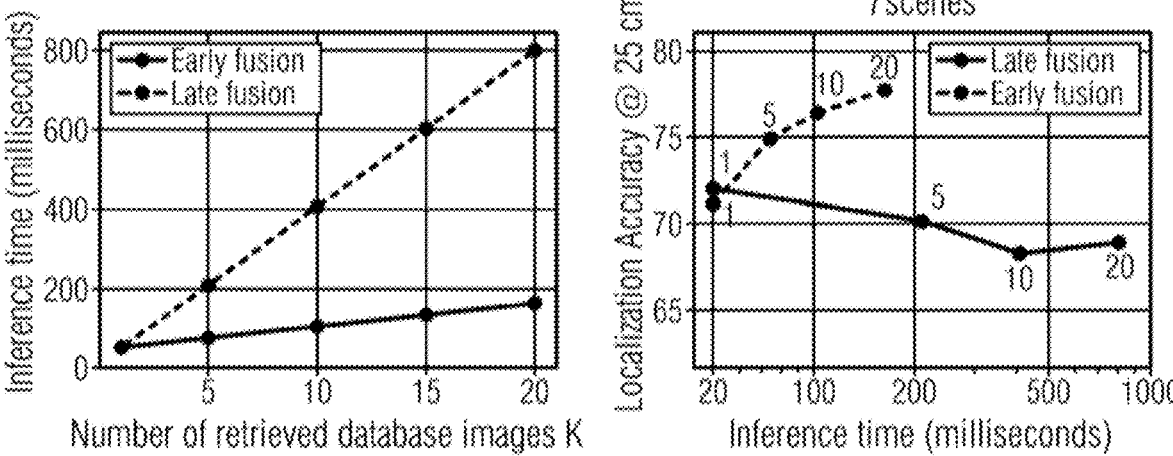
FIG. 7 reproduces results for inference time versus localization accuracy for disclosed embodiments.
Figure 7:
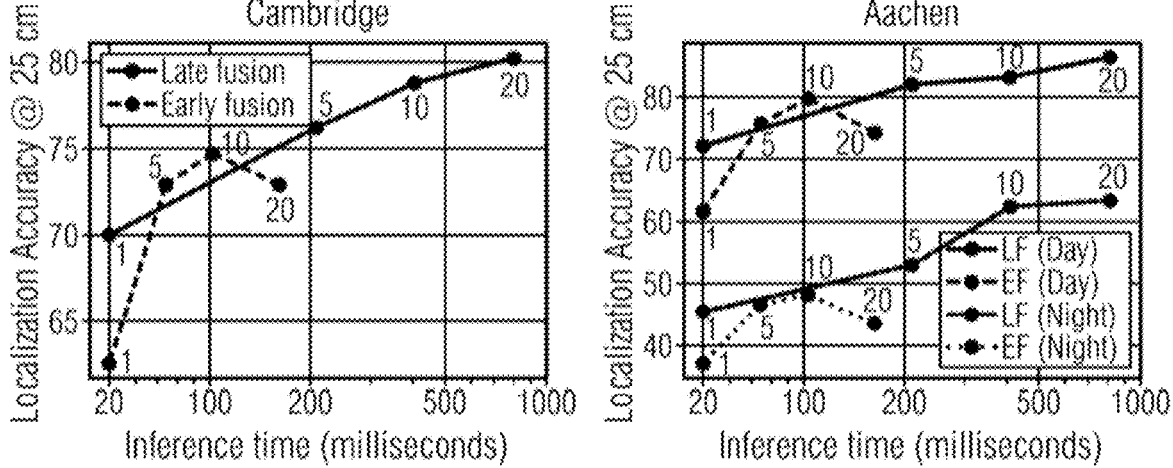

Further experiments were performed for the two different embodiments for handling multiple database images. In FIG. 7, the top left panel plots inference time as a function of the shortlist size K for the two fusion strategies explained above with reference to FIG. 5. Timings are measured on a A100 GPU and correspond to the query going through the encoder, decoder and regression head, i.e., without the encoding of the database images and their coordinates, as the latter can be computed offline and saved. The top left panel shows inference time as a function of the shortlist size k.

The other panels display datapoints of localization accuracy and inference time for varying shortlist size k (indicated next to each datapoint). The localization accuracy is averaged for each dataset, except for Aachen where results or Aachen-Day and Aachen-Night are shown separately. FIG. 7 entails that on the Cambridge and the Aachen datasets, late fusion outperforms early fusion even though early fusion has benefited from more training epochs by reaching step IV instead of stopping at step Ill. This is an unexpected outcome because late fusion is a simpler task for the decoder. The performance of early fusion starts deteriorating beyond 10 database images, which is approximately the point where most outliers start to appear in the retrieval short list. Because early fusion is trained with eight database images, this may cause a discrepancy and hurt generalization. Also, the results on the 7 Scenes database indicates that this is not always true. In all cases, late fusion is much slower than early fusion. Hence, early fusion always manages to match or outperform late fusion for an equivalent runtime budget.

Figure 9:
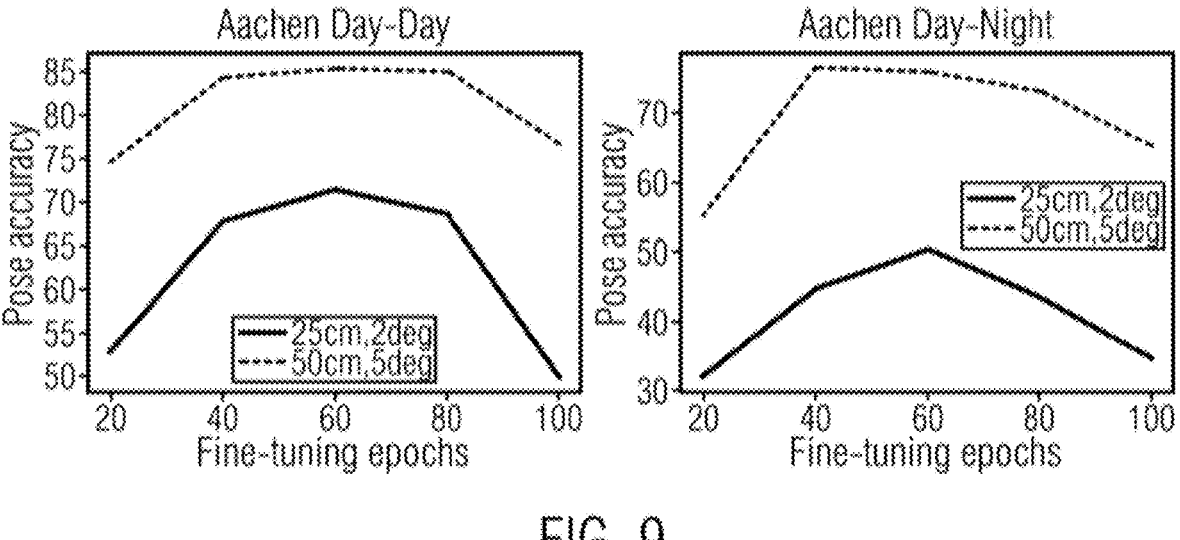
FIG. 9 reproduces plots of the localization error versus the number of fine-tuning epochs of a machine-learning system of an embodiment.

FIG. 9 shows the impact of the number of fine-tuning epochs in the final performance, studied for training with the Aachen Day setting when querying with Aachen day images (left plot). The right plot shows a similar situation for training with the Aachen Day setting but querying with Aachen night images. The results of FIG. 9 imply that a peak in performance is achieved for around 80 epochs of fine-tuning.

Figure 10:
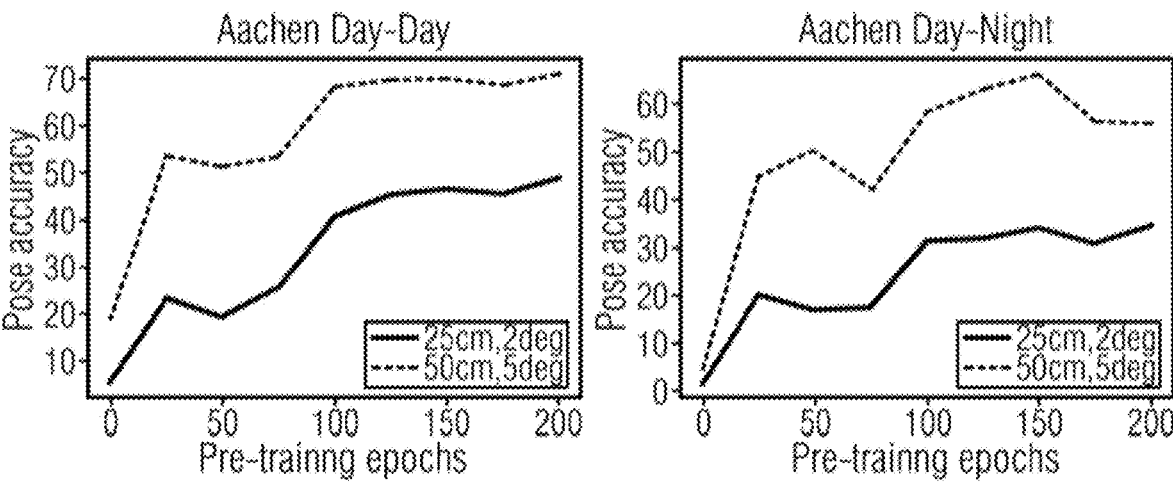
FIG. 10 reproduces plots of the localization error versus the number of pre-training epochs of a machine-learning system of an embodiment.

FIG. 10 shows the impact of the number of pre-training epochs in the final performance, studied for training with the Aachen Day setting when querying with Aachen day images (left plot). The right plot shows a similar situation for training with the Aachen Day setting but querying with Aachen night images. As expected, performance steadily increases with the pre-training epochs but starts to plateau after approximately 100 pre-training epochs.

In Tables 7-9, results for comparing the disclosed machine learning system with the state of the art for visual localization on an indoor dataset (7 Scenes) and two outdoor datasets (Cambridge, Aachen) are displayed. Tables 7-9 show how the disclosed machine learning system 150, indicated as SACReg, with early fusion on the one hand, and with late fusion, on the other hand, compares with methods of the prior art. It should be noted that the machine-learning model is evaluated as-is on the various visual localization benchmarks, without any further fine-tuning. For the Aachen dataset in Table 7, the percentage of successfully localized images within three thresholds: (0.25 m, 2°), (0.5 m, 5°) and (5 m, 10°) is reported. For Cambridge and 7-Scenes, in Tables 8 and 9, the median translation error (m) and median angular (°) error is reported.

TABLE 7

Comparison on Aachen dataset

| | Method | Aachen-Day ↑ | Aachen-Night ↑ |
|---|---|---|---|
| Kpts | Active Search [43] | 57.3/83.7/96.6 | 28.6/37.8/51.0 |
| | HLoc ∥ 42] | 89.6/95.4/98.8 | 86.7/93.9/100 |
| Learning- | DSAC [6] | 0.4/2.4/34.0 | — |
| based | ESAC (50 experts) [8] | 42.6/59.6/75.5 | — |
| | HSCNet∥ 29] | 65.5/77.3/88.8 | 22.4/38.8/54.1 |
| | NeuMap [55] | 76.2/88.5/95.5 | 37.8/62.2/87.8 |
| | SACReg, EF, K 8 | 79.6/89.6/98.9 | 51.3/75.4/96.9 |
| | SACReg, LF, K 20 | 86.2/93.8/99.6 | 63.4/86.9/100.0 |

The prior art comparison includes Active Search (Sattler et al. cited above), HLoc (Revaud et al. *Improving zernike moments comparison for optimal similarity and rotation angle retrieval*, IEEE trans. PAMI, 2008), DSAC (Brachmann et al. cited above), ESAC with 50 experts (Brachmann and Rother 2019 cited above), HSCNet (Xiaotian Li, *Hierarchical scene coordinate classification and regression for visual localization*. In CVPR, 2020), and NeuMaps (Tang et al. 2022 cited above).

TABLE 8

Comparison on Cambridge dataset

| | | ShopFacade ↓ | OldHospital ↓ | College ↓ | Church ↓ | Court ↓ |
|---|---|---|---|---|---|---|
| Kpts | Active search [43] | 0.12, 1.12 | 0.52, 1.12 | 0.57, 0.70 | 0.22, 0.62 | 1.20, 0.60 |
| | HLoc [42] | 0.04, 0.20 | 0.15, 0.3 | 0.12, 0.20 | 0.07, 0.21 | 0.11, 0.16 |
| Learning- | DSAC++ [7] | 0.06, 0.3 | 0.20, 0.3 | 0.18, 0.3 | 0.13, 0.4 | 0.20, 0.4 |
| based | DSAC* [9] | 0.05, 0.3 | 0.21, 0.4 | 0.15, 0.3 | 0.13, 0.4 | 0.49, 0.3 |
| | KFNet [75] | 0.05, 0.35 | 0.18, 0.28 | 0.16, 0.27 | 0.12, 0.35 | 0.42, 0.21 |
| | HSCNet [29] | 0.06, 0.3 | 0.19, 0.3 | 0.18, 0.3 | 0.09, 0.3 | 0.28, 0.2 |
| | SANet [71] | 0.1, 0.47 | 0.32, 0.53 | 0.32, 0.54 | 0.16, 0.57 | 3.28, 1.95 |
| | DSM [54] | 0.06, 0.3 | 0.23, 0.38 | 0.19, 0.35 | 0.11, 0.34 | 0.19, 0.43 |
| | SC-wLS [69] | 0.11, 0.7 | 0.42, 1.7 | 0.14, 0.6 | 0.39, 1.3 | 1.64, 0.9 |
| | NeuMaps [55] | 0.06, 0.25 | 0.19, 0.36 | 0.14, 0.19 | 0.17, 0.53 | 0.06, 0.1 |
| | SACReg, EF, K = 8 | 0.06, 0.32 | 0.18, 0.32 | 0.14, 0.25 | 0.07, 0.23 | 0.18, 0.12 |
| | SACReg, LF, K = 20 | 0.05, 0.3 | 0.13, 0.29 | 0.12, 0.18 | 0.06, 0.21 | 0.13, 0.09 |

TABLE 9

Comparison on 7 Scenes dataset

| | | Chess ↓ | Fire ↓ | Heads ↓ | Office ↓ | Pumpkin ↓ | Kitchen ↓ | Stairs ↓ |
|---|---|---|---|---|---|---|---|---|
| Kpts | Active search [43] | 0.04, 1.96 | 0.03, 1.53 | 0.02, 1.45 | 0.09, 3.61 | 0.08, 3.10 | 0.07, 3.37 | 0.03, 2.22 |
| | HLoc [42] | 0.02, 0.79 | 0.02, 0.87 | 0.02, 0.92 | 0.03, 0.91 | 0.05, 1.12 | 0.04, 1.25 | 0.06, 1.62 |
| Learning- | RelocNet [2] | 0.12, 4.14 | 0.26, 10.4 | 0.14, 10.5 | 0.18, 5.32 | 0.26, 4.17 | 0.23, 5.08 | 0.28, 7.53 |
| based | CamNet [14] | 0.04, 1.73 | 0.03, 1.74 | 0.05, 1.98 | 0.04, 1.62 | 0.04, 1.64 | 0.04, 1.63 | 0.04, 1.51 |
| | DSAC++ [7] | 0.02, 0.5 | 0.02, 0.9 | 0.01, 0.8 | 0.03, 0.7 | 0.04, 1.1 | 0.04, 1.1 | 0.09, 2.6 |
| | KFNet [75] | 0.02, 0.65 | 0.02, 0.9 | 0.01, 0.82 | 0.03, 0.69 | 0.04, 1.02 | 0.04, 1.16 | 0.03, 0.94 |
| | HSCNet [29] | 0.02, 0.7 | 0.02, 0.9 | 0.01, 0.9 | 0.03, 0.8 | 0.04, 1.0 | 0.04, 1.2 | 0.03, 0.8 |
| | SANet [71] | 0.03, 0.88 | 0.03, 1.12 | 0.02, 1.48 | 0.03, 1.00 | 0.04, 1.21 | 0.04, 1.40 | 0.16, 4.59 |
| | DSM [54] | 0.02, 0.68 | 0.02, 0.80 | 0.01, 0.8 | 0.03, 0.78 | 0.04, 1.11 | 0.03, 1.11 | 0.04, 1.16 |
| | SC-wLS [69] | 0.03, 0.76 | 0.05, 1.09 | 0.03, 1.92 | 0.06, 0.86 | 0.08, 1.27 | 0.09, 1.43 | 0.12, 2.80 |
| | NeuMaps [55] | 0.02, 0.81 | 0.03, 1.11 | 0.02, 1.17 | 0.03, 0.98 | 0.04, 1.11 | 0.04, 1.33 | 0.04, 1.12 |

TABLE 9-continued

| | | | Comparison on 7 Scenes dataset | | | | |
|---|---|---|---|---|---|---|---|
| | Chess ↓ | Fire ↓ | Heads ↓ | Office ↓ | Pumpkin ↓ | Kitchen ↓ | Stairs ↓ |
| SACReg, EF, K = 8 | 0.03, 0.89 | 0.03, 1.15 | 0.02, 1.07 | 0.03, 1.08 | 0.05, 1.32 | 0.04, 1.36 | 0.10, 2.45 |
| SACReg, LF, K = 20 | 0.03, 1.03 | 0.04, 1.52 | 0.02, 1.18 | 0.03, 1.47 | 0.07, 1.78 | 0.06, 1.84 | 0.07, 1.67 |

The prior art comparison in Tables 8 and 9 further comprises DSAC++ (Eric Brachmann and Carsten Rother 2018 cited above), DSAC* (Eric Brachmann and Carsten Rother: *Visual camera relocalization from RGB and RGB-D images using DSAC*, IEEE Trans. PAMI, 2021), HSCNet (Li, et al. *Hierarchical scene coordinate classification and regression for visual localization*. In CVPR, 2020), SANet (Yang et al. cited above), DSM (Tang et. al 2021) and SC-wLS (Xie et al. *Deepmatcher: A deep transformer-based network for robust and accurate local feature matching*, arXiv:2301.02993, 2023.)

As Tables 7-9 show, the disclosed late fusion model outperforms the early fusion model on Aachen-Day-Night and Cambridge and performs on par on 7-Scenes. On the indoor 7-Scenes, the disclosed models obtain similar or slightly worse performance compared to other approaches, but overall still perform well with a median error of a few centimeters.

On the outdoor datasets (Aachen, Cambridge), the disclosed machine learning models strongly outperform other learning-based systems, and, in particular, other scene-specific or scene-agnostic coordinate regression approaches. The method even sets a new state of the art on the Cambridge dataset, which is remarkable because, in contrast to the approaches of the state of the art, the approach is not fine-tuned on the Cambridge dataset.

Figure 8:
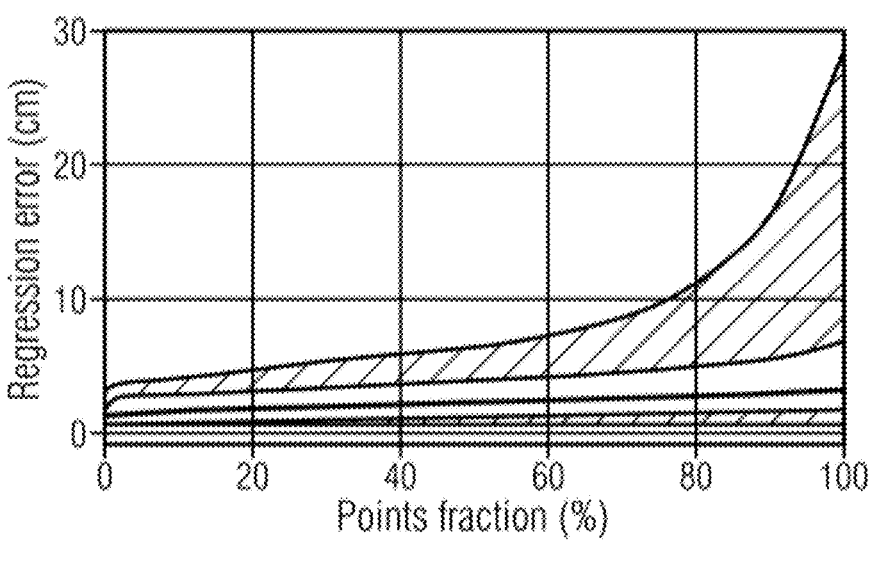
FIG. 8 reproduces localization error distributions obtained for disclosed embodiments.
Figure 8:
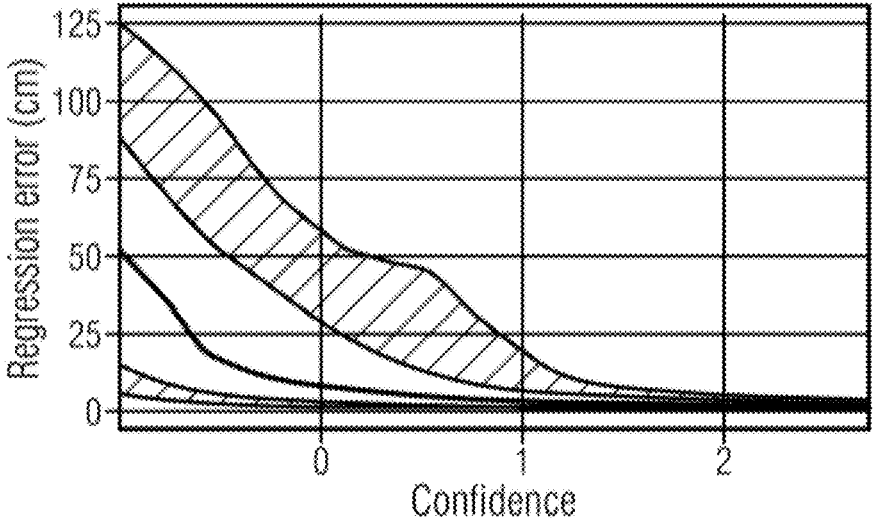

Finally, regression performance of the disclosed systems is studied for the dataset 7-Scenes, which provides dense ground truth annotations. Using a shortlist size of k=8, coordinates and corresponding confidences for each pixel of the test images are generated. A median error of 3.2 cm and a mean error of 11.1 cm are obtained. FIG. 8 shows results for regression performance of the disclosed systems for 7-Scenes. The top plot shows the error distribution with the median (thick line) and distributions for the first and last quartiles (empty area around median line), and first and last deciles (hatched areas). The bottom plot validates that confidence predictions are meaningful, as errors tends to get smaller when the confidence increases. Confidence can thus be used as a proxy to filter out regions where errors are likely to be large.

Figure 11:
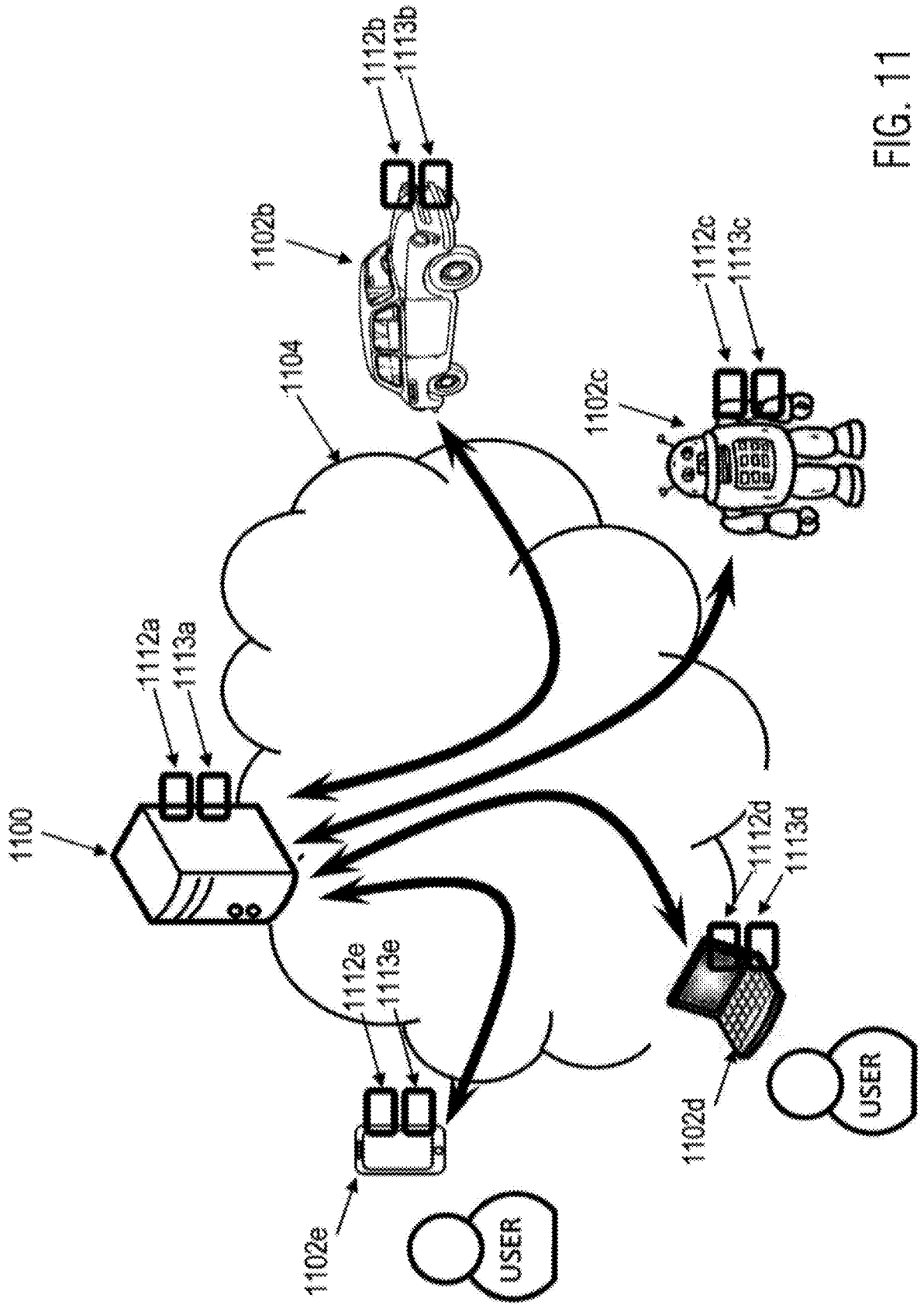
FIG. 11 an example architecture in which the disclosed systems and methods may be performed.

The above-mentioned methods and embodiments may be implemented within an architecture such as illustrated in FIG. 11, which comprises server 1100 and one or more client devices 1102 that communicate over a network 1104 (which may be wireless and/or wired) such as the Internet for data exchange. Server 1100 and the client devices 1102 include a data processor 1112 and memory 1113 such as a hard disk. The client devices 1102 may be any device that communicates with server 1100, including autonomous vehicle 1102b, robot 1102c, computer 1102d, or cell phone 1102e. For example, the trained machine learning model 150 may be stored in sever memory 1113a. Client device 1102 may capture an image at an unknown location and submit this image to server 1100.

The server supplies the image as a query image to the trained machine learning model 150 and obtains prediction data. The server provides the prediction data to the client 1102, which can employ the prediction data for visual localization, object tracking or depth estimates. Alternatively, the trained machine learning model 150 may be stored in client memory 1113b-e and used by the client 1102 locally to generate prediction data for a query image.

FIG. 12 shows results for the method performed on three example images from the Aachen-Day dataset. The first three columns of FIG. 12 are neighbor images with sparse 2D/3D annotations obtained from SfM (Structure from Motion) methods. Only the first 3 reference images (out of K=8) are depicted. The 2D locations of the sparse 2D/3D annotations are indicated as scattered pixels. The scattered pixels illustrate the list (i,j,a) explained above. The pixels may visualize the associated 3D coordinate by using RGB colors with R=x, G=y, B=z. For the query images (fourth column) the disclosed model predicts dense coordinates (fifth column) and confidences (last column). The predicted dense 3D coordinates may be visualized employing the same RGB scheme as for the scattered pixels in the neighbor images. Further, for visualization purposes, areas with a confidence $\tau \leq \exp(0)$ are not displayed.

Figure 13:
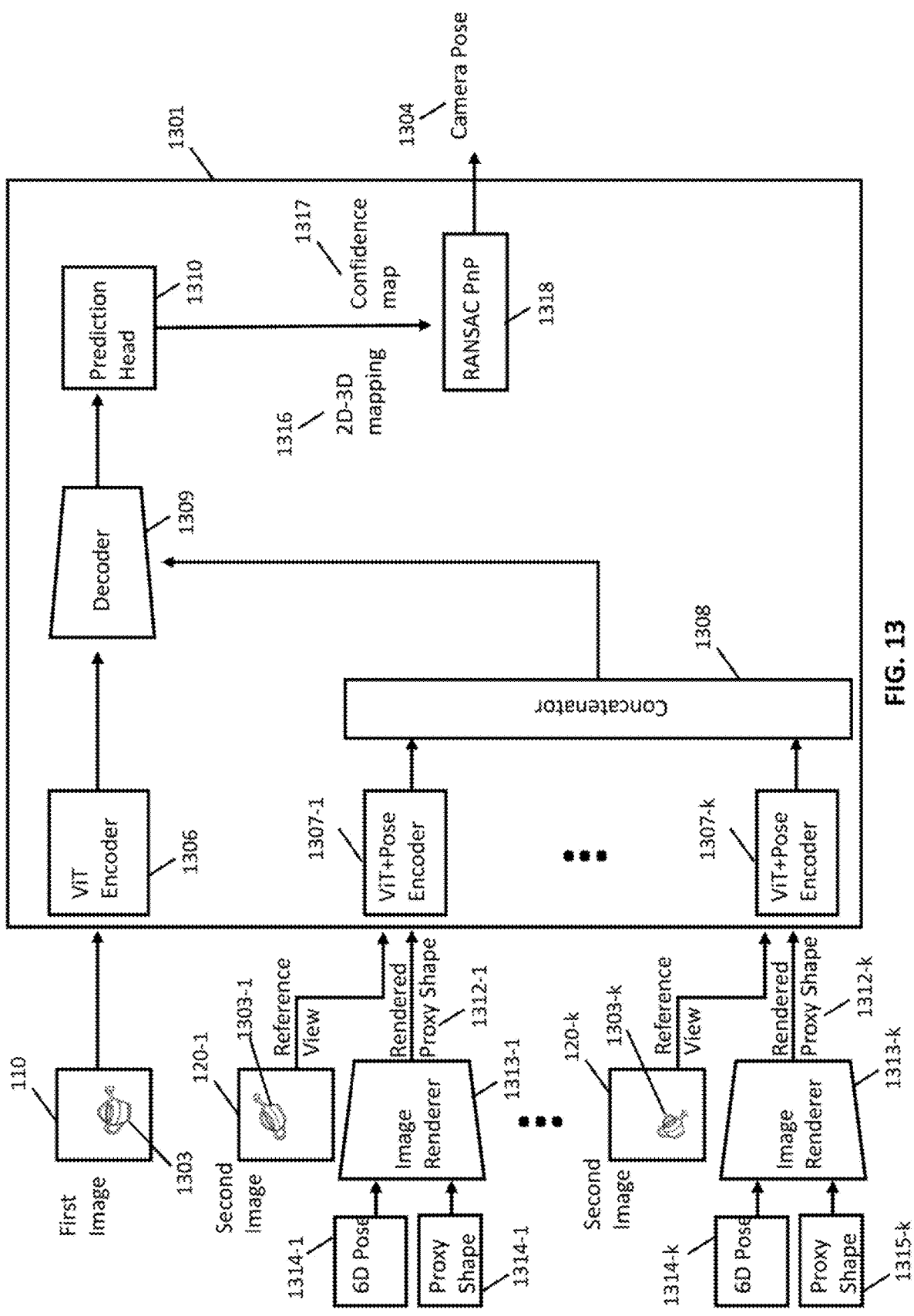
FIG. 13 illustrates an overview of an embodiment of the machine learning model shown in FIGS. 1A and 1B for estimating a pose of a target object from a single image using a proxy shape.

FIG. 13 illustrates an overview of an embodiment of the machine learning model 148 shown in FIGS. 1A and 1B for estimating using machine learning model 1301 a camera pose 1304 of a target object 1303 from a single image 110 using a proxy shape 1315, where 3D scene points in a pointmap are mapped to 2D pixels in reference images 120 that are associated with the proxy shape. Existing learning-based methods for object pose estimation lack the capability to generalize to new object categories at test time, which severely hinders their practicability and scalability. Some recent attempts have been made to solve this issue, but these approaches still require accurate 3D data of the object surface at both train and test time, which is arguably hard to scale as well. The embodiment shown in FIG. 13 sets forth a novel approach that can estimate the pose of unseen objects using minimum input, i.e., a set of reference images annotated with the corresponding object pose.

In contrast to existing state-of-the-art approaches built using task-specific modules, the model 1301 in FIG. 13 is based on a transformer architecture, which is efficient both at training and test time (i.e., inference time). The model 1301 is trained on a diverse set of datasets and shows promising results. Furthermore, extensive ablations enable the determination of good practices with this type of architecture. Moreover, the transformer architecture is one way to implement a self-attention mechanism. Transformer architecture as used herein is described in Ashish Vaswani et al 2017, which is incorporated herein by reference. Additional information regarding the transformer architecture can be found in U.S. Pat. No. 10,452,978, the content of which is incorporated herein by reference. Alternate attention-based architectures include recurrent, graph and memory-augmented neural networks. Being able to estimate the pose of any object is a requirement for all tasks involving interactions with objects. The past decade has seen a surge of research in 3D vision, with potential applications ranging from robotics to VR/AR (Virtual Reality/Augmented Reality). These applications require pose estimators that are accurate, robust and scalable. What's more, many applications seek to utilize cheap sensors for that, such as RGB cameras. In this context, the problem of object pose estimation is addressed by the embodiment shown in FIG. 13 by extracting from a single image (or first image) 110 the 6D pose of a target object 1303 relative to the camera pose (i.e., the 3D translation and 3D rotation of the target object 1303).

Object pose estimation is a long-studied research topic for which there is a large body of literature. Earlier approaches were holistic, based on sliding-window template-based matching or utilized local feature matching. In all cases, these methods were heavily handcrafted and yielded unsatisfactory results regarding robustness and accuracy. With the advent of deep learning, a new training-based paradigm emerged for object pose estimation, the idea being to let a deep network end-to-end predict the pose of an object from an image, given sufficient training data (images of the same object in various poses). While significantly improving in robustness and accuracy, these methods have the disadvantage of being model-specific: they can only cope with objects seen during training. While some works have broaden the model scope to object categories rather than object instances, the trained model is still only suitable for objects or categories seen during training.

To remedy this shortcoming, recent learning-based methods that can generalize to unseen objects, denoted as "one-shot", have been proposed. In practice, however, they rely on 3D models, require video sequences or additional depth maps at test time. All in all, these requirements severely hinder the practicality and scalability of current pose estimation methods.

The model 1301, which addresses the limitations of such previous methods for object pose estimation, is illustrated in FIG. 13. More specifically, the machine learning model 1301 may be used to estimate a camera pose 1304 of a target object 1303 from a single first image 110, denoted as query image. Moreover, as illustrated in FIG. 13, the model 1301 takes as input a query image 110 and a set of K reference views (i.e., second images or reference images) 120 of the same object as the target object 1303 but seen under different viewpoints (annotated with 6D pose information–3D position+3D rotation). In one embodiment, a vision transformer (ViT) encoder 1306 is used to encode first image 110, and a ViT+Pose encoder 1307 is first used to encode second images 120. In the case of a reference images 120, a corresponding object pose (i.e., rendered proxy shape) 1312 is jointly encoded with the second image 120 with ViT+Pose encoder 1307. The rendered proxy shape 1312 for a given 6D pose 1314 and proxy shape 1315 (e.g., cuboid) is generated by image renderer 1313. After concatenating the output of the ViT+Pose encoders 1307 with concatenator 1308, a transformer decoder 1309 jointly processes features from the query image 110 output by ViT encoder 1306 and object pose 1312 jointly encoded with reference image 120 output by concatenator 1308. Finally, a prediction head 1310 outputs a dense 2D-3D mapping 1316 and a corresponding confidence map 1317, from which the query object pose 1304 can be recovered using, for example, a RANSAC (random sample consensus) PnP method that computes an object pose with respect to a camera frame, denoted as RANSAC PnP 1318.

In this embodiment, to estimate the target object pose 1314 at inference, the only required input is a collection of reference images 120 from the target object 1303, for which the pose is known. Similar to the embodiment set forth above, the model 1301 then outputs a dense 2D-3D mapping

1316 and confidence map 1317 from which the object pose 1304 can be obtained by solving a Perspective-n-Point (PnP) problem. Notably, the method generalizes to target objects unseen during training. Furthermore, all the necessary inputs can be obtained using scalable and straightforward methods, as opposed to reconstructing a 3D mesh or point-cloud of the object. The procedure to get the image collection can be as simple as recording some photos of the target object sitting on a table, without any need for further processing.

The approach, in one embodiment, may be implemented using generic components, namely Vision Transformers (ViT) and transformer decoder blocks. Namely, for each reference image 120, an image of pixel-wise 3D object coordinates 1312 is computed. Since neither the object 1303 mesh nor depth are provided, a proxy shape 1315 positioned and scaled according to the object's pose and dimensions 1314, respectively, is rendered using image renderer 1313.

Notably, using cuboid (i.e., 3D rectangle) as proxy shape works well in practice. Similar to the embodiment set forth above, the embodiment uses transformer decoder blocks (i.e., ViT (Vision Transformer) blocks) with additional cross-attention modules, to exchange and combine information from the reference object views with the query image. The overall architecture is computationally efficient at both training and test time, as it requires a single forward pass to predict a dense 2D-3D mapping.

To ensure robust generalization of the model 1301, the model is trained on a diverse set of data, including the BOP dataset, OnePose dataset and the ABO dataset, which include a variety of object categories along with their poses. Extensive ablation studies highlight the importance of mixing several data sources and enable to validate the many design choices for this type of architecture in the field. Experimental evaluation is provided on the Linemod and OnePose benchmarks.

Although not achieving the general level of accuracy that task-specific state-of-the-art approaches, the model 1301 and methods set forth above are simple, scalable, and a practical pose estimation pipeline.

Several methods have been proposed previously to directly estimate 6D-pose from RGB images, or to estimate 2D pixel to 3D point correspondences that are used to solve poses with PnP (Perspective-n-Point). Some of these methods leverage CAD (Computer-Aided Design) models to train networks to estimate reliable 3D point coordinates and refine pose estimations during inference time. Although these methods can achieve high pose accuracy, the requirement for exact CAD models hinders their practical use in many application scenarios. Additionally, these methods need to be re-trained for unseen objects.

To eliminate the need for 3D models (i.e., CAD models), recent works use neural rendering models for pose estimation. Another approach is category-level methods, which learn the shared shape prior within a category and eliminate the need for CAD models in the same category during test time. These methods still cannot estimate poses for new objects in unseen categories from the training dataset. In contrast, the method can estimate the pose of objects which have never been seen during training.

Several works have focused on estimating poses of unseen objects. BundleTrack, for example, does not require a 3D model of instance or category, and uses only RGB-D input sequences during inference. Similarly, Fs6D needs RGB-D reference images to estimate the pose accurately. More recently, several methods have been proposed for pose estimation of previously unseen objects using their 3D mesh models.

For instance, OVE6D utilizes a codebook to encode the 3D mesh model. It can be updated without additional training and is used to estimate the pose of an object using the codebook. Another method is OSOP, which employs 2D-2D matching and PnP (Perspective-n-Point) solving techniques based on the 3D mesh model of the object.

All these methods can accurately estimate the 6D pose of any new object in a scene, provided that its 3D mesh model is available, without the need for re-training the model. However, these methods need dense depth information or video sequences or 3D mesh model that can be challenging to obtain without sufficient time or additional devices. This can restrict the use of the models in practical settings.

Other methods only need a set of reference images with annotated poses to estimate poses and can generalize to unseen objects. Gen6D uses detection and retrieval to initialize the pose of a query image and then refines it by regressing the pose residual. However, it requires an accurately detected 2D bounding box for pose initialization and struggles with occlusion scenarios due to its multi-scale convolutional architecture. OnePose and OnePose++ beforehand reconstruct the object point cloud using respectively with COLMAP, from which they obtain 2D-3D correspondences for solving poses.

Although these methods claim they do not require 3D mesh models, they still need to reconstruct 3D point cloud of each model, which cannot be achieved in real-time and is hardly scalable.

In comparison, the method does not need 3D mesh model or reconstructed the 3D point cloud from reference images to infer the object pose. The method only uses the 3D bounding box of objects in the reference images to estimate 2D-3D correspondence of query image using a purely ViT-based architecture.

Initially, the architecture of the proposed object-agnostic model 1301 will be described in greater detail followed by its associated training loss. As shown in FIG. 13, the model 1301 takes as input a query image $I_q$ 110 of the target object O 1303 to estimate the pose 1304, and a set of K reference images $\{I_1, I_2, \ldots, I_K\}$ 120 showing the same object 1304 under various viewpoints, for which the object pose is known. $P_i = \{(R_i, t_i)\}$ denotes the pose 1304 of the object 1303 relative to the camera in the reference image $I_i$ 110. It is assumed prior knowledge of the object instance 1303 in the query image 110, which is typically provided by an object detector or a retrieval system applied beforehand. For the sake of simplicity and without loss of generality, it is assumed that all images (query and reference images) are approximately cropped to the object bounding box.

Referring again to FIG. 13 which shows an overview of the model architecture. First, the query image 110 is encoded into a set of token features with a Vision Transformer (ViT) encoder 1306. Similarly, the same encoder, which forms part of ViT+Pose Encoder 1307, is used to encode each reference image 120. For each reference image 120, the object pose 1314 is encoded and injected into the set of token features using a transformer decoder, which forms part of ViT+Pose encoder 1307 and concatenator 1308, i.e., a series of blocks, each composed of self-attention between the token features, cross-attention with the pose features, and a multilayer perceptron (MLP) decoder.

The concatenator 1308 outputs visual features augmented with 6D pose information of the reference images 120. The next step consists in combining information from the query features with the augmented reference image features with a transformer decoder 1309. Finally, a prediction head 1310 outputs dense 3D coordinate mapping 1316 for each pixel of the query image 110, from which the 6D pose 1304 in the query image may be recovered using RANSAC PnP 1318.

A vision transformer 1306 is used to encode all query images 110 and database images or reference images 120. In more details, each image is divided into non-overlapping patches, and a linear projection encodes them into patch features. A series of transformer blocks is then applied on these features: each block consists of multi-head self-attention and a multilayer perceptron (MLP) decoder. In practice, a ViT-Base model is used, i.e., 16×16 patches with 192-dimensional features, 12 heads and 12 blocks. RoPE relative position embeddings is used. As a result of the ViT (Vision Transformer) encoding, sets of token features, denoted $\mathcal{F}_q$, are obtained for the query image $I_q$ and $\mathcal{F}_i$ for the database images $I_i$ respectively:

$$\begin{cases} \mathcal{F}_q = \text{ImageEncoder}(I_q), \\ \mathcal{F}_i = \text{ImageEncoder}(I_i), i = 1 \ldots K \end{cases}.$$

There are multiple ways of inputting a 6D pose $P_i$ to a deep network. Since the process combines the 6D object pose with its visual representation $\mathcal{F}_i$, an image-aligned pose representation which blends seamlessly with the visual representation $\mathcal{F}_i$ is used.

Figure 14:
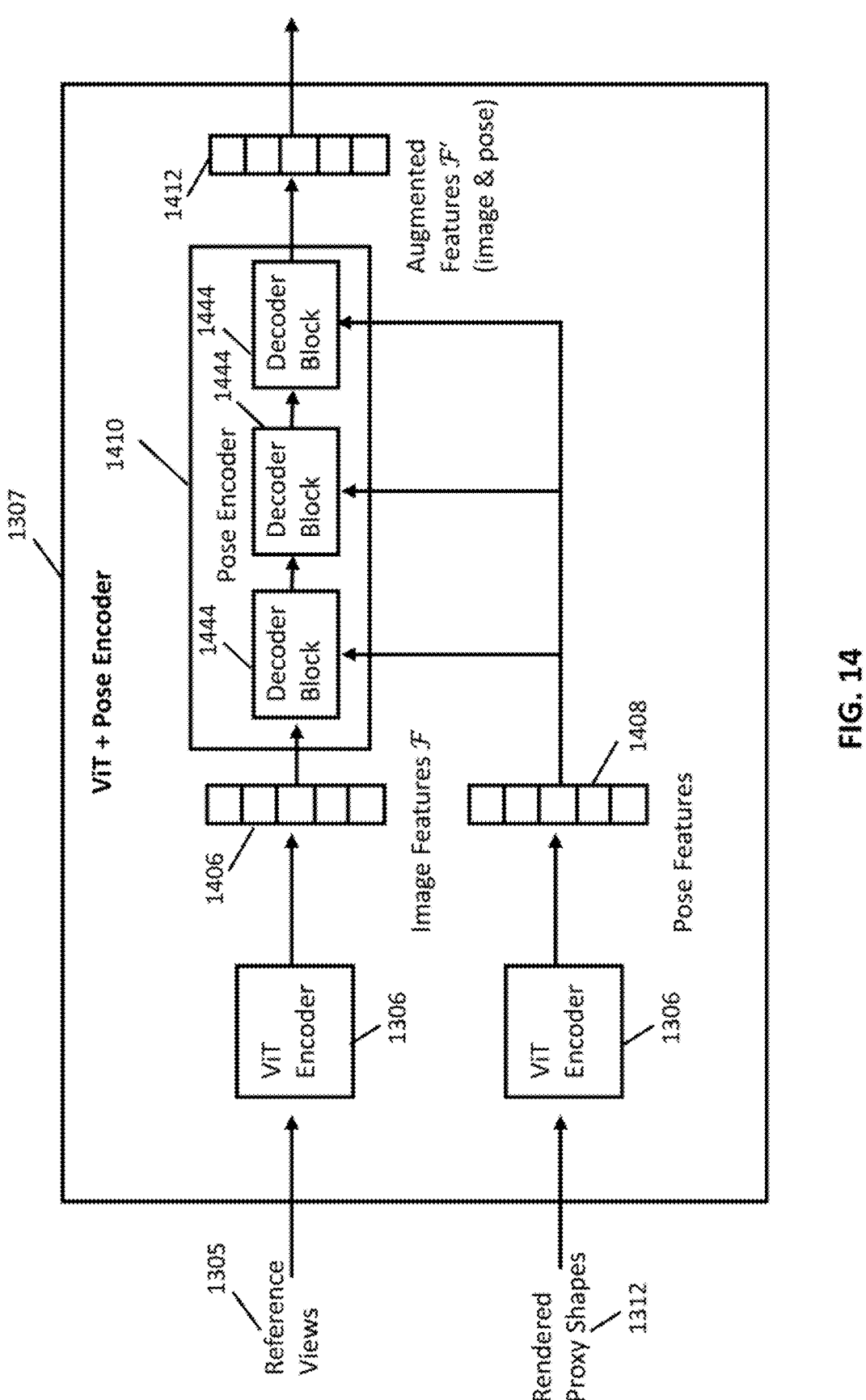
FIG. 14 illustrates an embodiment of the ViT+Pose encoder shown in FIG. 13.

Specifically, FIG. 14 illustrates one embodiment of the ViT+Pose encoder 1307 that takes as input reference views 120 and rendered proxy shapes 1312. As previously shown in FIG. 13, each rendered proxy shape 1312 is transformed into an image by rendering 3D coordinates of a proxy shape 1315 (e.g., a cuboid or an ellipsoid), scaled accordingly with the object dimension, and positioned according to the 6D object pose 1314 using image render 1313. As illustrated in FIG. 14, the ViT+Pose encoder 1307 combines the reference image features F 1406 with the annotated object pose features 1408, in the form of a rendered 3D proxy shape, using pose encoder 1410 to yield the pose-augmented features $\mathcal{F}'$ 1412.

As shown in FIG. 14, the annotated object pose features 1408 are a 3-channel image that is fed to another ViT (Vision Transformer), and then mixed with the visual features $\mathcal{F}_i$ through the cross-attention layers of a transformer using decoder blocks 44, yielding the 6D augmented features $\mathcal{F}_i'$:

$$\mathcal{F}_i' = \text{PoseEncoder}\left(\mathcal{F}_i, \; \text{ViT}(\text{Render}(P_i))\right).$$

The next step is to extract relevant information from the reference images with respect to the query image 110 (since not all reference images are necessarily helpful). A transformer decoder 1309 is leveraged that compares via cross-attention the query features $\mathcal{F}_q$ to all concatenated tokens $\mathcal{F}_i'$ from the augmented reference images output by concatenator 1308.

After obtaining the token features from the last transformer decoder block of decoder 1309, the token features are reshaped into a dense feature map. Then, either a linear head or a multi-layer convolutional head 1310 to this feature map is applied. The latter option, more complex, involves using DPT, which consists of a convolutional U-net. In all cases, the process reshapes the result as a 4-channel image with the same resolution as the query image. For each pixel, the process predicts the 3D coordinates of the associated point (i.e., 2D-3D mapping 1316), and an additional 4th channel yields the confidence t (i.e., confidence map 1317). Finally, a robust PnP (Perspective-n-Point) estimator 1318 extracts the most likely pose from this predicted 2D-3D mapping to define camera pose 1304.

The model 1301 is trained using two complementary regression losses. The first regression loss is a 3D regression loss. The second regression loss is a 2D reprojection loss.

The 3D regression loss trains the neural network model 1301 by, for each pixel i, regressing the ground-truth 3D object coordinates at this pixel. A standard Euclidean loss for pixels is used where such ground truth is available:

$$\mathcal{L}_{regr}^{(i)} = \left\| \hat{y}_i - y_i^{gt} \right\|,$$

where $\hat{y}_i \in \mathbb{R}^3$ is the network output for the $j^{th}$ pixel of he query image, and $$y_i^{gt}$$

is the corresponding ground-truth 3D point.

In the 2D reprojection loss, since the main objective is to predict the object pose via PnP (Perspective-n-Point), the process is not interested in getting correct 3D coordinates. Rather, the process seeks to predict 3D coordinates whose reprojection is consistent with the ground-truth object/camera rigid transformation. The process therefore employs a single-view 2D reprojection loss for all object pixels i ∈ $\mathcal{D}$ $$\mathcal{L}_{reproj}^{(i)} = \left\| \rho(K, P, \hat{y}_i) - p_i \right\|,$$

where r is the perspective projection onto the camera plane with the known camera intrinsic matrix K and ground truth object pose P, and $p_i$ is the 2D pixel position.

With respect to pixelwise confidence, since it is unlikely that all pixels can get correctly mapped during inference (e.g., background pixels), it is important to assert the likelihood of correctness of the predicted 2D-3D mapping for each pixel. The process therefore jointly predicts a per-pixel indicator $\tau_i > 0$ to modulate a pixelwise loss $\mathcal{L}$ (either 3D regression loss or 2D reprojection loss) as follows:

$$\mathcal{L}_{conf}^{(i)} = \tau_i \mathcal{L}^{(i)} - \log \tau_i.$$

Note that $\tau$ can be interpreted as the confidence of the prediction, as if $\tau_i$ is low for pixel i, the corresponding error $$\mathcal{L}_{conf}^{(i)}$$

at this location will be down-weighted, and vice versa. By default, the 2D reprojection loss is used for the confidence, since it makes more sense for PnP (Perspective-n-Point). The second term of the loss acts as a regularizer, so as to prevent the model from getting under-confident everywhere.

The final loss is a combination of 3D regression and confidence-based 2D reprojection loss:

$$\mathcal{L}_{final} = \frac{1}{|\mathcal{D}|} \sum_{i \in \mathcal{D}} \mathcal{L}_{regr}^{(i)} + \alpha \frac{1}{|I|} \sum_{i \in I} \mathcal{L}_{conf}^{(i)},$$

where $\alpha$ is a weighting term to balance the contribution of both losses. Note that the confidence-based loss is computed as an average over all image pixels, in order to get a training signal everywhere for the confidence. For pixels outside the object mask i∉ $\mathcal{D}$, $$\mathcal{L}_{reproj}^{(i)} = E,$$

where E is a constant representing a large reprojection error (typically set E=20 pixels).

To ensure the generalization capability of the model 1301, the model is trained on a diverse set of datasets covering a large panel of diversity, specifically, the large-scale ABO dataset, which comprises 580K images from 8,209 sequences, featuring 576 object categories from amazon. com. Training also uses some datasets of the BOP challenge, namely T-LESS, HB, HOPE, YCB-V, RU-APC, TUD-L, TYO-L and ICMI. Symmetrical objects are excluded from the training set, as well as 3 objects from the HB dataset that are present in the LINEMOD dataset, in order to evaluate the generalization capabilities on this benchmark.

In total, 150K synthetic physically-based-rendered images and 53 K real images are considered, featuring 153 objects, from the BOP challenge for training. Additionally, the OnePose dataset is incorporated, which includes over 450 video sequences of 150 objects captured in front of various background environments.

The ABO and BOP datasets provide for each object 3D models, as well as images annotated with object poses. Using this information, the model 1301 is trained using both regression and reprojection losses. In contrast, the OnePose dataset lacks 3D models, preventing leverage of the regression loss. In this case, training relies solely on the reprojection loss.

During training, the network is fed with batches of 64×32=2048 images, each batch being composed of 64 objects for which 16 query and 16 reference images are provided (32 images in total). Since queries of the same object attend to the same set of reference images, features { $\mathcal{F}'$ } are precomputed for these reference images and shared across all queries. Furthermore, by a careful reshaping of the tensors in-place in the query decoder, conventional attention mechanisms can be used without any copy in memory. In addition to considerably reducing the memory requirements, this significantly speeds up training.

The neural network model 1301 may be built from conventional transformer blocks. The image encoder 1306 may be a ViT-Base/16. The query decoder 1309 may be identical, except for the additional cross-attention modules. For the ViT+Pose encoder 1307 shown in FIG. 14, a small 1-layer ViT (Vision Transformer) 1306 may be used to encode the proxy shape rendering 1312 and the reference views 1305, and 4 transformer decoder blocks 1444 of pose encoder 1410 to inject the pose information into the visual representation.

Relative positional encoding (RoPE) is used for all multi-head attention modules. The network 1301 is trained for 25,000 steps with AdamW with b=(0.9, 0.95) and a cosinedecaying learning rate going from $10^{-4}$ to $10^{-6}$. The network weights are initialized using CroCo, which accelerates convergence.

In the embodiment of the pose encoder 1410, shown in FIG. 14, the pose encoder 1410 is adapted to mixing 2D-3D annotations that are dense (e.g., using the model free pose estimation methods).

In an alternative embodiment that is adapted to mixing 2D-3D annotations that are sparse, an architecture similar to the feature mixer 140, shown in FIG. 4, (e.g., using scene cord regression (SACReg) methods) may be used.

In data augmentation, all images are rescaled and cropped to a resolution of 160×160 around the object location. Standard augmentation techniques are applied for cropping, such as random shifting, scaling and rotation to increase the diversity of the training data. Augmentation is also applied to the input of the pose encoder to improve generalization, specifically random geometric 3D transformations are applied to the proxy shape pose and coordinates, including 3D rotation, translation and scaling. When choosing the set of 16 reference images for each object, 8 reference images are selected at random across the entire pool of reference images for this object, and the remaining 8 views are selected using a greedy algorithm that minimizes blind spots.

The pose encoder receives multiple reference images and their rendered 3D proxy shell (e.g. a cuboid or an ellipsoid). The 3D proxy shape centroid is aligned with the object center (according to the pose). The size of the proxy shape derives from information provided with the dataset. If a 3D mesh is available, the mesh is used to compute a 3D bounding box aligned with the 3 axes. The scale of the shape proxy is set accordingly to the 3D bounding box. The generated 3D proxy shape is then transformed using the object pose and rendered to the camera.

3D proxy shape 1316 was used as a way to predict the pose 1304. In this case, the network 1301 is trained to output a proxy shape having the correct pose, similar to using the proxy shape for inputting a pose. This setting functions well, and noticeably better than trying to regress the actual 3D coordinates of the model.

The following is a description of solving the object pose in a given query image 110. Given a query image 110 of a given object 1303, 16 reference views 120 are sampled among all the available reference views for this object. Also during training, a greedy algorithm is used to maximize the diversity of viewpoints in the selected pool of views.

From this input, the model 1301 predicts a dense 2D-3D mapping 1316 and an associated confidence map 1317, as can be seen in FIG. 13. The process then filters out regions for which the confidence is below a threshold t. Then the process uses a conventional PnP (Perspective-n-Point) solver 1318 to obtain the predicted object pose 1304. In another embodiment a SQ-PnP with 1024 randomly sampled 2D-3D correspondences, according to the confidence of the remaining points, 1000 iterations and a reprojection error threshold of 5 pixels, can be used.

The test splits of the training datasets are used. The process evaluates on the LINEMOD dataset, a subset of the BOP benchmark, a widely-used dataset for object pose estimation comprising 13 models and 13 K real images. For the evaluation, a standard train-test split is used, following the protocol defined in OnePose++, using their open-source code and detections from the conventional object detector YOLOv5.

Approximately 180 real training images are used as references, discarding the 3D CAD model and only using the pose, while all remaining test images are used for evaluation. For the Onepose and ABO datasets, the official test splits are used as well. OnePose-LowTexture dataset is also used, where there are 40 household low-textured objects for evaluation.

The cm-degree metric is used to evaluate the accuracy of the predicted poses on both datasets. The rotation and translation errors are calculated separately, and a predicted pose is considered correct if both its rotation error and translation error are below a certain threshold. For the LINEMOD dataset, CAD models are available to evaluate the accuracy, and therefore, two additional metrics are employed: the 2D projection metric and the ADD metric. The threshold for the 2D projection metric is set to 5 pixels. To compute the ADD metric, the 3D model's vertices are transformed using both the ground truth and predicted poses, and the average distance between the two sets of transformed points is calculated. A pose is considered accurate if the average pointwise distance is smaller than 10% of the object's diameter. For symmetric objects, the average point-to-set distance (ADD-S) is considered instead.

An ablative study is conducted to measure the impact of critical components in the method, such as the choice of proxy shape to represent and predict the pose, training data, and the choice of loss functions and prediction heads. For these experiments, numbers on subsets of the three benchmarks mentioned above are reported. 1000 queries from each dataset are uniformly sampled and reported each time a few adequate metrics. Unless specified otherwise, the same training sets are used, hyper-parameters and network architecture than specified previously.

The impact of using 3D proxy shapes is studied, both in terms of input pose representation and pose prediction. Three settings are considered: using a cuboid or an ellipsoid proxy shape for both input and output, or inputting the pose with a cuboid and regressing the object's 3D coordinate as output. In this latter case, the 3D regression loss on images from the OnePose dataset (i.e. only the 2D reprojection loss) is not used since no CAD model is available on this dataset.

As shown in FIG. 15, it is observed that using the box of the 3D proxy shape both as input and output yields superior performance consistently on all datasets. Interestingly, it also outperforms the cuboid-to-CAD setting, meaning that it is easier for the network to regress 3D coordinates of an invisible cuboid than actually guessing CAD coordinates. Therefore, the cuboid-to-cuboid setting is used in all subsequent experiments.

Then an ablation is conducted to measure the impact of diverse training data, i.e. discarding some training datasets. It is ensured that all models have the same number of training steps in each setting for a fair comparison.

FIG. 16 shows that having more diversity in the training set improves performance on all test sets. These results means that, despite the great diversity between datasets (for instance, ABO contains mostly furniture), knowledge can effectively be shared and transferred between datasets.

The impact of the loss functions is also evaluated. A comparison between using both loss functions or using each of them alone is carried out. Note that, thanks to regressing points on a proxy shape, the 3D regression loss $\mathcal{L}_{regr}$ can be used regardless of the fact that the CAD models exist or not.

The results, presented in FIG. 17, indicate that solely using 2D reprojection loss is strongly suboptimal. This can be explained by the fact that the learning signal from this loss function (minimizing the distance between a 3D point and a line/camera ray) is weaker than the 3D regression loss. More surprising is the fact that completely dropping the 2D regression loss outperforms all other settings, since the 2D reprojection loss is supposed to minimize the PnP (Perspective-n-Point) error. In the following, only the 3D reprojection loss is used.

Two different architectures for the regression head were tried, namely a simple linear projection and a convolutional DPT head. Results in FIG. 18 show that DPT brings a significant performance gain.

The effect of varying the number of reference views K is measured, which go through the Pose encoder as input. As shown in FIG. 19, increasing the number of reference views lead to higher performance, because of the increased number of views which potentially overlap with the query object. However, the gain is generally small, which shows that the disclosed approach does not need many views to correctly extrapolate the pose.

The performance on the official ABO test split is shown in FIG. 20. Since this dataset has not been used yet for evaluation, the following evaluation protocol is proposed: For each object in the material benchmark dataset, several environment maps are used to render the object with different lighting and background conditions (typically, 3 environment maps per object are provided) as well as an empty map (i.e. a black background). Only images with environment maps are used and renderings with a black background are discarded. Reference views are selected among images from the first environment and having an even index, and select query views among images using the other environments and having an odd index. The split between even and odd indices ensures that object poses in query views are never seen in the reference images Although objects categories are shared between the train and test splits, the disclosed method is able to generalize to unseen object instances without any explicit input of the object category at test time.

FIG. 21 illustrates a table showing comparison data. For FIG. 21, the method is compared with HLoc combined with different feature matching methods, OnePose and OnePose++. It is denoted as 'SfM' methods relying on an explicit 3D reconstruction of the objects.

The method is compared with state of the art methods and SfM baselines on the challenging OnePose test set, which has the particularity of not providing CAD models for the dataset objects. Note that HLoc (LoFTR*) uses LoFTR coarse matches for SfM and uses full LoFTR to match the query image and its retrieved images for pose estimation. The standard cm-degree accuracy is reported for different thresholds. As for LINEMOD, the method performs poorly at high-precision thresholds. However, the method outperforms all approaches on the coarser 5 cm, 5 deg threshold except for OnePose++, for which a slightly lower performance is observed.

This is noteworthy because, in contrast to all the other methods, the one-shot approach does not rely on any kind of 3D reconstruction of the objects, nor does it perform any explicit point matching. In addition, the model architecture does not have any task-specific component and directly takes raw images as input without any further pre- or post-processing.

Inference timings for a given a query image are reported, and assuming that reference views have been encoded offline, measured on a single V100 GPU (repeating experiments 10 times and keeping the median timings): The method is 4~6 faster than OnePose and OnePose++ whose 2D-3D matching module take 66.4 and 88.2 ms respectively on a single V100 GPU.

The process described above provides a model-free one-shot object pose estimation. In contrast to conventional one-shot methods, the process described above does not need any 3D model of the target object, such as a mesh or point-cloud, and only requires a set of reference images annotated with the object poses, thereby making the process described above simpler, more implementable, and scalable.

The process described above implicitly extracts 3D information from the reference images, and then jointly matching, combining, and extrapolating pose information with the query image.

In one embodiment, only generic modules from a ViT architecture are used. Namely, the query image and reference images are embedded with a vision transformer (ViT) encoder. Also, dense 3D coordinates of the reference images are embedded with a vision transformer (ViT) encoder and are mixed with the tokens from the corresponding images using a transformer decoder. Another decoder then processes both the tokens from the query image and these features containing information about database images and their sparse 3D coordinates. The decoder output is fed to a prediction head that produces dense 3D coordinates corresponding to the query image.

Note that the tokens of the database images encoded with their dense 3D coordinates can be precomputed and stored for better efficiency at query time. As a result, process described above is also significantly faster than conventional one-shot methods.

The embodiments described above may be implemented in hardware or in software. Some or all of the method steps of the embodiments described above may be implemented by a computer in that they are executed by (or using) a processor, a microprocessor, an electronic circuit or processing circuitry. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

A computer-implemented method comprises generating, by an image encoder, a set of first image tokens from a first image that is unannotated; generating, by the image encoder, one or more sets of second image tokens from one or more second images; generating, by an object encoder, one or more sets of augmented second image tokens by augmenting each set of second image tokens with encodings of respective pixel-level object annotations associated with the respective set of second image tokens, wherein the respective pixel-level object annotations define a pointmap, where 3D scene points in the pointmap are mapped to 2D image pixels in the respective second image; mixing, by a feature mixer, the respective set of second image tokens and the encodings of the respective pixel-level object annotations;

processing, by a decoder, the set of first image tokens and the one or more sets of augmented second image tokens to generate prediction data that includes predictions for the image pixels of the first image; and processing, by an application module, the predictions for the image pixels of the first image to, one or more of: (i) infer a camera pose of a camera used for capturing the first image, (ii) generate a 3D-reconstruction of a scene depicted in the first image, and (iii) perform dense depth prediction for the first image.

The image encoder, the feature mixer, and the decoder may be trained using pixel-level object annotations of the first image in a sufficient quantity for defining a ground truth.

The 3D scene points in the pointmap may be mapped to 2D pixels in the second image that are associated with an object in the respective second image.

The respective pixel-level object annotations associated with the respective set of second image tokens may be renderings of a proxy shape.

The proxy shape may be a cuboid.

The 3D scene points in the pointmap are mapped to 2D pixels in the respective second image that may be associated with the cuboid.

The respective pixel-level annotations associated with the second images may be dense renderings of the proxy shape.

A system implemented using an electronic processor and memory, comprises an image encoder for generating (i) a set of first image tokens from a first image that is unannotated and (ii) one or more sets of second image tokens from one or more second images; an object encoder for generating one or more sets of augmented second image tokens by augmenting each set of second image tokens with encodings of respective pixel-level object annotations associated with the respective set of second image tokens, wherein the respective pixel-level object annotations define a pointmap, where 3D scene points in the pointmap are mapped to 2D pixels in the respective second image; a feature mixer for mixing the respective set of second image tokens and the encodings of the respective pixel-level object annotations; a decoder for processing the set of first image tokens and the one or more sets of augmented second image tokens to generate prediction data that includes predictions for the image pixels of the first image; and an application module for processing the predictions for the image pixels of the first image to, one or more of: (i) infer a camera pose of a camera used for capturing the first image; (ii) generate a 3D-reconstruction of a scene depicted in the first image; and (iii) perform dense depth prediction for the first image.

A method using an object-agnostic model, implemented using an electronic processor and memory, for predicting a pose of an object in an image, comprises (a) receiving a query image having a target object therein; (b) receiving a set of reference images of the target object from different viewpoints; (c) encoding, using a vision transformer, the received query image and the received set of reference images to generate a set of token features for the received query image and a set of token features for the received set of reference images; (d) extracting, using a transformer decoder, information from the set of token features for the encoded reference images with respect to a set of token features for the received query image; (e) processing, using a prediction head, the combined set of token features to generate a 2D-3D mapping of the query image; and (f) processing the 2D-3D mapping to determine the pose of the target object in the query image.

Each reference image in the set of reference images may be an image of the target object with a known pose.

The method may electronically encode, using the vision transformer, each reference image, jointly, with the corresponding pose to generate a set of augmented reference image token features.

The method may electronically extract, using the transformer decoder, information from the set of token features for the encoded reference images with respect to the set of token features for the received query image by comparing, via cross-attention, the set of token features for the received query image to all concatenated tokens from the set of augmented reference image token features.

The method may electronically encode, using the vision transformer, each reference image, jointly, with the corresponding pose to generate reference image token features augmented with 6D pose information.

The method may electronically extract, using the transformer decoder, from information from the set of token features for the encoded reference images with respect to the set of token features for the received query image by comparing, via cross-attention, the set of token features for the received query image to all concatenated tokens from the set of reference image token features augmented with 6D pose information.

The method may electronically extract, using a transformer decoder having a series of blocks, each block including self-attention between the token features, cross-attention with the pose features, and a multilayer perceptron.

The method may electronically process, using SQ-PnP, the 2D-3D mapping and a confidence map to the pose of the target object in the query image.

The method may electronically process, using RANSAC PnP, the 2D-3D mapping and a confidence map to the pose of the target object in the query image.

The method may electronically process, using the prediction head, the combined set of token features to generate dense 3D coordinates for each pixel of the query image and a confidence map of the query image.

The method may electronically process, using the prediction head, the combined set of token features to generate a four channel image, having a same resolution as the received query image, such that of each pixel, three channels of the four channel image consist of 3D coordinates of the pixel and a fourth channel consist of a confidence value.

The object-agnostic model may be pre-trained using a 3D regression loss, the 3D regression loss, for each pixel i, regresses ground-truth 3D object coordinates at the pixel using a standard Euclidean loss:

$$\mathcal{L}_{regr}^{(i)} = \left\| \hat{y}_i - y_i^{gt} \right\|,$$

where $\hat{y}_i \in \mathbb{R}^3$ is the network output for the $i^{th}$ pixel of the query image, and $$y_i^{gt}$$

is the corresponding ground-truth 3D point.

The object-agnostic model may be pre-trained using a 2D reprojection loss, the 2D reprojection loss predicts 3D coordinates whose reprojection is consistent with a ground-truth object/camera rigid transformation by employing a single-view 2D reprojection loss for all object pixels i∈ $\mathcal{D}$:

$$\mathcal{L}_{reproj}^{(i)} = \|\rho(K, P, \hat{y}_i) - p_i\|,$$

where r is the perspective projection onto a camera plane with a known camera intrinsic matrix K and ground truth object pose P, and $p_i$ is the 2D pixel position; the 2D reprojection loss being sued in training pixelwise confidence in the object-agnostic model by jointly predicting a per-pixel indicator $\tau_i{>}0$ to modulate a pixelwise loss $\mathcal{L}$ (2D reprojection loss) as follows:

$$\mathcal{L}_{conf}^{(i)} = \tau_i \mathcal{L}^{(i)} - \log \tau_i.$$

The final loss used in pre-training the object-agnostic model may be a combination of 3D regression and confidence-based 2D reprojection loss:

$$\mathcal{L}_{final} = \frac{1}{|\mathcal{D}|} \sum_{i \in \mathcal{D}} \mathcal{L}_{regr}^{(i)} + \alpha \frac{1}{|I|} \sum_{i \in I} \mathcal{L}_{conf}^{(i)},$$

where α is a weighting term to balance a contribution of both losses.

A system using an object-agnostic model, implemented using an electronic processor and memory, for predicting a pose of an object in an image, comprises a vision transformer configured to electronically receive a query image having a target object therein and a set of reference images of the target object from different viewpoints; the vision transformer configured to electronically encode the received query image and the received set of reference images to generate a set of token features for the received query image and a set of token features for the received set of reference images; a transformer decoder configured to extract information from the set of token features for the encoded reference images with respect to a set of token features for the received query image; a prediction head configured to electronically generate, from the combined set of token features, a 2D-3D mapping of the query image; and a PnP configured to electronically process the 2D-3D mapping to determine the pose of the target object in the query image.

Each reference image in the set of reference images may be an image of the target object with a known pose.

The vision transformer may include a pose encoder configured to electronically encode each reference image, jointly, with the corresponding pose to generate a set of augmented reference image token features.

The transformer decoder may electronically extract information from the set of token features for the encoded reference images with respect to the set of token features for the received query image by comparing, via cross-attention, the set of token features for the received query image to all concatenated tokens from the set of token features for the encoded reference images.

The transformer decoder may electronically extract information from the set of token features for the encoded reference images with respect to the set of token features for the received query image by comparing, via cross-attention, the set of token features for the received query image to all concatenated tokens from the set of augmented reference image token features.

The vision transformer may include a pose encoder configured to electronically encode each reference image, jointly, with the corresponding pose to generate reference image token features augmented with 6D pose information.

The pose encoder may electronically transform the corresponding pose into an image by rendering 3D coordinates of a proxy shape scaled according to dimensions of the object and positioned according to a 6D object pose.

The transformer decoder may include a series of blocks, each block having self-attention between the token features, cross-attention with the pose features, and a multilayer perceptron.

The prediction head may electronically process the combined set of token features to generate dense 3D coordinates for each pixel of the query image and a confidence map of the query image.

The prediction head may electronically process the combined set of token features to generate a four channel image, having a same resolution as the received query image, such that of each pixel, three channels of the four channel image consist of 3D coordinates of the pixel and a fourth channel consist of a confidence value.

The PnP may be a SQ-PnP.

The PnP may be a RANSAC PnP.

The object-agnostic model may be pre-trained using a 3D regression loss, the 3D regression loss, for each pixel i, regresses ground-truth 3D object coordinates at the pixel using a standard Euclidean loss:

$$\mathcal{L}_{regr}^{(i)} = \left\| \hat{y}_i - y_i^{gt} \right\|,$$

where $\hat{y}_i \in \mathbb{R}^3$ is the network output for the $i^{th}$ pixel of the query image, and $$y_i^{gt}$$

is the corresponding ground-truth 3D point.

The object-agnostic model may be pre-trained using a 2D reprojection loss, the 2D reprojection loss predicts 3D coordinates whose reprojection is consistent with a ground-truth object/camera rigid transformation by employing a single-view 2D reprojection loss for all object pixels i∈ $\mathcal{D}$ $$\mathcal{L}_{reproj}^{(i)} = \|\rho(K, P, \hat{y}_i) - p_i\|,$$

where r is the perspective projection onto a camera plane with a known camera intrinsic matrix K and ground truth object pose P, and $p_i$ is the 2D pixel position; the 2D reprojection loss being sued in training pixelwise confidence in the object-agnostic model by jointly predicting a per-pixel indicator $\tau_i{>}0$ to modulate a pixelwise loss $\mathcal{L}$ (2D reprojection loss) as follows:

$$\mathcal{L}_{conf}^{(i)} = \tau_i \mathcal{L}^{(i)} - \log \tau_i.$$

The final loss used in pre-training the object-agnostic model may be a combination of 3D regression and confidence-based 2D reprojection loss:

$$\mathcal{L}_{final} = \frac{1}{|\mathcal{D}|}\sum_{i \in \mathcal{D}} \mathcal{L}_{regr}^{(i)} + \alpha \frac{1}{|I|}\sum_{i \in I} \mathcal{L}_{conf}^{(i)},$$

where $\alpha$ is a weighting term to balance a contribution of both losses.

A computer-implemented method of training a machine learning model for regression on pixel-level annotations in images, the machine learning model comprising an image encoder, a feature mixer, and a decoder, the method comprises pre-training the image encoder and the decoder for cross-view completion on images; constructing training tuples, each training tuple comprising a first image and one or more second images, wherein the first image is associated with dense pixel-level annotations, and wherein each of the one or more second images is associated with sparse pixel-level annotations; generating, by the image encoder, a set of first image tokens from the first image; generating, by the image encoder, one or more sets of second image tokens from the one or more second images; generating, by the feature mixer, one or more sets of augmented second image tokens by augmenting each set of second image tokens with encodings of the respective sparse pixel-level annotations associated with the respective set of second image tokens, wherein the augmenting includes mixing the respective set of second image tokens and the encodings of the respective sparse pixel-level annotations; processing, by the decoder, the set of first image tokens and the one or more sets of augmented second image tokens to generate prediction data of the machine learning model for the first image, wherein the processing comprises receiving a set of augmented second image tokens of the one or more sets of augmented second image tokens, wherein the prediction data comprises predictions for each image pixel of the first image and confidences for the predictions; and fine-tuning the machine learning model, wherein the fine-tuning comprises adjusting parameters of the image encoder, the feature mixer, and the decoder to minimize a loss function, wherein the loss function is based on the prediction data and the dense pixel-level annotations.

The feature mixer may comprise a first pipeline of image-level decoders for processing the respective second set of tokens, and a second pipeline of point-level decoders for processing the respective encodings, wherein each image-level decoder comprises a first cross-attention layer, wherein each point-level decoder comprises a second cross-attention layer, wherein the mixing the respective set of second image tokens and the respective encodings comprises each first cross-attention layer receiving information from the second pipeline and each second cross-attention block receiving information from the first pipeline.

The feature mixer further may comprise first linear projection modules configured for processing the information from the second pipeline, and second linear projection modules configured for processing the information from the first pipeline, to account for different set sizes of the encodings and the set of second image tokens.

The decoder may comprise a plurality of cross-attention layers, wherein the number of cross-attention layers matches the number of second images, wherein the processing, by the decoder, the set of first image tokens and the one or more sets of augmented second image tokens comprises processing the set of first image tokens as input of the decoder and providing each set of augmented second image tokens to a respective cross-attention layer of the plurality of cross-attention layers, or wherein the decoder comprises a single cross-attention layer, wherein the processing, by the decoder, the set of first image tokens and the one or more sets of augmented second image tokens comprises providing one set of augmented second image tokens to the single cross-attention layer at a time, wherein for each set of augmented second image tokens, intermediate prediction data are generated and the prediction data of the machine learning model is based on selecting, as the prediction data for an image pixel, an intermediate prediction for the image pixel having a highest confidence value of the confidences.

The sparse pixel-level annotations and the dense pixel-level annotations may each comprise annotations of image pixels with 3D coordinates of real-world object features corresponding to the image pixels, wherein the sparse pixel-level annotations are scattered over the respective image when compared with the dense pixel-level annotations, and wherein the prediction data for each image pixel of the first image comprises a 3D coordinate for the image pixel.

The method may further comprise generating the encodings of the pixel-level annotations by a trainable pixel annotation encoder, wherein the pixel annotation encoder is fed with representations of the pixel-level annotations based on an embedding of 3D coordinates in the hypercube $[-1,1]^d$.

The embedding may be an injective projection and has an inverse, wherein the inverse of the embedding is well-defined over the hypercube $[-1,1]^d$.

The embedding may be defined by $\varphi(x)) = (\psi(x), \psi(y), \psi(z))$ with $$\psi(x) = [\cos(f_1 x), \sin(f_1 x), \cos(f_2 x), \sin(f_2 x), \dots],$$

$$\psi(y) = [\cos(f_1 y), \sin(f_1 y), \cos(f_2 y), \sin(f_2 y), \dots],$$

$$\psi(z) = [\cos(f_1 z), \sin(f_1 z), \cos(f_2 z), \sin(f_2 z), \dots],$$

$$\text{wherein } f_i = f_0 \gamma^{i-1}, i \in \left\{1, \dots, \frac{d}{6}\right\}, f_0 > 0, \text{ and } \gamma > 0.$$

The pixel-level annotation may relate to optical flow, relates to information for identifying instances of objects, or relates to information for segmentation of views.

The constructing training tuples may comprise selecting the one or more second images from an image database based on selecting easy inliers, hard inliers, and hard outliers, wherein the easy and hard inliers are determined based on a viewpoint angle between camera poses employed to capture the respective images, and the hard outliers are selected as being images most similar to the first image.

The pre-training of the image encoder along with the decoder for cross-view completion may comprises pre-training a pipeline comprising an encoder and a decoder on a pair of pre-training images comprising a first pre-training image and a second pre-training image, wherein the pipeline is trained to reconstruct masked portions of the first pre-training image based on the second pre-training image.

The method may further comprise using the trained machine learning model for performing one or more of: inferring a camera pose of a camera used for capturing an unannotated query image; generating a 3D-reconstruction of a scene depicted in the unannotated query image; performing 3D completion of a sparsely annotated query image, wherein the sparsely annotated query image is employed as the second image; and performing dense depth prediction for an unannotated query image.

In embodiments, a machine learning model based on the Transformer architecture is disclosed that is trained on diverse datasets. The trained machine-learning models are able to generalize to scenes not seen during training, and significantly outperform other scene regression approaches on several benchmarks.

The invention claimed is:

1. A computer-implemented method of training a machine learning model for regression on pixel-level annotations in images, the machine learning model comprising an image encoder, a feature mixer, and a decoder, the method comprising:

pre-training the image encoder and the decoder for cross-view completion on images;

constructing training tuples, each training tuple comprising a first image and one or more second images, wherein the first image is associated with dense pixel-level annotations, and wherein each of the one or more second images is associated with sparse pixel-level annotations;

generating, by the image encoder, a set of first image tokens from the first image;

generating, by the image encoder, one or more sets of second image tokens from the one or more second images;

generating, by the feature mixer, one or more sets of augmented second image tokens by augmenting each set of second image tokens with encodings of the respective sparse pixel-level annotations associated with the respective set of second image tokens, wherein the augmenting includes mixing the respective set of second image tokens and the encodings of the respective sparse pixel-level annotations;

processing, by the decoder, the set of first image tokens and the one or more sets of augmented second image tokens to generate prediction data of the machine learning model for the first image, wherein the processing comprises receiving a set of augmented second image tokens of the one or more sets of augmented second image tokens, wherein the prediction data comprises predictions for each image pixel of the first image and confidences for the predictions; and fine-tuning the machine learning model, wherein the fine-tuning comprises adjusting parameters of the image encoder, the feature mixer, and the decoder to minimize a loss function, wherein the loss function is based on the prediction data and the dense pixel-level annotations.

2. The method as claimed in claim 1, wherein the feature mixer comprises a first pipeline of image-level decoders for processing the respective second set of tokens, and a second pipeline of point-level decoders for processing the respective encodings, wherein each image-level decoder comprises a first cross-attention layer, wherein each point-level decoder comprises a second cross-attention layer, wherein the mixing the respective set of second image tokens and the respective encodings comprises each first cross-attention layer receiving information from the second pipeline and each second cross-attention block receiving information from the first pipeline.

3. The method as claimed in claim 2, wherein the feature mixer further comprises first linear projection modules configured for processing the information from the second pipeline, and second linear projection modules configured for processing the information from the first pipeline, to account for different set sizes of the encodings and the set of second image tokens.

4. The method as claimed in claim 3, wherein the decoder comprises a plurality of cross-attention layers, wherein the number of cross-attention layers matches the number of second images, wherein the processing, by the decoder, the set of first image tokens and the one or more sets of augmented second image tokens comprises processing the set of first image tokens as input of the decoder and providing each set of augmented second image tokens to a respective cross-attention layer of the plurality of cross-attention layers, or wherein the decoder comprises a single cross-attention layer, wherein the processing, by the decoder, the set of first image tokens and the one or more sets of augmented second image tokens comprises providing one set of augmented second image tokens to the single cross-attention layer at a time, wherein for each set of augmented second image tokens, intermediate prediction data are generated and the prediction data of the machine learning model is based on selecting, as the prediction data for an image pixel, an intermediate prediction for the image pixel having a highest confidence value of the confidences.

5. The method as claimed in claim 4, wherein the sparse pixel-level annotations and the dense pixel-level annotations each comprise annotations of image pixels with 3D coordinates of real-world object features corresponding to the image pixels, wherein the sparse pixel-level annotations are scattered over the respective image when compared with the dense pixel-level annotations, and wherein the prediction data for each image pixel of the first image comprises a 3D coordinate for the image pixel.

6. The method as claimed in claim 5, further comprising generating the encodings of the pixel-level annotations by a trainable pixel annotation encoder, wherein the pixel annotation encoder is fed with representations of the pixel-level annotations based on an embedding of 3D coordinates in the hypercube $[-1,1]^d$.

7. The method as claimed in claim 6, wherein the embedding is an injective projection and has an inverse, wherein the inverse of the embedding is well-defined over the hypercube $[-1,1]^d$.

8. The method as claimed in claim 7, wherein the embedding is defined by $\varphi(x))=(\psi(x), (\psi(y), \psi(z))$ with $$\psi(x) = [\cos(f_1 x), \sin(f_1 x), \cos(f_2 x), \sin(f_2 x), \dots ],$$

$$\psi(y) = [\cos(f_1 y), \sin(f_1 y), \cos(f_2 y), \sin(f_2 y), \dots ],$$

$$\psi(z) = [\cos(f_1 z), \sin(f_1 z), \cos(f_2 z), \sin(f_2 z), \dots ],$$

$$\text{wherein } f_i = f_0 \gamma^{i-1}, i \in \left\{1, \dots , \frac{d}{6}\right\}, f_0 > 0, \text{ and } \gamma > 0.$$

9. The method as claimed in claim 4, wherein the pixel-level annotation relates to optical flow, relates to information for identifying instances of objects, or relates to information for segmentation of views.

10. The method as claimed in claim 9, wherein the constructing training tuples comprises selecting the one or more second images from an image database based on selecting easy inliers, hard inliers, and hard outliers, wherein the easy and hard inliers are determined based on a viewpoint angle between camera poses employed to capture the respective images, and the hard outliers are selected as being images most similar to the first image.

11. The method as claimed in claim 9, wherein the pre-training of the image encoder along with the decoder for cross-view completion comprises pre-training a pipeline comprising an encoder and a decoder on a pair of pre-training images comprising a first pre-training image and a second pre-training image, wherein the pipeline is trained to reconstruct masked portions of the first pre-training image based on the second pre-training image.

12. The method as claimed in claim 1, further comprising using the trained machine learning model for performing one or more of:

inferring a camera pose of a camera used for capturing an unannotated query image;

generating a 3D-reconstruction of a scene depicted in the unannotated query image;

performing 3D completion of a sparsely annotated query image, wherein the sparsely annotated query image is employed as the second image; and performing dense depth prediction for an unannotated query image.

\* \* \* \* \*